(12) United States Patent
Kugler et al.

(10) Patent No.: US 12,316,548 B2
(45) Date of Patent: *May 27, 2025

(54) SYSTEMS AND METHODS FOR MANAGING TRANSMISSION CONTROL PROTOCOL (TCP) ACKNOWLEDGEMENTS

(71) Applicant: Apple Inc., Cupertino, CA (US)

(72) Inventors: Martin Kugler, Poing (DE); Cahya A. Masputra, San Jose, CA (US); Christoph Paasch, Cupertino, CA (US); Hans Jürgen Steffen, Nuremberg (DE); Murtaza A. Shikari, Mountain View, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,089

(22) Filed: Dec. 27, 2023

(65) Prior Publication Data

US 2024/0129253 A1 Apr. 18, 2024

Related U.S. Application Data

(63) Continuation of application No. 18/080,182, filed on Dec. 13, 2022, now Pat. No. 11,882,051, which is a
(Continued)

(51) Int. Cl.
*H04L 47/32* (2022.01)
*H04L 47/193* (2022.01)
*H04L 47/2483* (2022.01)

(52) U.S. Cl.
CPC .......... *H04L 47/323* (2013.01); *H04L 47/193* (2013.01); *H04L 47/2483* (2013.01)

(58) Field of Classification Search
None
See application file for complete search history.

(56) References Cited

U.S. PATENT DOCUMENTS

| 4,805,137 A | 2/1989 | Grant et al. |
| 4,949,299 A | 8/1990 | Pickett |

(Continued)

FOREIGN PATENT DOCUMENTS

| CN | 101114999 | 1/2008 |
| CN | 102006283 | 4/2011 |

(Continued)

OTHER PUBLICATIONS

[No Author Listed], "L1 PM Substates with CLKREQ," PCI SIG, Aug. 23, 2012, 33 pages.
(Continued)

*Primary Examiner* — Anh Ngoc M Nguyen
(74) *Attorney, Agent, or Firm* — Fish & Richardson P.C.

(57) ABSTRACT

A client device in a wireless network accesses a queue comprising Transmission Control Protocol Acknowledgement (TCP ACK) packets. At least some packets include packet descriptors with a flow identifier indicating a corresponding TCP flow, and a TCP ACK Generation Count. The device inspects a packet descriptor of a first TCP ACK packet, and identifies a first flow identifier and a first TCP ACK Generation Count. The device accesses entries in a data structure that each includes a first field and a second field respectively storing a flow identifier and a TCP ACK Generation Count. The device determines that a condition is satisfied, comprising that an entry in the data structure includes a flow identifier and a TCP ACK Generation Count matching the first flow identifier and the first TCP ACK (Continued)

Generation Count, respectively. In response to the determination, the device marks the first TCP ACK packet to be dropped.

21 Claims, 18 Drawing Sheets

Related U.S. Application Data continuation-in-part of application No. 17/851,124, filed on Jun. 28, 2022, now Pat. No. 11,876,719.

(60) Provisional application No. 63/225,876, filed on Jul. 26, 2021.

(56) References Cited

U.S. PATENT DOCUMENTS

| | | |
|---|---|---|
| 5,367,688 A | 11/1994 | Croll |
| 5,467,459 A | 11/1995 | Alexander et al. |
| 5,485,578 A | 1/1996 | Sweazey |
| 5,506,968 A | 4/1996 | Dukes |
| 5,613,086 A | 3/1997 | Frey et al. |
| 5,659,542 A | 8/1997 | Bell et al. |
| 5,708,779 A | 1/1998 | Graziano et al. |
| 5,731,973 A | 3/1998 | Takaishi et al. |
| 5,850,395 A | 12/1998 | Hauser et al. |
| 5,903,564 A | 5/1999 | Ganmukhi et al. |
| 5,943,507 A | 8/1999 | Cornish et al. |
| 6,008,992 A | 12/1999 | Kawakami |
| 6,032,179 A | 2/2000 | Osborne |
| 6,216,178 B1 | 4/2001 | Stracovsky et al. |
| 6,233,702 B1 | 5/2001 | Horst et al. |
| 6,260,152 B1 | 7/2001 | Cole et al. |
| 6,349,355 B1 | 2/2002 | Draves et al. |
| 6,359,863 B1 | 3/2002 | Varma et al. |
| 6,411,997 B1 | 6/2002 | Dawes et al. |
| 6,485,081 B1 | 11/2002 | Bingle et al. |
| 6,523,073 B1 | 2/2003 | Kammer et al. |
| 6,553,446 B1 | 4/2003 | Miller |
| 6,693,895 B1 | 2/2004 | Crummey et al. |
| 6,815,873 B2 | 11/2004 | Johnson et al. |
| 6,874,075 B2 | 3/2005 | Jerding et al. |
| 6,948,094 B2 | 9/2005 | Schultz et al. |
| 6,973,701 B2 | 12/2005 | Momoda et al. |
| 6,990,594 B2 | 1/2006 | Kim |
| 7,013,536 B2 | 3/2006 | Golden et al. |
| 7,032,282 B2 | 4/2006 | Powell et al. |
| 7,100,020 B1 | 8/2006 | Brightman et al. |
| 7,111,307 B1 | 9/2006 | Wang |
| 7,127,600 B2 | 10/2006 | Zimmer et al. |
| 7,152,231 B1 | 12/2006 | Galluscio et al. |
| 7,281,172 B2 | 10/2007 | Chujo |
| 7,397,774 B1 | 7/2008 | Holland et al. |
| 7,398,382 B2 | 7/2008 | Rothman et al. |
| 7,403,542 B1 | 7/2008 | Thompson |
| 7,506,084 B2 | 3/2009 | Moerti et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,681,012 B2 | 3/2010 | Verma et al. |
| 7,685,476 B2 | 3/2010 | Andre et al. |
| 7,802,256 B2 | 9/2010 | Havens |
| 7,853,731 B1 | 12/2010 | Zeng |
| 7,899,941 B2 | 3/2011 | Hendry et al. |
| 7,941,682 B2 | 5/2011 | Adams |
| 8,214,707 B2 | 7/2012 | Munson et al. |
| 8,230,248 B2 | 7/2012 | Dance et al. |
| 8,239,947 B1 | 8/2012 | Glick et al. |
| 8,255,725 B2 | 8/2012 | Shimazaki et al. |
| 8,271,996 B1 | 9/2012 | Gould et al. |
| 8,352,624 B2 | 1/2013 | Zimmerman et al. |
| 8,468,285 B2 | 6/2013 | Kobayashi |
| 8,555,099 B2 | 10/2013 | Marinkovic et al. |
| 8,561,090 B2 | 10/2013 | Schneider |
| 8,635,412 B1 | 1/2014 | Wilshire |
| 8,656,228 B2 | 2/2014 | Check et al. |
| 8,769,168 B2 | 7/2014 | Moertl et al. |
| 8,788,822 B1 | 7/2014 | Riddle |
| 8,799,537 B1 | 8/2014 | Zhu et al. |
| 8,806,640 B2 | 8/2014 | Wang |
| 8,819,386 B1 | 8/2014 | Mather |
| 8,848,809 B2 | 9/2014 | Whitby-Strevens |
| 8,855,120 B2 | 10/2014 | Robbins |
| 8,876,062 B1 | 11/2014 | Baghdasarian |
| 9,049,179 B2 | 6/2015 | Luna |
| 9,130,864 B2 | 9/2015 | Keith |
| 9,135,059 B2 | 9/2015 | Ballard et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,483,305 B1 | 11/2016 | Shmidt et al. |
| 9,544,069 B2 | 1/2017 | Whitby-Strevens et al. |
| 9,547,535 B1 | 1/2017 | Wilt |
| 9,594,718 B2 | 3/2017 | Kaushik et al. |
| 9,769,756 B1 | 9/2017 | Cui et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,932,757 B2 | 4/2018 | Hager |
| 9,959,124 B1 | 5/2018 | Herbeck et al. |
| 9,985,904 B2 | 5/2018 | Shalev et al. |
| 10,078,361 B2 | 9/2018 | Sanghi et al. |
| 10,230,608 B2 | 3/2019 | Tsirkin |
| 10,289,555 B1 | 5/2019 | Michaud et al. |
| 10,331,600 B1 | 6/2019 | Rajadnya et al. |
| 10,331,612 B1 | 6/2019 | Petkov et al. |
| 10,534,601 B1 | 1/2020 | Venkata et al. |
| 10,552,072 B1 | 2/2020 | Bono et al. |
| 10,678,432 B1 | 6/2020 | Dreier et al. |
| 10,798,224 B2 | 9/2020 | Masputra et al. |
| 10,798,059 B1 | 10/2020 | Singh et al. |
| 10,819,831 B2 | 10/2020 | Masputra et al. |
| 10,999,132 B1 | 5/2021 | Sagar et al. |
| 11,095,758 B2 | 8/2021 | Masputra et al. |
| 11,146,665 B2 | 10/2021 | Masputra et al. |
| 11,159,651 B2 | 10/2021 | Masputra et al. |
| 11,178,259 B2 | 10/2021 | Masputra et al. |
| 11,178,260 B2 | 11/2021 | Masputra et al. |
| 11,212,373 B2 | 12/2021 | Masputra et al. |
| 11,368,560 B2 | 6/2022 | Masputra et al. |
| 11,477,123 B2 | 10/2022 | Masputra et al. |
| 11,558,348 B2 | 1/2023 | Masputra et al. |
| 11,606,302 B2 | 3/2023 | Shen et al. |
| 11,876,719 B2 * | 1/2024 | Venkataraman ...... H04L 47/193 |
| 2001/0037410 A1 | 11/2001 | Gardner |
| 2002/0013868 A1 | 1/2002 | West |
| 2002/0044553 A1 | 4/2002 | Chakravorty |
| 2002/0053011 A1 | 5/2002 | Aiken et al. |
| 2002/0065867 A1 | 5/2002 | Chauvel |
| 2002/0169938 A1 | 11/2002 | Scott et al. |
| 2002/0195177 A1 | 12/2002 | Hinkley et al. |
| 2003/0014607 A1 | 1/2003 | Slavin et al. |
| 2003/0061395 A1 | 3/2003 | Kingsbury et al. |
| 2003/0120935 A1 | 6/2003 | Teal et al. |
| 2003/0200413 A1 | 10/2003 | Gurumoorthy et al. |
| 2004/0010473 A1 | 1/2004 | Hsu et al. |
| 2004/0010545 A1 | 1/2004 | Pandya |
| 2004/0044929 A1 | 3/2004 | Chujo |
| 2004/0105384 A1 | 6/2004 | Gallezot et al. |
| 2004/0128568 A1 | 7/2004 | O'Shea |
| 2004/0179546 A1 | 9/2004 | McDaniel et al. |
| 2004/0201749 A1 | 10/2004 | Malloy Desormeaux |
| 2004/0221056 A1 | 11/2004 | Kobayashi |
| 2004/0228365 A1 | 11/2004 | Kobayashi |
| 2004/0249957 A1 | 12/2004 | Ekis et al. |
| 2005/0055406 A1 | 3/2005 | Singhai et al. |
| 2005/0060426 A1 | 3/2005 | Samuels et al. |
| 2005/0068896 A1 | 3/2005 | Pazos |
| 2005/0068897 A1 | 3/2005 | Arita et al. |
| 2005/0076196 A1 | 4/2005 | Zimmer et al. |
| 2005/0076244 A1 | 4/2005 | Watanabe |

(56) References Cited

U.S. PATENT DOCUMENTS

| | | |
|---|---|---|
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0138628 A1 | 6/2005 | Bradford et al. |
| 2005/0140683 A1 | 6/2005 | Collins et al. |
| 2005/0149711 A1 | 7/2005 | Zimmer et al. |
| 2005/0157781 A1 | 7/2005 | Ho et al. |
| 2005/0198777 A1 | 9/2005 | Mabe |
| 2005/0278498 A1 | 12/2005 | Ahluwalia et al. |
| 2005/0285862 A1 | 12/2005 | Noda et al. |
| 2006/0039285 A1 | 2/2006 | Chapman et al. |
| 2006/0047989 A1 | 3/2006 | Delgado et al. |
| 2006/0075119 A1 | 4/2006 | Hussain et al. |
| 2006/0107071 A1 | 5/2006 | Girish et al. |
| 2006/0136570 A1 | 6/2006 | Pandya |
| 2006/0176862 A1 | 8/2006 | Ishimori et al. |
| 2006/0186700 A1 | 8/2006 | Browne et al. |
| 2006/0186706 A1 | 8/2006 | Browne et al. |
| 2006/0215697 A1 | 9/2006 | Olderdissen |
| 2006/0218301 A1 | 9/2006 | O'Toole et al. |
| 2006/0232051 A1 | 10/2006 | Morris et al. |
| 2006/0248542 A1 | 11/2006 | Wang et al. |
| 2007/0005869 A1 | 1/2007 | Balraj et al. |
| 2007/0008983 A1 | 1/2007 | Van Doren et al. |
| 2007/0043901 A1 | 2/2007 | Wu et al. |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0086480 A1 | 4/2007 | Elzur |
| 2007/0118831 A1 | 5/2007 | Kondo |
| 2007/0180041 A1 | 8/2007 | Suzuoki |
| 2007/0183418 A1 | 8/2007 | Riddoch et al. |
| 2007/0201492 A1 | 8/2007 | Kobayashi |
| 2007/0226375 A1 | 9/2007 | Chu et al. |
| 2007/0226417 A1 | 9/2007 | Davis |
| 2007/0255802 A1 | 11/2007 | Aloni et al. |
| 2007/0255866 A1 | 11/2007 | Aloni et al. |
| 2007/0261307 A1 | 11/2007 | Alexander |
| 2007/0277074 A1 | 11/2007 | Yeo et al. |
| 2007/0286246 A1 | 12/2007 | Kobayashi |
| 2008/0002578 A1 | 1/2008 | Coffman et al. |
| 2008/0005794 A1 | 1/2008 | Inoue et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0127292 A1 | 5/2008 | Cooper et al. |
| 2008/0148291 A1 | 6/2008 | Huang et al. |
| 2008/0183931 A1 | 7/2008 | Verm et al. |
| 2008/0212487 A1* | 9/2008 | Silvestri ............... H04L 69/16 370/253 |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0006920 A1 | 1/2009 | Munson et al. |
| 2009/0024924 A1 | 1/2009 | Kim |
| 2009/0092057 A1 | 4/2009 | Doctor et al. |
| 2009/0113141 A1 | 4/2009 | Bullman et al. |
| 2009/0138650 A1 | 5/2009 | Lin et al. |
| 2009/0154356 A1* | 6/2009 | Wiemann ............ H04L 69/163 370/236 |
| 2009/0172674 A1 | 7/2009 | Bobak et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0240874 A1 | 9/2009 | Pong |
| 2009/0265723 A1 | 10/2009 | Mochizuki et al. |
| 2009/0322531 A1 | 12/2009 | Estevez et al. |
| 2010/0005014 A1 | 1/2010 | Castle et al. |
| 2010/0017655 A1 | 1/2010 | Gooding et al. |
| 2010/0049876 A1 | 2/2010 | Pope et al. |
| 2010/0057932 A1 | 3/2010 | Pope et al. |
| 2010/0082859 A1 | 4/2010 | Hendry et al. |
| 2010/0098419 A1 | 4/2010 | Levy et al. |
| 2010/0118041 A1 | 5/2010 | Chen et al. |
| 2010/0329319 A1 | 12/2010 | Dai et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0161619 A1 | 6/2011 | Kaminski et al. |
| 2011/0219208 A1 | 9/2011 | Asaad et al. |
| 2011/0242425 A1 | 10/2011 | Zeng |
| 2011/0246742 A1 | 10/2011 | Kogen et al. |
| 2011/0276699 A1 | 11/2011 | Pedersen |
| 2011/0276710 A1 | 11/2011 | Mighani et al. |
| 2011/0292936 A1 | 12/2011 | Wang et al. |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0036334 A1 | 2/2012 | Horman et al. |
| 2012/0072658 A1 | 3/2012 | Hashimoto |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama |
| 2012/0203880 A1 | 8/2012 | Kluyt et al. |
| 2012/0224640 A1 | 9/2012 | Sole Rojals et al. |
| 2012/0229076 A1 | 9/2012 | Zhu et al. |
| 2012/0260017 A1 | 10/2012 | Mine et al. |
| 2013/0039278 A1 | 2/2013 | Bouazizi et al. |
| 2013/0050216 A1 | 2/2013 | Whitby-Strevens et al. |
| 2013/0057567 A1 | 3/2013 | Frank et al. |
| 2013/0067188 A1 | 3/2013 | Mehra et al. |
| 2013/0091772 A1 | 4/2013 | Berger et al. |
| 2013/0111014 A1 | 5/2013 | Lawrie et al. |
| 2013/0138840 A1 | 5/2013 | Kegel et al. |
| 2013/0162911 A1 | 6/2013 | Glen |
| 2013/0204927 A1 | 8/2013 | Kruglikov et al. |
| 2013/0205113 A1 | 8/2013 | Ahmad et al. |
| 2013/0275976 A1 | 10/2013 | Dawson et al. |
| 2013/0290947 A1 | 10/2013 | Li |
| 2013/0347131 A1 | 12/2013 | Mooring et al. |
| 2014/0033220 A1 | 1/2014 | Campbell et al. |
| 2014/0068624 A1 | 3/2014 | Fuller et al. |
| 2014/0068636 A1 | 3/2014 | Dupont et al. |
| 2014/0122695 A1 | 5/2014 | Kulikov et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang |
| 2014/0247983 A1 | 9/2014 | Macinnis et al. |
| 2014/0355606 A1 | 12/2014 | Riddoch et al. |
| 2015/0007262 A1 | 1/2015 | Aissi et al. |
| 2015/0036051 A1 | 2/2015 | Broberg et al. |
| 2015/0058444 A1 | 2/2015 | Willmann |
| 2015/0081985 A1 | 3/2015 | Archer et al. |
| 2015/0156122 A1 | 6/2015 | Singh et al. |
| 2015/0172345 A1 | 6/2015 | Mantin et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0244804 A1 | 8/2015 | Warfield et al. |
| 2015/0261588 A1 | 9/2015 | Liu et al. |
| 2015/0309940 A1 | 10/2015 | Kumar |
| 2015/0326542 A1 | 11/2015 | Serebrin |
| 2015/0363110 A1 | 12/2015 | Batra et al. |
| 2015/0370582 A1 | 12/2015 | Kinsella et al. |
| 2015/0378737 A1 | 12/2015 | Debbage et al. |
| 2016/0028635 A1 | 1/2016 | Wang |
| 2016/0034195 A1 | 2/2016 | Li et al. |
| 2016/0041852 A1 | 2/2016 | Suarez Gracia et al. |
| 2016/0044143 A1 | 2/2016 | Hy |
| 2016/0063258 A1 | 3/2016 | Ackerly |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |

(56) References Cited

U.S. PATENT DOCUMENTS

| | | |
|---|---|---|
| 2016/0208539 A1 | 7/2016 | Hofmann et al. |
| 2016/0224442 A1 | 8/2016 | Sanghi et al. |
| 2016/0226957 A1 | 8/2016 | Zhang et al. |
| 2016/0226967 A1 | 8/2016 | Zhang et al. |
| 2016/0231929 A1 | 8/2016 | Tsirkin |
| 2016/0261632 A1 | 9/2016 | Kolhi et al. |
| 2016/0269991 A1 | 9/2016 | Van Greunen et al. |
| 2016/0315880 A1 | 10/2016 | Guo et al. |
| 2016/0357443 A1 | 12/2016 | Li et al. |
| 2016/0363955 A1 | 12/2016 | Stevens et al. |
| 2016/0364350 A1 | 12/2016 | Sanghi et al. |
| 2016/0378545 A1 | 12/2016 | Ho |
| 2017/0003977 A1 | 1/2017 | Sumida et al. |
| 2017/0003997 A1 | 1/2017 | Kelly et al. |
| 2017/0063498 A1 | 3/2017 | Venkatsuresh et al. |
| 2017/0075856 A1 | 3/2017 | Suzue et al. |
| 2017/0089641 A1 | 3/2017 | Humfeld et al. |
| 2017/0108912 A1 | 4/2017 | Li et al. |
| 2017/0111283 A1 | 4/2017 | Kumar et al. |
| 2017/0124327 A1 | 5/2017 | Kumbhar et al. |
| 2017/0126726 A1 | 5/2017 | Han |
| 2017/0147282 A1 | 5/2017 | Seo |
| 2017/0149890 A1 | 5/2017 | Shamis et al. |
| 2017/0187621 A1 | 6/2017 | Shalev et al. |
| 2017/0187846 A1 | 6/2017 | Shalev et al. |
| 2017/0249098 A1 | 8/2017 | Petkov et al. |
| 2017/0264497 A1 | 9/2017 | Lim |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0308460 A1 | 10/2017 | Guthula et al. |
| 2017/0337588 A1 | 11/2017 | Chittilappilly et al. |
| 2017/0353499 A1 | 12/2017 | Huang et al. |
| 2017/0371591 A1 | 12/2017 | Xia et al. |
| 2018/0004690 A1 | 1/2018 | Kaminski et al. |
| 2018/0070341 A1 | 3/2018 | Islam et al. |
| 2018/0081829 A1 | 3/2018 | Kaplan |
| 2018/0083878 A1 | 3/2018 | Francini et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0131640 A1* | 5/2018 | Kanamarlapudi .... H04L 1/1664 |
| 2018/0173643 A1 | 6/2018 | Yu et al. |
| 2018/0196648 A1 | 7/2018 | Henderson et al. |
| 2018/0219805 A1 | 8/2018 | MacNeil et al. |
| 2018/0219976 A1 | 8/2018 | Decenzo et al. |
| 2018/0239657 A1 | 8/2018 | Petrbok et al. |
| 2018/0248847 A1 | 8/2018 | Guri et al. |
| 2018/0253315 A1 | 9/2018 | Norton et al. |
| 2018/0285561 A1 | 10/2018 | Frank et al. |
| 2018/0295052 A1 | 10/2018 | St. Laurent |
| 2018/0329743 A1 | 11/2018 | Pope et al. |
| 2018/0337866 A1 | 11/2018 | Jung et al. |
| 2018/0338269 A1 | 11/2018 | Bhartia et al. |
| 2018/0343206 A1 | 11/2018 | White et al. |
| 2018/0357176 A1 | 12/2018 | Wang |
| 2019/0007850 A1 | 1/2019 | DenBoer et al. |
| 2019/0036893 A1 | 1/2019 | Jiang |
| 2019/0045388 A1 | 2/2019 | Zhang et al. |
| 2019/0052659 A1 | 2/2019 | Weingarten et al. |
| 2019/0065301 A1 | 2/2019 | Tsirkin et al. |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0140983 A1 | 5/2019 | Tu et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0213166 A1 | 7/2019 | Petkov et al. |
| 2019/0253351 A1 | 8/2019 | Ihlar et al. |
| 2019/0286466 A1 | 9/2019 | Tsirkin et al. |
| 2019/0303204 A1 | 10/2019 | Masputra et al. |
| 2019/0303205 A1 | 10/2019 | Masputra et al. |
| 2019/0303221 A1 | 10/2019 | Masputra et al. |
| 2019/0303222 A1 | 10/2019 | Masputra et al. |
| 2019/0303280 A1 | 10/2019 | Masputra et al. |
| 2019/0303562 A1 | 10/2019 | Masputra et al. |
| 2019/0303576 A1 | 10/2019 | Masputra et al. |
| 2019/0306076 A1 | 10/2019 | Masputra et al. |
| 2019/0306087 A1 | 10/2019 | Masputra et al. |
| 2019/0306109 A1 | 10/2019 | Masputra et al. |
| 2019/0306281 A1 | 10/2019 | Masputra et al. |
| 2019/0306282 A1 | 10/2019 | Masputra et al. |
| 2020/0019695 A1 | 1/2020 | Sovio et al. |
| 2020/0036615 A1 | 1/2020 | Lewis |
| 2020/0045015 A1 | 2/2020 | Nukala et al. |
| 2020/0065244 A1 | 2/2020 | Sanghi et al. |
| 2020/0073829 A1 | 3/2020 | Tsirkin et al. |
| 2020/0195684 A1 | 6/2020 | Linz |
| 2020/0205023 A1 | 6/2020 | Patel |
| 2020/0328966 A1 | 10/2020 | Wang et al. |
| 2021/0011856 A1 | 1/2021 | Xia et al. |
| 2021/0084523 A1 | 3/2021 | Kucera |
| 2021/0097006 A1 | 4/2021 | Masputra et al. |
| 2021/0099391 A1 | 4/2021 | Masputra et al. |
| 2021/0099427 A1 | 4/2021 | Masputra et al. |
| 2021/0391950 A1 | 12/2021 | Paasch et al. |
| 2021/0392080 A1 | 12/2021 | Shen et al. |
| 2022/0030095 A1 | 1/2022 | Masputra et al. |
| 2022/0046117 A1 | 2/2022 | Masputra et al. |
| 2023/0023893 A1 | 1/2023 | Venkataraman et al. |
| 2023/0142354 A1 | 5/2023 | Kugler et al. |
| 2023/0155980 A1 | 5/2023 | Masputra et al. |

FOREIGN PATENT DOCUMENTS

| | | |
|---|---|---|
| EP | 3013008 | 4/2016 |
| JP | H02306082 | 12/1990 |
| JP | H03169996 | 7/1991 |
| JP | 2004086792 | 3/2004 |
| JP | 2012108677 | 6/2012 |
| JP | 2013246642 | 12/2013 |
| JP | 2014507817 | 3/2014 |
| JP | 2015001867 | 1/2015 |
| KR | 10-2020-0026565 | 3/2020 |
| WO | WO 2008701382 | 6/2008 |
| WO | WO 2012095904 | 7/2012 |
| WO | WO 2021212438 | 10/2021 |

OTHER PUBLICATIONS

[No Author Listed], "PCI Express Base Specification Revision 3.0," PCI Express, Nov. 10, 2010, 430 pages.

[No Author Listed], "PCI Express Base Specification Revision 3.1," PCI Express, Oct. 8, 2014, 79 pages.

[No Author Listed], "Universal Serial Bus, Communication Class, Subclass Specifications for Network Control Model (NCM) Devices," Revision 1.0 (Errata 1), Nov. 24, 2010, published by USB Implementers Forum, Inc., 40 pages.

Doc.ic.ac.uk [online], "Improving Networking," Imperial College London, Jun. 14, 2010, retrieved on Aug. 1, 2023, retrieved from URL<https://www.doc.ic.ac.uk/teaching/distinguished-projects/2010/m.whitworth.pdf>, 138 pages.

Gopalakrishnan et al., "Efficient User-Space Protocol Implementations with QoS Guarantees Using Real-Time Upcalls," IEEE/ACM Transactions on Networking, Aug. 1998, 6(4):374-388.

Honda et al., "Rekindling Network Protocol Innovation with User-Level Stacks," ACM SIGCOMM Computer Communication Review, Apr. 2014, 44(2):53-58.

Lee et al., "Context-aware address translation for high-performance SMP cluster system," 2008 IEEE International Conference on Cluster Computing, Tsukuba, 2008, pp. 292-297.

PCI Express Technology, MindShare Press, Sep. 2012, pp. 49, 86, 87, 712-723.

* cited by examiner

| | |
|---|---|
| flow a | ackgen 3 |
| flow c | ackgen 88 |
| flow b | ackgen 41 |
| ... | ... |

FIG. 6

| | | | |
|---|---|---|---|
| flow a | ackgen 3 | packet #10 index | packet #13 index |
| flow c | ackgen 87 | packet #5 index | packet #11 index |
| flow b | ackgen 41 | packet #4 index | packet #7 index |
| ... | ... | ... | ... |

FIG. 7

SYSTEMS AND METHODS FOR MANAGING TRANSMISSION CONTROL PROTOCOL (TCP) ACKNOWLEDGEMENTS

CROSS-REFERENCE TO RELATED APPLICATION

This application is a continuation application of U.S. patent application Ser. No. 18/080,182, filed Dec. 13, 2022, which is a continuation-in-part application of U.S. patent application Ser. No. 17/851,124, filed Jun. 28, 2022, which claims priority to U.S. Provisional Patent Application No. 63/225,876, filed Jul. 26, 2021. The entire contents of both referenced applications are incorporated herein by reference.

TECHNICAL FIELD

The following disclosure relates generally to communication technology, and in particular, to systems, methods and devices directed to Transmission Control Protocol (TCP) Acknowledgement (ACK) transmission in communications networks.

BACKGROUND

TCP is a communication protocol that facilitates exchange of messages between computing devices over a network, for example, an exchange of application data between a client device and a server device that are connected through one or more network connections. TCP is designed to ensure reliable, ordered, and error-checked delivery of data, sent in the form of TCP packets. TCP uses acknowledgement (ACK) packets for reliable transmission.

SUMMARY

The present disclosure describes systems, devices and methods directed to managing transmission of TCP acknowledgement packets (referred to as TCP ACK packets). In some implementations, the disclosed systems, devices and methods are used to manage TCP ACK packets that are sent from a client device to another network device, such as an application server (AS), in response to receiving, at the client device, TCP data and control packets. In some implementations, a baseband (BB) circuitry in the client device examines TCP ACK packets that are queued for transmission to the AS, and drops duplicate TCK ACK packets (for example, TCP ACK packets for the same flow that have the same sequence number) that it determines are redundant. In some implementations, the BBU circuitry determines a TCP ACK packet to be redundant when the TCP ACK packet is a duplicate of one or more other TCP ACK packets and is stamped with a counter value (generated by the TCP application at the client device) that is same as the counter value of the one or more other TCP ACK packets. In some implementations, the client device is an electronic device in a wireless communications network that is connected to the AS through one or more network connections. For example, in some implementations, the client device is a user equipment (UE) in a $3^{rd}$ Generation Partnership Project (3GPP) mobile wireless communications network that is connected to the AS using the 3GPP network. In such cases, the UE manages transmission of the TCP ACK packets in the uplink direction.

TCP is a reliable stream delivery service, in which the recipient of TCP packets responds to the sender with TCP ACK messages as it receives the TCP packets. For reliable transmission, TCP uses a sequence number to identify each byte of data. The sequence number identifies the order of the bytes sent from each computer so that the data can be reconstructed in order, regardless of any packet reordering, or packet loss that can occur during transmission. A TCP ACK is sent with a sequence number by the recipient to tell the sender that data has been received to the specified byte. The sequence number associated with a TCK ACK is cumulative, which serves to acknowledge all data bytes received up that sequence number. In some cases, TCP packets can get lost during transmission, and the recipient can receive a TCP packet with a sequence number that is not continuous in the sequence number chain. In such cases, upon detecting the break in the sequence number chain, the recipient sends a duplicate ACK with the latest sequence number prior to the break. The duplicate ACK is used as a signal for packet loss, triggering the sender to retransmit the last unacknowledged packet. Upon receiving multiple duplicate TCP ACK packets, the sender will retransmit the missing data packet.

In some implementations, duplicate TCP ACKs are part of a failure recovery mechanism ensuring the reliability of TCP protocol. A duplicate acknowledgment is sent when the client device notices a gap between a series of packets or when the client device receives out-of-order data packets. For example, if a client device receives data packets in a sequence: data packet #1-data packet #3-data packet #2, instead of data packet #1-data packet #2-data packet #3, upon receiving packet #3, the client device starts sending duplicate TCP ACKs so the server can start a fast retransmit process.

In some implementations, the TCP protocol uses duplicate ACKs as well as timer timeout to retransmit lost data packets. Duplicate ACKs are used as a part of fast retransmission and data packet recovery. In some implementations, duplicate TCP ACKs are used for intimating the server before timeout occurs. Since the server does not know whether a duplicate TCP ACK is received because of a lost data packet or just because of reordering of data packets, it waits for a small number of duplicate TCP ACKs to be received. If multiple duplicate TCP ACKs are received continuously, it is a strong indication that the data packet has been lost.

In some implementations, a server sending a series of data packets to a client device is allowed to send up to a pre-determined number of unacknowledged data packets to the client device before receiving an TCP ACK packet acknowledging successful receipt of a sent unacknowledged data packet. If the server sending the series of data packets has sent the pre-determined number of unacknowledged data packets, the server has to discontinue sending further sequential packets in the series of data packets and/or resend one or more previously sent data packets until it receives a TCP ACK from the client device. As such, if there is a delay in the client device sending a TCP ACK packet to acknowledge receipt of a data packet sent by the server, the throughput for the communication session with the server is reduced, as sending of data packets by the server is stalled.

In some cases, connections with more latency between the recipient and the sender can have a large number of duplicate TCP ACK packets when a data packet is lost. For example, high latency connections may observe tens or hundreds of duplicate TCP ACK packets for a few lost data packets, which can increase congestion and round trip time, reducing data throughput of the communication session.

Various implementations disclosed herein provide optimization of the TCP connection (also referred to interchangeably as a TCP stream or TCP flow) by dropping duplicate or redundant TCP ACK packets at the recipient (for example, a client device) when sending TCP ACK packets to the sender (for example, an AS). In some implementations, a client device is configured to discard one or more of older TCP ACK packets within the TCP uplink flow (for example, from the client device to the AS), pending in an output queue at the client device, in response to detecting a newer duplicate TCP ACK packet (for example, a TCP ACK packet with the same sequence number at the head of the output queue).

In some implementations, the client device queues TCP uplink (UL) packets, including TCP ACK packets, in memory coupled to the client device until the packets can be transmitted via the network to the AS. The TCP layer within the 3GPP protocol stack of the client device is implemented to inspect the queues, for example, during UL delays when the queues grow, to decide if some of the TCP ACK packets are redundant (for example, have the same sequence number as one or more other TCP ACK packets) and can be dropped before sending. Dropping redundant TCP ACK packets is also referred to as traffic reduction in the present description.

In a general aspect, a client device in a wireless network manages Transmission Control Protocol Acknowledgement (TCP ACK) packet transmission by accessing a queue in memory comprising TCP ACK packets to be transmitted to another device in the wireless network in response to receiving TCP packets from the other device. At least a subset of the TCP ACK packets in the queue include respective packet descriptors, each with a flow identifier indicating a TCP flow associated with the packet, and a TCP ACK Generation Count. The client device inspects a packet descriptor of a first TCP ACK packet of the TCP ACK packets in the queue, and identifies a first flow identifier and a first TCP ACK Generation Count corresponding to the first TCP ACK packet. Upon determining that the first flow identifier and the first TCP ACK Generation Count are valid, the client device accesses entries in a data structure in memory, where each entry includes a first field storing a flow identifier and a second field storing a corresponding TCP ACK Generation Count. The client device determines that a condition is satisfied, wherein the condition includes the data structure includes a first entry having a flow identifier and a TCP ACK Generation Count matching the first flow identifier and the first TCP ACK Generation Count, respectively. In response to determining that the condition is satisfied, the client device marks the first TCP ACK packet to be dropped.

Particular implementations include one or more of the following features.

In some implementations, the condition further includes that a drain rate of a lower layer queue is below a threshold value.

In some implementations, the TCP flow includes uplink data in a plurality of queues. The condition further includes that the first TCP ACK packet corresponds to uplink data in a particular queue of the plurality of queues. The particular queue can have a high priority or a low priority.

In some implementations, the TCP flow includes uplink data transmitted in a plurality of data radio bearers (DRBs). The condition further includes that the first TCP ACK packet corresponds to uplink data transmitted in one or more DRBs. The one or more DRBs can be default DRBs on internet packet data network (PDN). At least one of the one or more DRBs can have a throughput within a given range. The one or more DRBs can also be bidirectional DRBs.

In some implementations, the TCP flow includes uplink data corresponding to a plurality of packet data networks (PDNs). The condition further includes that the first TCP ACK packet corresponds to uplink data transmitted in one or more given PDNs.

In some implementations, the condition further includes that the client device operates in a known power mode.

In some implementations, the TCP flow includes a plurality of internet protocol (IP) packet flows. The condition further includes that the first TCP ACK packet corresponds to uplink data transmitted in one or more given IP packet flows.

In some implementations, the condition further includes that the client device detecting downlink TCP data at baseband.

In some implementations, the first entry in the data structure corresponds to a second TCP ACK packet in the queue, wherein the first TCP ACK packet is generated prior to the second TCP ACK packet, and wherein the position of the first TCP ACK packet in the queue is ahead of the position of the second TCP ACK packet in the queue. In some implementations, the queue is inspected starting with the newest packet first.

In some implementations, the packet descriptors are assigned by a TCP application processor included in the client device and the packet descriptors are inspected by a baseband processor circuitry included in the client device. In some implementations, the application processor assigns the first ACK Generation Count value corresponding to the first flow identifier to a plurality of TCP ACK packets that are generated in a first time interval, and assigns a second ACK Generation Count value corresponding to the second flow identifier to a plurality of TCP ACK packets that are generated in a second time interval that is different from the first time interval, the first ACK Generation Count value being different from the second ACK Generation Count value. In some implementations, the application processor controls a rate at which TCP ACK packets are dropped from the queue by controlling the duration of at least one of the first time interval or the second time interval.

In some implementations, the client device inspects a packet descriptor of a third TCP ACK packet of the TCP packets in the queue, and identifies a third TCP ACK Generation Count and a third flow identifier corresponding to the third TCP ACK packet included in the packet descriptor of the third TCP ACK packet. The client device determines that the third TCP ACK Generation Count is set to an invalid value. In response to the determination, the client device discontinues further processing of the third TCP ACK packet. In some implementations, determining that the TCP ACK Generation Count of the third TCP packet is set to an invalid value comprises determining one of the TCP ACK Generation Count of the third TCP packet is empty, or the TCP ACK Generation Count of the third TCP packet is set to a predetermined invalid value.

In some implementations, the client device inspects packet descriptors of a third TCP ACK packet of the TCP ACK packets in the queue, and identifies a third TCP ACK Generation Count and a third flow identifier corresponding to the third TCP ACK packet included in the packet descriptors of the third TCP ACK packet. The client device determines that the third flow identifier is set to an invalid value. In response to the determination, the client device discontinues further processing of the third TCP ACK packet. In some implementations, determining that the third flow identifier of the third TCP ACK packet is set to an invalid value comprises determining one of a flow identifier is not assigned to the third TCP ACK packet, or the flow identifier of the third TCP packet is set to a predetermined invalid value.

In some implementations, the client device inspects a packet descriptor of a fourth TCP packet of the TCP packets in the queue, and identifies a fourth TCP ACK Generation Count and a fourth flow identifier corresponding to the fourth TCP ACK packet included in the packet descriptor of the fourth TCP ACK packet. The client device determines that the fourth TCP ACK Generation Count and the fourth flow identifier are valid. The client device determines that (i) the fourth flow identifier is the same as the first flow identifier in the first entry in the queue, and (ii) the fourth TCP ACK Generation Count is different than the first TCP ACK Generation Count in the first entry in the queue. In response to the determination, the client device updates the first entry by replacing the first TCP ACK Generation Count stored in the second field of the first entry with the fourth TCP ACK Generation Count.

In some implementations, the client device inspects packet descriptors of a fifth TCP packet of the TCP packets in the queue, and identifies a fifth TCP ACK Generation Count and a fifth flow identifier corresponding to the fifth TCP ACK packet included in the packet descriptors of the third TCP ACK packet. The client device determines that the fifth TCP ACK Generation Count and the fifth flow identifier are valid, and that the data structure does not include an entry corresponding to the fifth flow identifier. In response to the determination, the client device creates a third entry in the data structure, and stores the fifth flow identifier and the fifth TCP ACK Generation Count in the third entry.

In some implementations, the received TCP packets include one or more of application control information and application data.

In some implementations, one or more additional TCP ACK packets are included in the queue, the one or more additional TCP ACK packets having packet descriptors without a TCP ACK Generation Count field.

In some implementations, one or more entries in the data structure include hash values representing flow identifiers, and wherein determining that the data structure includes a first entry storing the first TCP ACK Generation Count and the first flow identifier and the first TCP ACK Generation Count comprises: performing a hash function on the first flow identifier to obtain a first hash value that is represented by a smaller number of bits compared to a number of bits used to represent the first flow identifier; comparing the first hash value to hash values included in the one or more entries in the data structure to determine if there is a match; and in response to the comparison, determining that a hash value included in the first entry matches the first hash value.

In another general aspect, a method performed by a client device in a wireless network for TCP ACK packet transmission comprises: accessing, in memory coupled to the client device, a queue comprising TCP ACK packets to be transmitted to another network device in the wireless network in response to receiving TCP packets from the other network device, wherein at least a subset of the TCP ACK packets include respective packet descriptors that each comprise (i) a flow identifier indicating a TCP flow associated with the packet, and (ii) a TCP ACK Generation Count; inspecting a packet descriptor of a first TCP ACK packet of the TCP ACK packets in the queue; identifying a first flow identifier and a first TCP ACK Generation Count corresponding to the first TCP ACK packet included in the packet descriptor of the first TCP ACK packet; determining that the first flow identifier and the first TCP ACK Generation Count are valid; accessing, in the memory coupled to the client device, a data structure with one or more entries that each include a flow identifier and a corresponding TCP ACK Generation Count; determining that a condition is satisfied, wherein the condition includes that the data structure includes a first entry that includes (i) a flow identifier matching the first flow identifier and (ii) a TCP ACK Generation Count matching the first TCP ACK Generation Count, the first entry further storing a second position field corresponding to the position of a second TCP ACK packet in the queue; in response to the determination, storing the position of the first TCP ACK packet in a first position field in the first entry; based at least on the first position field and the second position field, switching positions of the first TCP ACK packet and the second TCP ACK packet in the queue such that the first TCP ACK packet is moved to a position in the queue previously occupied by the second TCP ACK packet and the second TCP ACK packet is moved to a position in the queue previously occupied by the first TCP ACK packet; and dropping the first TCP ACK packet from the queue.

Particular implementations include one or more of the following features. In some implementations, the first entry in the data structure corresponds to a second TCP ACK packet in the queue, and wherein the first TCP ACK packet is generated prior to the second TCP ACK packet, and wherein the position of the first TCP ACK packet in the queue is ahead of the position of the second TCP ACK packet in the queue.

In some implementations, the queue is inspected starting with the newest packet first.

In some implementations, the packet descriptors are assigned by a TCP application processor included in the client device and the packet descriptors are inspected by a baseband processor circuitry included in the client device. In some implementations, the application processor assigns the first ACK Generation Count value corresponding to the first flow identifier to a plurality of TCP ACK packets that are generated in a first time interval, and assigns a second ACK Generation Count value corresponding to the second flow identifier to a plurality of TCP ACK packets that are generated in a second time interval that is different from the first time interval, the first ACK Generation Count value being different from the second ACK Generation Count value. In some implementations, the application processor controls a rate at which TCP ACK packets are dropped from the queue by controlling the duration of at least one of the first time interval or the second time interval.

In some implementations, the method further comprises: inspecting a packet descriptor of a third TCP ACK packet of the TCP packets in the queue; identifying a third TCP ACK Generation Count and a third flow identifier corresponding to the third TCP ACK packet included in the packet descriptor of the third TCP ACK packet; determining that the third TCP ACK Generation Count is set to an invalid value; and in response to the determination, discontinuing further processing of the third TCP ACK packet. In some implementations, determining that the TCP ACK Generation Count of the third TCP packet is set to an invalid value comprises determining one of: the TCP ACK Generation Count of the third TCP packet is empty, or the TCP ACK Generation Count of the third TCP packet is set to a predetermined invalid value.

In some implementations, the method further comprises: inspecting packet descriptors of a third TCP ACK packet of the TCP ACK packets in the queue; identifying a third TCP ACK Generation Count and a third flow identifier corresponding to the third TCP ACK packet included in the packet descriptors of the third TCP ACK packet; determining that the third flow identifier is set to an invalid value; and in response to the determination, discontinuing further processing of the third TCP ACK packet. In some implementations, determining that the third flow identifier of the third TCP ACK packet is set to an invalid value comprises determining one of: a flow identifier is not assigned to the third TCP ACK packet, or the flow identifier of the third TCP packet is set to a predetermined invalid value.

In some implementations, the method further comprises: inspecting a packet descriptor of a fourth TCP packet of the TCP packets in the queue; identifying a fourth TCP ACK Generation Count and a fourth flow identifier corresponding to the fourth TCP ACK packet included in the packet descriptor of the fourth TCP ACK packet; determining that the fourth TCP ACK Generation Count and the fourth flow identifier are valid; determining that (i) the fourth flow identifier is the same as the first flow identifier in the first entry in the queue, and (ii) the fourth TCP ACK Generation Count is different than the first TCP ACK Generation Count in the first entry in the queue; and in response to the determination, updating the first entry by replacing the first TCP ACK Generation Count stored in the second position field of the first entry with the fourth TCP ACK Generation Count.

In some implementations, the method further comprises: inspecting packet descriptors of a fifth TCP packet of the TCP packets in the queue; identifying a fifth TCP ACK Generation Count and a fifth flow identifier corresponding to the fifth TCP ACK packet included in the packet descriptors of the third TCP ACK packet; determining that the fifth TCP ACK Generation Count and the fifth flow identifier are valid; determining that the data structure does not include an entry corresponding to the fifth flow identifier; and in response to the determination, creating a third entry in the data structure, and storing the fifth flow identifier and the fifth TCP ACK Generation Count in the third entry.

In some implementations, the received TCP packets include one or more of application control information and application data.

In some implementations, one or more additional TCP ACK packets are included in the queue, the one or more additional TCP ACK packets having packet descriptors without a TCP ACK Generation Count field.

In some implementations, one or more entries in the data structure include hash values representing flow identifiers, and wherein determining that the data structure includes a first entry storing the first TCP ACK Generation Count and the first flow identifier and the first TCP ACK Generation Count comprises: performing a hash function on the first flow identifier to obtain a first hash value that is represented by a smaller number of bits compared to a number of bits used to represent the first flow identifier; comparing the first hash value to hash values included in the one or more entries in the data structure to determine if there is a match; and in response to the comparison, determining that a hash value included in the first entry matches the first hash value.

In some implementations, one or more entries in the data structure include hash values representing flow identifiers, and wherein determining that the data structure includes a first entry storing the first TCP ACK Generation Count and the first flow identifier and the first TCP ACK Generation Count comprises: performing a hash function on the first flow identifier to obtain a first hash value that is represented by a smaller number of bits compared to a number of bits used to represent the first flow identifier; comparing the first hash value to hash values included in the one or more entries in the data structure to determine if there is a match; and in response to the comparison, determining that a hash value included in the first entry matches the first hash value.

In another general aspect, a method performed by a TCP application processor in a client device in a wireless network for TCP ACK packet transmission comprises: generating TCP ACK packets for sending to a remote device in the wireless network, each TCP ACK packet including a packet descriptor; and storing, in respective packet descriptors for at least a subset of the TCP ACK packets, (i) a flow identifier indicating a TCP flow associated with the packet, and (ii) a TCP ACK Generation Count; and forwarding the TCP ACK packets, including the subset of the TCP ACK packets, to a baseband processor included in the client device.

Particular implementations include one or more of the following features. In some implementations, the application processor assigns a first ACK Generation Count value to a plurality of TCP ACK packets that are generated in a first time interval, and assigns a second ACK Generation Count value to a plurality of TCP ACK packets that are generated in a second time interval that is different from the first time interval, the first ACK Generation Count value being different from the second ACK Generation Count value. In some implementations, the application processor controls a number of TCP ACK packets that are assigned the first ACK Generation Count value or the second ACK Generation Count value by controlling the duration of at least one of the first time interval or the second time interval.

In some implementations, the method further comprises: determining, by the application processor, that a first TCP ACK packet includes at least one of additional header information or TCP payload information; and in response to the determination, setting an ACK Generation Count value in the packet descriptor of the first TCP ACK packet to a predetermined invalid value.

In some implementations, the method further comprises: determining, by the application processor, that a first TCP ACK packet includes at least one of additional header information or TCP payload information; and in response to the determination, forwarding the first TCP ACK packet to the baseband processor without a TCP ACK Generation Count value.

In some implementations, the method further comprises: determining, by the application processor, that a first TCP ACK packet includes at least one of additional header information or TCP payload information; and in response to the determination, setting the flow identifier in the packet descriptor of the first TCP ACK packet to a predetermined invalid value.

In some implementations, the method further comprises: determining, by the application processor, that a first TCP ACK packet includes at least one of additional header information or TCP payload information; and in response to the determination, forwarding the first TCP ACK packet to the baseband processor without a flow identifier.

Elimination of redundant TCP ACK packets in the UL as disclosed by the described implementations, causes less packet processing and saves on power expenditure in subsequent processing entities; reduction of amount of data to be sent, or re-usage of saved bandwidth by other packet data services; reduction of latency of all sub-sequent UL packets (after the dropped packets); or decrease of TCP RTT (round trip time), which ends up in quicker TCP throughput increase and therefore in higher end-to-end throughput. This can lead to faster and more efficient methods of packet data transmission compared to conventional TCP approaches.

Implementations of the above techniques include methods, apparatus, and computer program products. One such computer program product is suitably embodied in one or more non-transitory machine-readable media storing instructions that, when executed by one or more processors, are configured to cause the one or more processors to perform the above-described actions. One such apparatus includes comprises processing circuitry to execute instructions to perform the above-described actions. The instructions may be stored in memory coupled to the apparatus. In some implementations, the apparatus is a baseband processor for a client device (for example, a UE) in a wireless network.

BRIEF DESCRIPTION OF THE DRAWINGS

FIG. 6 illustrates a data structure for managing TCP ACK packets according to some disclosed implementations.

FIG. 7 illustrates a second data structure for managing TCP ACK packets with reordering according to some disclosed implementations.

DETAILED DESCRIPTION

Figure 1:
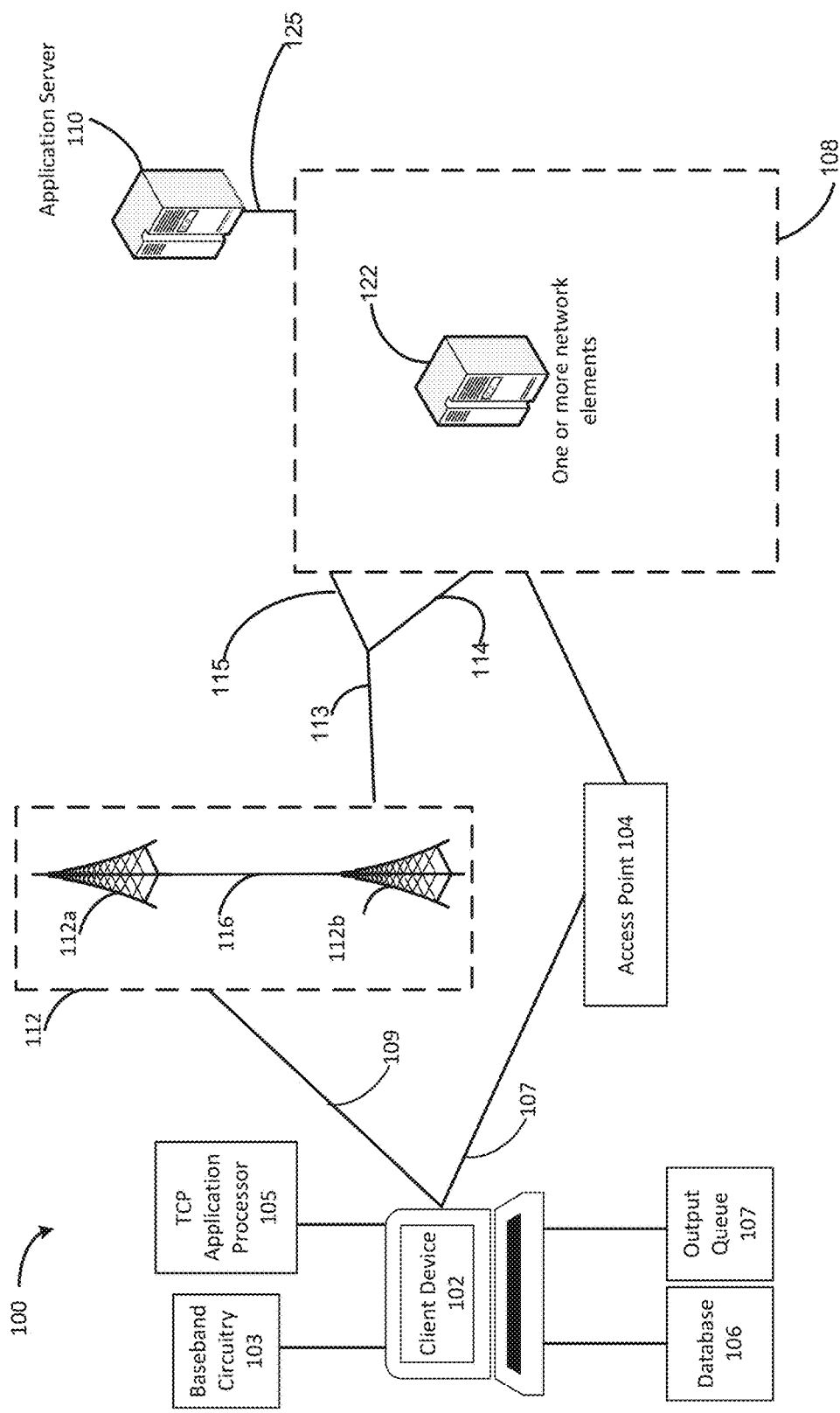
FIG. 1 illustrates a block diagram of a communications system according to some disclosed implementations.

TCP is a network communications protocol that enables reliable exchange of data between two host devices (for example, a client device and a server, such as an AS) over a communications network, for example a 3GPP wireless communications network. TCP is a connection-oriented protocol; hardware and software operations performed by a host device that implements the TCP protocol in its protocol stack (generally referred to as TCP in this disclosure) is responsible for establishing a connection with another host device and maintaining the connection for data transmission. In the following description, the disclosed TCP improvements are described, without loss of generality, with respect to a client device (for example, an UE) and a server (for example, an AS) that communicate through a 3GPP wireless network. It should be understood that the disclosed technologies are equally applicable to TCP connections between other types of host devices, or in other types of networks, or both.

TCP uses a mechanism called three-way handshake to make a connection between a server and a client device. It is a three-step process that requires both the client device and the server to exchange synchronization and acknowledgment packets before real data packets can be exchanged. In the three-way handshake, a synchronization (SYN) message is used to initiate and establish a connection. The SYN message also helps to synchronize sequence numbers between the devices. As an illustrative example, the client device requests a connection by sending a SYN message to the server. The server acknowledges by sending a SYN-ACK (synchronize-acknowledge) message back to the client. The client device responds with an ACK message, and the connection is established.

When a TCP data packet (also referred to simply as a data packet) is sent by the server to the client device, the client device sends a TCP ACK packet indicating that the TCP data packet was received. The client device chooses an initial sequence number, set in the first SYN packet. The server also chooses its own initial sequence number, set in the SYN ACK packet. Each side acknowledges each other's sequence number by incrementing it, this is the acknowledgement number. The use of sequence and acknowledgement numbers allows both sides to detect missing, lost, or out-of-order data packets. For example, when the server sends a TCP data packet to a client device, the client device acknowledges it by responding with a TCP ACK packet.

In some implementations, the client device generates a TCP ACK in response to receiving a TCP data packet and temporarily stores the TCP ACK in an output queue maintained by the client device, until the TCP ACK can be transmitted to the server. One or more additional TCP ACK packets can also be waiting to be sent out to the server. At times, duplicate TCP ACKs are added to the output queue In some implementations, the available downlink (DL) bandwidth is greater than the available uplink (UL) bandwidth. In some cases, constraints in the available UL bandwidth inhibit transmission of TCP ACK packets at the same rate at which TCP data packets are received from the server. A large number of TCP ACKs can be stored in the output queue during periods of UL delay. As a result, sending of data packets from the server can be stalled due to the delay in transmission of TCP ACK packets, leading to degradation in throughput.

The implementations disclosed herein provide optimization of uplink TCP stream by dropping duplicate TCP ACK packets in the output queue of the client device. As described in detail in the following sections, in some implementations, the BB circuitry in the client device (also referred to as a baseband unit, BBU) is configured to discard one or more of the older TCP ACK packets pending in the output queue, in response to detecting a newer duplicate TCP ACK packet. In some other implementations, the operations are configured to discard one or more of the newer TCP ACK packets pending in the output queue, in response to detecting an older duplicate TCP ACK packet. In the following sections, the techniques are described with respect to implementations in which one or more older duplicate TCP ACK packets are discarded. However, it should be understood that the techniques are equally applicable to implementations in which one or more newer duplicate TCP ACK packets are discarded.

The client device uses a counter, referred to as TCP ACK Generation Count, to track TCP ACK packets that are potential duplicates. In some implementations, processes implementing the TCP application in the client device (also referred to as application processor, AP) generate the TCP ACK Generation Count value (also referred to as ACK Gen Count) and stamps TCP ACK packets with the counter value before the packets are sent to the BBU circuitry for uplink transmission. In some implementations, the AP increments the counter every n milliseconds (where n is a positive integer). The AP stamps TCP ACK packets within one n millisecond interval with the same counter value that is generated for the particular time interval. In some implementations, n is set to a predetermined value, for example, as a design parameter. In other implementations, the TCP AP 105 is configured to modify the value of n dynamically at runtime, for example, according to the current throughput.

Upon receiving the TCP ACK packets from the AP, the BBU temporarily stores the packets in an output queue until UL transmission. In some implementations, the BBU uses the counter value to decide if some of the TCP ACK packets in the output queue are redundant and can be dropped. This can be the case, for example, during UL transmission delays, when the queue length grows large. By using the counter value, the BBU ensures that at least one TCP ACK packet within a certain time period (for example, n milliseconds) is sent in the UL direction on the 3GPP network to the server, such that the TCP connection is kept stable even if some of TCP ACK packets dropped. The server starts retransmitting the data packet after receiving a first duplicate TCP ACK packet.

FIG. 1 illustrates an example wireless communications system 100 that realizes the disclosed TCP ACK management techniques. The system 100 includes client device 102, access point (AP) 104, radio access network (RAN) 112, core network (CN) 108 and an application server (AS) 110.

For purposes of convenience and without limitation, the system 100 is described in the context of Long Term Evolution (LTE) and Fifth Generation (5G) New Radio (NR) communication standards as defined by 3GPP technical specifications. More specifically, the wireless communication system 100 is described in the context of a Non-Standalone (NSA) network that incorporate both LTE and NR, for example, E-UTRA (Evolved Universal Terrestrial Radio Access)-NR Dual Connectivity (EN-DC) network, and NE-DC network. However, the system 100 can also be a Standalone (SA) network that incorporates only NR. The system 100 can also implement other types of communication standards, including future 3GPP systems (for example, Sixth Generation (6G) systems), IEEE 802.16 protocols (for example, WMAN, WiMAX, etc.), or the like.

In some implementations, the client device 102 is a UE (and can be alternatively referred herein as UE 102). Although a single client device 102 is shown, it should be understood that the system 100 can include a plurality of client devices, and the disclosed techniques are equally applicable to these client devices. A client device or UE 102 can be any suitable type of mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some implementations, the client device 102 is an Internet of Things (IoT) client device, which can include a network access layer designed for low-power IoT applications utilizing short-lived client device connections. An IoT client device can utilize technologies such as machine-to-machine (M2M) communication or machine-type communication (MTC) for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data can be a machine-initiated exchange of data. An IoT network describes interconnecting IoT client devices, which can include uniquely identifiable embedded computing devices (within the Internet infrastructure), with short-lived connections. The IoT client devices can execute background applications (for example, keep-alive messages, status updates, etc.) to facilitate the connections of the IoT network.

As shown, the client device 102 includes a baseband (BB) circuitry 103 (also referred to as BBU 103), a TCP application processor (AP) 105, a database 106, and an output queue 107. In some implementations, the client device 102 includes one or more processors that are configured to execute instructions stored in memory coupled the client device (for example, storage memory) to perform various functions, such as the procedures, methods, functions, discussed herein. The functions include operations performed by the baseband circuitry 103 and the TCP AP 105, which are described below.

The network 108 can be embodied as any network that can support communication between two networked-connected devices, such as between the client device 102 and an application server 110(*a*). The network 108 can, for example, be embodied as a wireline network (for example, an Ethernet network, wired local area network, fiber network, wireline network that can be maintained by a telephone/cable service provider, some combination thereof, or the like), a wireless network (for example, a cellular network, wireless local area network, wireless wide area network, some combination thereof, or the like), or a combination thereof, and in some example implementations can include the Internet.

In some implementations, client device 102 connects with an access network (AN) or radio access network (RAN) 112. In some examples, the RAN 112 can be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" or the like can refer to a RAN that operates in a 5G NR system 100, and the term "E-UTRAN" or the like can refer to a RAN that operates in an LTE or 4G system 100 The client device 102 utilizes connection (or channels) 109, respectively, each of which comprises a physical communications interface or layer.

In this example, the connection 109 is illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any other suitable wireless communications protocol As shown, the client device 102 is connected to an access point (AP) 104 (also referred to as "WLAN node," "WLAN," "WLAN Termination," "WT" or the like) via connection 107. The connection 107 can comprise a local wireless connection, such as a connection consistent with any IEEE 802.11 protocol, wherein the AP would comprise a wireless fidelity (Wi-Fi®) router. In various implementations, the client device 102, RAN 112, and AP 104 can be configured to utilize LWA operation and/or LWIP operation. The LWA operation can involve the client device 102 in RRC_CONNECTED being configured by a RAN node 112*a-b* to utilize radio resources of LTE and WLAN. LWIP operation can involve the client device 102 using WLAN radio resources (for example, connection 107) via IPsec protocol tunneling to authenticate and encrypt packets (for example, IP packets) sent over the connection 107. IPsec tunneling can include encapsulating the entirety of original IP packets and adding a new packet header, thereby protecting the original header of the IP packets.

The RAN 112 can include one or more AN nodes or RAN nodes 112*a* and 112*b* (collectively referred to as "RAN node 112*a*" or "RAN node 112*b*" or "RAN nodes 112 *a-b*") that enable the connection 109. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (for example, terrestrial access points) or satellite stations providing coverage within a geographic area (for example, a cell). As used herein, the term "NG RAN node" or the like can refer to a RAN node 112 that operates in an NR or 5G system 100 (for example, a gNB), and the term "E-UTRAN node" or the like can refer to a RAN node 112 that operates in an LTE or 4G system (for example, an eNB). According to various implementations, the RAN nodes 112*a-b* can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 112*a-b* can be implemented as one or more software entities running on server computers as part of a virtual network, which can be referred to as a CRAN and/or a virtual baseband unit pool (vBBUP). In these implementations, the CRAN or vBBUP can implement a RAN function split, such as a PDCP split wherein RRC and PDCP layers are operated by the CRAN/vBBUP and other L2 protocol entities are operated by individual RAN nodes 112*a-b*; a MAC/PHY split wherein RRC, PDCP, RLC, and MAC layers are operated by the CRAN/vBBUP and the PHY layer is operated by individual RAN nodes 112*a-b*; or a "lower PHY" split wherein RRC, PDCP, RLC, MAC layers and upper portions of the PHY layer are operated by the CRAN/vBBUP and lower portions of the PHY layer are operated by individual RAN nodes 112*a-b*. This virtualized framework allows the freed-up processor cores of the RAN nodes 112*a-b* to perform other virtualized applications. In some implementations, an individual RAN node 112*a-b* can represent individual gNB-DUs that are connected to a gNB-CU via individual F1 interfaces (not shown). In these implementations, the gNB-DUs can include one or more remote radio heads or RFEMs, and the gNB-CU can be operated by a server that is located in the RAN 112 (not shown) or by a server pool in a similar manner as the CRAN/vBBUP.

Additionally or alternatively, one or more of the RAN nodes 112*a-b* can be next generation eNBs (ng-eNBs), which are RAN nodes that provide E-UTRA user plane and control plane protocol terminations toward the client device 102, and are connected to a 5GC via an NG interface (discussed infra).

In vehicle-to-everything (V2X) scenarios one or more of the RAN nodes 112*a-b* can be or act as Road Side Units (RSUs). The term "Road Side Unit" or "RSU" can refer to any transportation infrastructure entity used for V2X communications. An RSU can be implemented in or by a suitable RAN node or a stationary (or relatively stationary) UE, where an RSU implemented in or by a UE can be referred to as a "UE-type RSU," an RSU implemented in or by an eNB can be referred to as an "eNB-type RSU," an RSU implemented in or by a gNB can be referred to as a "gNB-type RSU," and the like. In one example, an RSU is a computing device coupled with radio frequency circuitry located on a roadside that provides connectivity support to passing vehicle client device. The RSU can also include internal data storage circuitry to store intersection map geometry, traffic statistics, media, as well as applications/software to sense and control ongoing vehicular and pedestrian traffic. The RSU can operate on the 5.9 GHz Direct Short Range Communications (DSRC) band to provide very low latency communications required for high speed events, such as crash avoidance, traffic warnings, and the like. Additionally or alternatively, the RSU can operate on the cellular V2X band to provide the aforementioned low latency communications, as well as other cellular communications services. Additionally or alternatively, the RSU can operate as a Wi-Fi hotspot (2.4 GHz band) and/or provide connectivity to one or more cellular networks to provide uplink and downlink communications. The computing device(s) and some or all of the radiofrequency circuitry of the RSU can be packaged in a weatherproof enclosure suitable for outdoor installation, and can include a network interface controller to provide a wired connection (for example, Ethernet) to a traffic signal controller and/or a backhaul network.

Any of the RAN nodes 112*a-b* can terminate the air interface protocol and can be the first point of contact for the client device 102. In some implementations, any of the RAN nodes 112*a-b* can fulfill various logical functions for the RAN 112*a-b* including, but not limited to, radio network controller (RNC) functions such as radio bearer management, uplink and downlink dynamic radio resource management and data packet scheduling, and mobility management.

In implementations, the client device 102 can be configured to communicate using OFDM communication signals with each other or with any of the RAN nodes 112*a-b* over a multicarrier communication channel in accordance with various communication techniques, such as, but not limited to, an OFDMA communication technique (for example, for downlink communications) or a SC-FDMA communication technique (for example, for uplink and ProSe or sidelink communications), although the scope of the implementations is not limited in this respect. The OFDM signals can comprise a plurality of orthogonal subcarriers.

In some implementations, a downlink resource grid can be used for downlink transmissions from any of the RAN nodes 112*a-b* to the client device 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various implementations, the client device 102 and the RAN nodes 112a-b communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 3.8 GHz, whereas the unlicensed spectrum can include the 5 GHz band. NR in the unlicensed spectrum can be referred to as NR-U, and LTE in an unlicensed spectrum can be referred to as LTE-U, licensed assisted access (LAA), or MulteFire.

To operate in the unlicensed spectrum, the client device 102 and the RAN nodes 112a-b can operate using LAA, eLAA, and/or feLAA mechanisms. In these implementations, the Client device 102 and the RAN nodes 112a-b can perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

LBT is a mechanism whereby equipment (for example, client device 102 RAN nodes 112a-b, etc.) senses a medium (for example, a channel or carrier frequency) and transmits when the medium is sensed to be idle (or when a specific channel in the medium is sensed to be unoccupied). The medium sensing operation can include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (for example, a mobile station (MS) such as client device 102, AP 104, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, can have an LAA contention window that is variable in length between X and Y ECCA slots, where X and Y are minimum and maximum values for the CWSs for LAA. In one example, the minimum CWS for an LAA transmission can be 9 microseconds (s); however, the size of the CWS and a MCOT (for example, a transmission burst) can be based on governmental regulatory requirements.

The LAA mechanisms are built upon CA technologies of LTE-Advanced systems. In CA, each aggregated carrier is referred to as a CC. A CC can have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells can differ, for example, because CCs on different frequency bands will experience different pathloss. A primary service cell or PCell can provide a PCC for both UL and DL, and can handle RRC and NAS related activities. The other serving cells are referred to as SCells, and each SCell can provide an individual SCC for both UL and DL. The SCCs can be added and removed as required, while changing the PCC can require the client device 102 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the client device 102. The PDCCH carries information about the transport format and resource allocations related to the PDSCH channel, among other things. It can also inform the client device 102 about the transport format, resource allocation, and HARQ information related to the uplink shared channel. Typically, downlink scheduling (assigning control and shared channel resource blocks to the client device 102 within a cell) can be performed at any of the RAN nodes 112a-b based on channel quality information fed back from any of the client device 102. The downlink resource assignment information can be sent on the PDCCH used for (for example, assigned to) each of the Client device 102.

The PDCCH uses CCEs to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (for example, aggregation level, L=1, 2, 4, or 8).

Some implementations can use concepts for resource allocation for control channel information that are an extension of the above-described concepts. For example, some implementations can utilize an EPDCCH that uses PDSCH resources for control information transmission. The EPDCCH can be transmitted using one or more ECCEs. Similar to above, each ECCE can correspond to nine sets of four physical resource elements known as EREGs. An ECCE can have other numbers of EREGs in some situations.

The RAN nodes 112a-b can be configured to communicate with one another via interface 116. In implementations where the system 100 is an LTE system the interface 116 can be an X2 interface 116. The X2 interface can be defined between two or more RAN nodes 112a-b (for example, two or more eNBs and the like) that connect to EPC 108, and/or between two eNBs connecting to EPC 108. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a MeNB to an SeNB; information about successful in sequence delivery of PDCP PDUs to a client device 102 from an SeNB for user data; information of PDCP PDUs that were not delivered to a client device 102; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In implementations where the system 100 is a 5G or NR system, the interface 116 can be an Xn interface 116. The Xn interface is defined between two or more RAN nodes 112a-b (for example, two or more gNBs and the like) that connect to 5GC 108, between a RAN node 112a-b (for example, a gNB) connecting to 5GC 108 and an eNB, and/or between two eNBs connecting to 5GC 108. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for client device 102 in a connected mode (for example, CM-CONNECTED) including functionality to manage the UE mobility for connected mode between one or more RAN nodes 112a-b. The mobility support can include context transfer from an old (source) serving RAN node 112a-b to new (target) serving RAN node 112a-b; and control of user plane tunnels between old (source) serving RAN node 112a-b to new (target) serving RAN node 112a-b. A protocol stack of the Xn-U can include a transport network layer built on Internet Protocol (IP) transport layer, and a GTP-U layer on top of a UDP and/or IP layer(s) to carry user plane PDUs. The Xn-C protocol stack can include an application layer signaling protocol (referred to as Xn Application Protocol (Xn-AP)) and a transport network layer that is built on SCTP. The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 112 is shown to be communicatively coupled to a core network in this implementation, core network (CN) 108. The CN 108 can comprise a plurality of network elements 122, which are configured to offer various data and telecommunications services to customers/subscribers (for example, users of client device 102) who are connected to the CN 108 via the RAN 112. The components of the CN 108 can be implemented in one physical node or separate physical nodes including components to read and execute instructions from a machine-readable or computer-readable medium (for example, a non-transitory machine-readable storage medium). In some implementations, NFV can be utilized to virtualize any or all of the above-described network node functions via executable instructions stored in one or more computer-readable storage mediums (described in further detail below). A logical instantiation of the CN 108 can be referred to as a network slice, and a logical instantiation of a portion of the CN 108 can be referred to as a network sub-slice. NFV architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

In some implementations, the application server (AS) 110 is a network server that uses IP bearer resources with the core network (for example, UMTS PS domain, LTE PS data services, etc.). The AS 110 can also be configured to support one or more communication services (for example, VoIP sessions, PTT sessions, group communication sessions, social networking services, etc.) for the client device 102 via the EPC 108. As described in the following sections, in some implementations, the client device 102 establishes a TCP session with the AS 110, and uses the optimized TCP protocol disclosed in this specification. In such implementations, the TCP AP 107 in the client device 102 provides the TCP-ACK Generation Count to enable the BB circuitry 103 to track TCP ACK packets that are duplicates. The TCP AP 107 generates the TCP-ACK Generation Count value (ack_gen_count) for TCP ACK packets and provides the counter value to the BB circuitry 103. The TCP AP 107 also increments the counter every n milliseconds.

In implementations, the CN 108 can be a 5GC (referred to as "5GC 108" or the like), and the RAN 112 can be connected with the CN 108 via an NG interface 113. In implementations, the NG interface 113 can be split into two parts, an NG user plane (NG-U) interface 114, which carries traffic data between the RAN nodes 112a-b and a UPF, and the S1 control plane (NG-C) interface 115, which is a signaling interface between the RAN nodes 112a-b and AMFs.

In implementations, the CN 108 can be a 5G CN (referred to as "5GC 108" or the like), while in other implementations, the CN 108 can be an EPC). Where CN 108 is an EPC (referred to as "EPC 108" or the like), the RAN 112 can be connected with the CN 108 via an S1 interface 113. In implementations, the S1 interface 113 can be split into two parts, an S1 user plane (S1-U) interface 114, which carries traffic data between the RAN nodes 112a-b and the S-GW, and the S1-MME interface 115, which is a signaling interface between the RAN nodes 112a-b and MMEs.

In some implementations, client device 102 receives data for a communication session from the AS 110 via the CN 108 and the AN 112 on the downlink channel. The AS 110 sends the data using TCP, as TCP data packets. The client device 102 acknowledges successful receipt of the TCP data packets by sending acknowledgments (for example, TCP ACK packets) to the AS 110. The TCP data packets are identifiable using sequence numbers. A TCP ACK sent by the client device 102 indicates one or more successfully received data packet by including the sequence number of the most recent TCP data packet received in a continuous chain of sequence numbers, i.e., without any sequence number missing due to the corresponding TCP data packet not having been received.

As noted previously, in some implementations, the client device 102 includes a BB circuitry 103. BB circuitry 103 can be embodied as hardware circuitry, or as a computer program product with computer readable program instructions stored on a computer readable medium (for example, storage memory) and executed by a processing device (for example, baseband circuitry 1010 described with respect to FIG. 10), or some combination thereof. As previously described, client device 102 is configured to generate TCP ACK packets and adds the TCP ACK packets to an output queue that is maintained by the client device 102 for pending TCP packets waiting for uplink transmission, for example, for uplink to the AN 112, for sending to the AS 110.

In some implementations, BB circuitry 103 tracks one or more TCP connections or TCP packet flows and maintains the detailed information for each tracked TCP connection or flow. The BB circuitry 103 tracks most recent TCP ACK information along with timestamp at which the TCP ACK was received, sequence number of the most recent data packets, the timestamp at which these data packets were received, and the number of unacknowledged data packets. In some implementations, the BB circuitry 103 stores these information in memory coupled to the client device 102, for example, in the database 106.

The TCP packets sent by the AS 110 are associated with one or more different communications sessions. In some implementations, the TCP AP 105 identifies the different communications sessions using distinct TCP flow identifiers (referred to as flow IDs). In some implementations, a flow ID corresponds to either a 5-tuple (source IP address, source TCP/UDP port, destination IP address, destination TCP/UDP port and IP protocol) or a 3-tuple (source IP address, destination IP address, IP protocol). The flow ID uniquely identifies the flow associated with a TCP data packet and a corresponding TCP ACK packet. The TCP AP 105 determines, for each a TCP data packet that is received at the client device 102, the corresponding flow ID. In some implementations, the TCP AP 105 provides different TCP ACK Generation Count values to be associated with TCP ACK packets for different flows. In other implementations, the TCP AP 105 provides the same TCP ACK Generation Count values to be associated with TCP ACK packets for different flows. The TCP AP 105 includes, in a packet descriptor prepared for a TCP ACK packet that is generated, a flow ID determined for the corresponding TCP data packet, and the TCP ACK Generation Count for the particular flow in the present time interval. The packet descriptors are stored in the database(s) 106. Information including but not limited to total packet count, total byte count and the last time a packet was seen is maintained for each of the flows.

In some implementations, the TCP AP 105 does not provide flow IDs for some TCP packets. This can be the case, for example, because of external traffic via tethering, or because the packet does not contain all fields that are needed to generate a flow ID. In such cases, the BB circuitry 103 considers these TCP ACK packets as invalid for traffic reduction, and ignores these packets when examining the output queue 107 for redundant packets.

In some implementations, BB circuitry 103 tracks, for example using a timer, a time period for which TCP ACK packets are waiting in the output queue before UL transmission. If the value of the timer exceeds a predetermined value that indicates that the time period for queueing TCP ACK packets longer than a specified threshold (for example, due to congestion in the uplink channel), then the BB circuitry 103 examines the TCP ACK packets in the output queue 107 to determine if some TCP ACK packets can be dropped. The threshold can be set to the predetermined time period. In some implementations, the threshold is set to n milliseconds, for example, in synchrony with the time interval in which the TCP AP 105 updates the ACK Gen Count value. In such implementations, using the ACK Gen Count value ensures that at least one TCP ACK packet for a flow within a particular time period (for example, n milliseconds (msec)) is transmitted in the UL direction to the network 108, while remaining TCP ACK packets for the flow in the particular time period are dropped. In this way, the BB circuitry 103 reduces network congestion by removing redundant TCP ACK packets, while keeping the TCP connection stable.

Additionally or alternatively, in some implementations, the BB circuitry 103 tracks, for example, using a counter, the number of TCP ACK packets that are waiting in the output queue before UL transmission. If a value of the counter exceeds a predetermined value, indicating that the number of TCP ACK packets queued is greater than a specified number (for example, due to congestion in the uplink channel), then the BB circuitry 103 examines the TCP ACK packets in the queue to determine if some TCP ACK packets can be dropped. The specified number can be equivalent to the predetermined number. The specified number can be set to any suitable value depending on the implementation. For example, the specified number can be set to 3, 12, 27, or any other suitable number The BB circuitry 103 accordingly can be configured to monitor a number of TCP ACK packets pending in the output queue 107 and, if the number of pending TCP ACK packets reaches the predetermined threshold limit, detect occurrence of one or more redundant TCP ACK packets for a flow.

Figure 2:
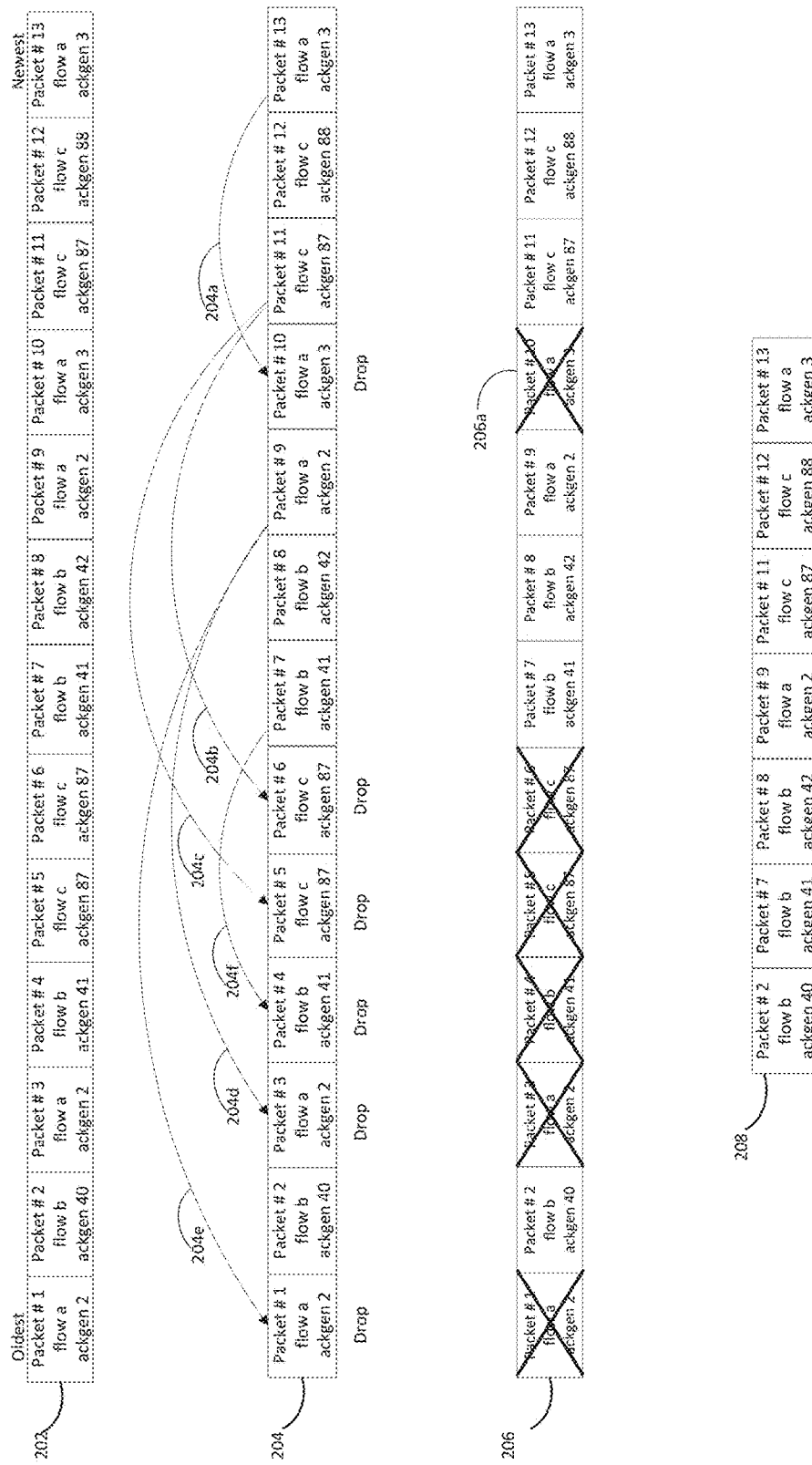
FIG. 2 illustrates optimization of TCP ACK packets according to some disclosed implementations.

In some implementations, as described in greater detail in the following sections, the BB circuitry 103 discards one or more older duplicate TCP ACK packets with the same flow ID and ACK Gen Count as a newer TCP ACK packet pending in the output queue 107. In some implementations, at least one most recent TCP ACK packet with the same flow ID and ACK Gen Count remains pending in the output queue 107 after the one or more redundant TCPACK packets has been discarded. In some implementations TCP ACK packets are identified using a time stamp, which indicates a time at which the TCP ACK packet was generated or added to the output queue 107. In some cases, one or more TCP ACK packets with earlier time stamps are discarded when a TCP ACK packet with the same flow ID and ACK Gen Count, but having a more recent time stamp value, is also in the output queue. In some other cases, one or more TCP ACK packets with more recent time stamps are discarded when a TCP ACK packet with the same flow ID and ACK Gen Count, but having an earlier time stamp value, is also in the output queue FIG. 2 illustrates optimization of a TCP ACK packet flow according to some disclosed implementations. FIG. 2 shows configuration 202 of the output queue prior to optimization; configurations 204 and 206 of the output queue during optimization to identify and remove redundant TCP ACK packets, and configuration 208 of the output queue after the optimization is completed. In some implementations, the operations described with respect to FIG. 2 are performed by the BB circuitry 103, and the configurations 202-208 correspond to the output queue 107.

Each of the configurations 202-208 show an arrangement of TCP ACK packets in the output queue, with each packet identified by a packet number (for example, "packet #1"), a flow ID (for example, "flow a"), and an ACK Gen Count value ("ackgen") associated with the flow (for example, "ackgen 2"). As shown, the queue includes multiple TCP ACK packets with different flow IDs and corresponding ACK Gen Count values, which are assigned by the TCP AP 105. In some implementations, the TCP ACK packets are arranged in order from the oldest to the newest packet, with packet #1 being the oldest and packet #13 being the newest. The oldest TCP ACK packet (packet #1) in the TCP ACK queue (202) has a flow ID "flow a" and ACK Gen Count "ackgen 2" and the newest TCP ACK packet (packet #13) has the flow ID "flow a" and ACK Gen Count "ackgen 3."

The configuration 202 illustrates that the output queue includes multiple TCP ACK packets with the same flow ID and the same ACK Gen Count, before the BB circuitry 103 optimizes the queue. For example, packet #1, packet #3 and packet #9 have flow ID "flow a" and ACK Gen Count "ackgen 2." In some implementations, packet #1, packet #3 and packet #9 are processed by the TCP AP 105 in the same time period, such that TCP AP 105 stamps each of these packets with the same ACK Gen Count value. When optimizing the output queue 107, the BB circuitry 103 identifies one or more of these TCP ACK packets, which have the same flow ID and ACK Gen Count values, as redundant duplicate ACK packets, which are then removed from the queue.

The configuration 202 illustrates that the output queue also includes multiple TCP ACK packets with the same flow ID., but with different ACK Gen Count values; and TCP ACK packets with different flow IDs. For example, packets #1 and #10 have the same flow ID "flow a," but different ACK Gen Count values, respectively, "ackgen 2" and "ackgen 3." In some implementations, packet #1 and packet #10 for "flow a" are processed by the TCP AP 105 in different time periods, such that TCP AP 105 stamps these packets with different ACK Gen Count values. As another example, Packet #1 and Packet #2 have different flow IDs, respectively, "flow a" and "flow b." These TCP ACK packets, which have the same flow ID but different ACK Gen Count values, or different flow IDs, are not identified as redundant with respect to one another.

In some implementations, packet descriptors (for example, flow ID and ACK Gen Count) for TCP ACK packets in the queue are stored in the database 106, for example, in a data structure, such as a table, as described with respect to FIG. 6. In some implementations, the BB circuitry 103 manages the table. Upon inspecting a packet and obtaining the associated flow ID and ACK Gen Count, if the flow ID is not already present in the database 106, BB circuitry 103 records the information in an entry in the database 106 data structure. As described in greater detail in the following sections, the BB circuitry 103 manages the TCP ACK packets in the output queue 107 by examining the corresponding packet descriptor entries in the database 106 to identify redundant TCP ACK packets To inspect a TCP ACK packet in the output queue, the BB circuitry 103 accesses the corresponding entry for the packet in the database, and compares related fields from the packet descriptor of the packet with the values stored in the entries in the database 106, which correspond to other TCP ACK packets in the output queue 107. As described previously, in some implementations, when checking a TCP ACK packet stored in the output queue for redundancy, BB circuitry 103 first checks whether the ACK Gen Count or the flow ID for the packet is valid, or both. If the BB circuitry 103 determines that the ACK Gen Count of the current packet being inspected is invalid, then the BB circuitry marks the database entry for the TCP ACK packet as invalid for reduction (for example, not a candidate for removal as a redundant TCP ACK packet) and moves on to the next entry in the database, for example, for the next packet in the output queue. In some implementations, the TCP AP 105 sets the ACK Gen Count for a packet as invalid, when it determines that the TCP ACK packet contains important information. This can be the case, for example, for TCP ACKs with additional header information or TCP data packets. In some implementations, a TCP ACK packet with an empty ACK Gen Count field, or a predetermined invalid ACK Gen Count value (for example, 0x10000), also indicates that the ACK Gen Count is invalid for reduction and the BB circuitry 103 does not consider the associated TCP ACK as a candidate for redundancy, and leaves the packet in the output queue. In some implementations, an ACK Gen Count is valid if the value is in a valid range (for example, 0 . . . 0xffff), and is invalid otherwise.

In some implementations, the packet descriptor for a TCP ACK packet includes a separate AckGenCount_valid field, which indicates whether an ACK Gen count value for the packet is available or not. In some implementations, the BB circuitry 103 determines validity of the ACK Gen count value by checking the AckGenCount_valid field.

Additionally or alternatively, in some implementations, BB circuitry 103 checks the flow ID associated with the packet being inspected. If the flow ID indicates that the flow ID is invalid, then the BB circuitry 103 marks the database entry for the TCP ACK packet as invalid for compression and moves on to the next entry in the database, for the next packet in the output queue. Once a TCP ACK packet is determined to be invalid, due to either an invalid ACK Gen Count, or an invalid flow ID, or both the BB circuitry 103 ignores the packet for reduction, leaving it in the output queue. In some implementations, a TCP flow ID is valid if the value is within a valid range (for example, 0 . . . 0xffff), while a value (0x10000) indicates that the flow ID is invalid.

In some implementations, the BB circuitry 103 determines that two or more TCP ACK packets in the queue have the same flow ID and ACK Gen Count, indicating that one or more of these packets are redundant duplicate ACK packets. For example, the configuration 204 indicates that the BB circuitry 103 inspecting the packets in the output queue in the order of newest packet to oldest packet. With respect to the newest packet (for example, packet #13), the BB circuitry 103 searches entries in the database 106 to determine if the entry for any other TCP ACK packet in the queue has the same flow ID (for example, "flow a") and the same ACK Gen Count (for example, "ackgen 3"). If BB circuitry 103 determines that there is no matching entry in database 106, it stores the flow ID and ACK Gen Count for the current packet being inspected as a new entry in the database 106. BB circuitry 103 then proceeds to inspect the next older packet (for example, packet #12) in the queue. If BB circuitry 103 determines that an older TCP ACK packet (for example, packet #10) with the same flow ID is present in the queue, then the BB circuitry 103 checks whether the ACK Gen Count values of both packets (for example, packet #13 and packet #10) are the same.

In some cases, BB circuitry 103 determines that another packet with the same flow ID also has the same ACK Gen Count value. For example, as shown by the association 204a, packet #13 and packet #10 both have flow ID "flow a" and ACK Gen Count "ackgen 3." Upon a determination that an older packet has the same flow ID and ACK Gen Count value as a newer packet, BB circuitry 103 determines that the older packet (for example, packet #10) is a redundant duplicate TCP ACK packet. The BB circuitry 103 leaves the newest packet (for example, packet #13) in the output queue, while dropping the older packet (for example, packet #10) from the queue as a redundant duplicate TCP ACK packet. In some cases, as shown by the configuration 206, the BB circuitry 103 marks the redundant packet as a drop packet, for discarding from the queue at a later time, for example, during a queue cleanup procedure. For example, upon determining that packet #10 is a redundant duplicate TCP ACK packet with respect to packet #13, BB circuitry 103 marks (for example, the corresponding database entry) for packet #10 as a drop packet, as shown by 206a.

In some implementations, BB circuitry 103 determines that the flow ID for two TCP ACK packets is the same, but the ACK Gen Count values for the two packets are different, with the ACK Gen Count for the older packet marked in the database as the most recent ACK Gen Count associated with the flow ID. In such cases, BB circuitry 103 replaces the ACK Gen Count associated with the flow ID in the database with the ACK Gen Count of the newer TCP ACK packet.

After completion of inspection of a TCP ACK packet, the BB circuitry 103 moves on to inspect the next older TCP ACK packet in the output queue, and compares the flow ID and ACK Gen Count of the packet to other remaining packets in the queue, in a manner similar to that described above. For example, after addressing the newest TCP ACK packet, packet #13, the BB circuitry 103 selects the next TCP ACK packet in the queue, for example, TCP ACK packet #12. BB circuitry 103 obtains packet descriptors for TCP ACK packet #12 from database 106. BB circuitry 103 determines that the flow ID for TCP ACK packet #12 matches the flow ID for TCP ACK packet #11, but the ACK Gen Count values for the two TCP ACK packets are different. This can be the case, for example, when the two TCP ACK packets are generated in two different intervals by the TCP AP 105. In this case, the packets are not considered redundant with respect to each other, and neither packet is dropped or removed from the queue, as shown in configuration 206. However, the corresponding database entry for the flow (for example, "flow c") is updated with the most recent ACK Gen Count value corresponding to the newest TCP ACK packet for the flow (for example, "ackgen 88").

The BB circuitry 103 continues examining the output queue 107, moving backwards from newer to older TCP ACK packets in the queue, in a manner similar to that described above. For example, as shown with respect to configuration 204, upon inspecting packet #11, BB circuitry 103 determines that two other TCP ACK packets, packet #6 and packet #5, have the same flow ID ("flow c") and the same ACK Gen Count ("ackgen 87"), as shown by the associations 204b and 204c. In this case, BB circuitry 103 determines that the two older packets (for example, packet #6 and packet #5) are redundant, and marks these packets for drops, as shown by configuration 206.

Similarly, considering the next older TCP ACK packet in the output queue that has not been inspected, for example, packet #9, BB circuitry 103 determines that two older packets in the output queue (for example, packet #3 and, packet #1) are redundant duplicate TCP ACK packets, since they have the same flow ID ("flow a") and same ACK Gen Count value ("ackgen 2"), as shown by the associations 204d and 204e. As another example, BB circuitry 103 determines that packet #7 has a redundant duplicate in packet #4, as shown by the association 204f. In these cases, BB circuitry 103 drops the redundant duplicate packets, as shown by configuration 206.

After dropping all the redundant packets, the result of the output queue optimization/reduction is shown by the configuration 208. As shown, the number of TCP ACK packets in the output queue after the optimization is lesser than the number of TCP ACK packets in the output queue before the optimization process is performed (204) Elimination of redundant TCP ACK packets in this manner results in a lower number of packets to be sent on the UL, which increases processing efficiency, and results in reduction of latency. This causes a decrease of TCP RTT, leading to TCP throughput increase and therefore in higher end-to-end throughput.

In some implementations, TCP AP 105 sets the ACK Gen Count for a particular TCP ACK packet to invalid, for example, by leaving the ACK Gen Count field in the packet descriptor empty, or assigning a predetermined invalid value. For example, the ACK Gen Count field in the packet descriptor can be a 16-bit field; the TCP AP 105 can set the 16-bit field to a hexadecimal value FFFF to indicate that the ACK Gen Count is invalid. A similar approach is adopted for the flow ID in some implementations, as described previously. By setting the ACK Gen Count or the flow ID, or both, to invalid for a TCP ACK packet, application processor 105 can exclude the corresponding TCP ACK packet from being classified as redundant and thus getting dropped. This can be the case, for example, for TCP ACK packets that are determined to include important information, for example, TCP ACKs with additional header information. In some implementations, the output queue 107 includes additional packets, such as TCP data packets. In such implementations, the TCP AP 105 ensures that the data packets are not inspected for reduction by setting their ACK Gen Count or flow ID, or both, to invalid values.

Figure 3:
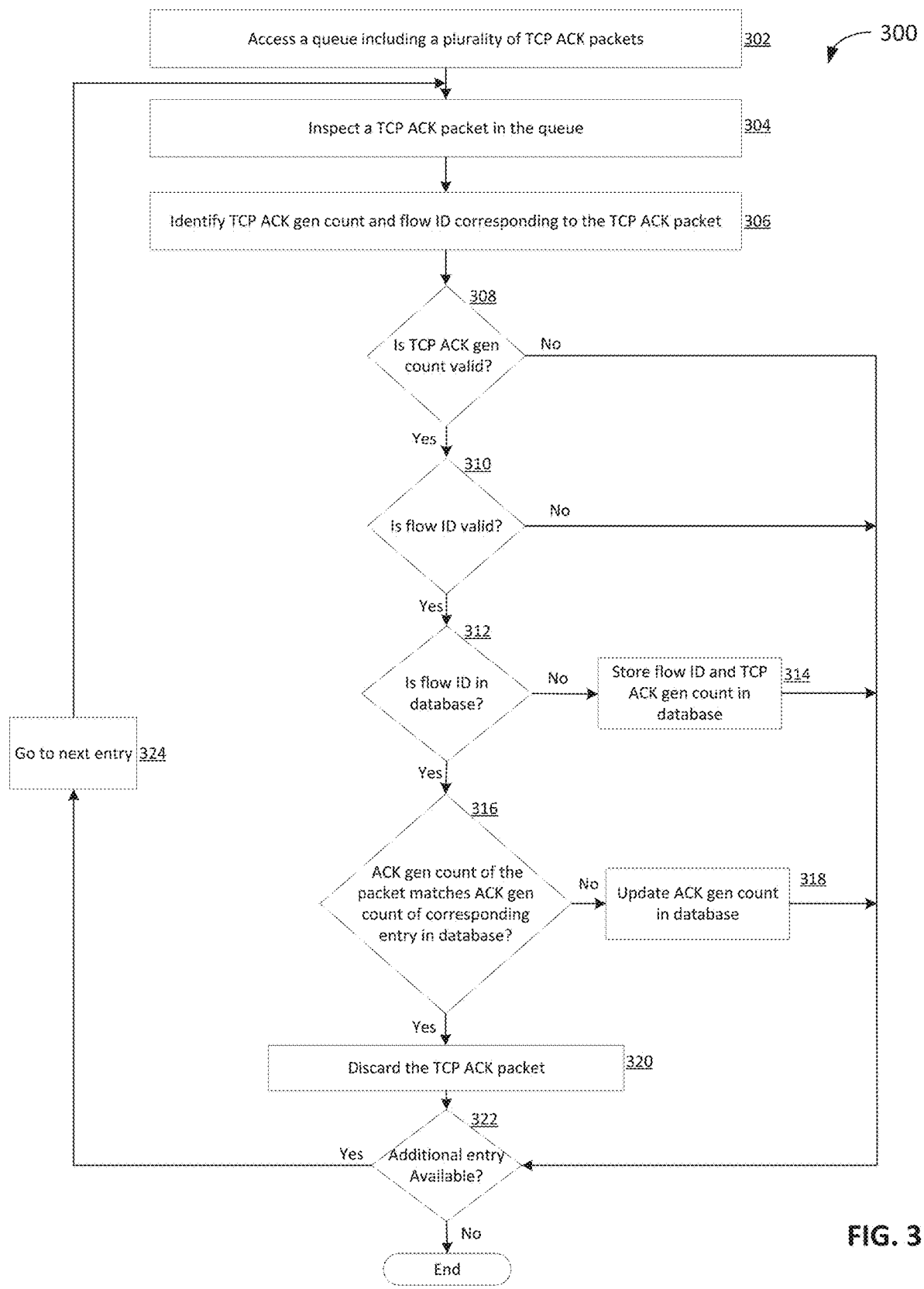
FIG. 3 illustrates a flow chart of an exemplary process for managing TCP ACK packets according to some disclosed implementations.

FIG. 3 shows an exemplary process 300 for managing TCP ACK packets in an output queue, according to some implementations. In some implementations, the process 300 is performed by client device 102, for example, by BB circuitry 103 of the client device 102, to manage TCP ACK packets cached in the output queue 107 for uplink transmission, by inspecting the TCP ACK packets for redundant packets that can be dropped. Accordingly, the process 300 is described in the following sections with respect to the client device 102 and the system 100. However, process 300 can also be performed by other devices in other implementations.

The process 300 starts when the client device accesses an output queue that includes a plurality of TCP ACK packets (302). For example, BB circuitry 103 accesses the output queue 107 to determine if there are redundant packets that can be dropped. In some implementations, the BB circuitry 103 accesses the output queue 107 to optimize the queue when the number of TCP ACK packets in the queue exceeds a predetermined threshold number. In some implementations, the BB circuitry 103 accesses the output queue 107 to optimize the queue when the time duration for which TCP ACK packets are queued in the output queue 107 exceeds a predetermined time threshold. In some implementations, the BB circuitry 103 accesses the output queue 107 at predetermined periodic time intervals to optimize the queue. In some implementations, the predetermined time intervals correspond to the time periods used by the TCP AP 105 to stamp packets with the same ACK Gen Count value, as described previously. In some implementations, accessing the output queue 107 includes accessing records of TCP ACK packets in the database 106. Such records are illustrated with respect to FIG. 6. In some implementations, the BB circuitry 103 resets the database 106 when accessing the output queue. For example, BB circuitry 103 clears entries in the database 106 when accessing the output queue 107.

Upon accessing the output queue, the client device inspects a TCP ACK packet in the queue (304). For example, in some implementations, the BB circuitry 103 inspects the packets starting from the newest packet within in the queue (for example, packet #13 as shown by the configuration 204). In other implementations, the BB circuitry 103 inspects the packets starting from the oldest packet in the queue (for example, packet #1 as shown by the configuration 204).

The client device identifies values of the ACK Gen Count and flow ID corresponding to the packet that is currently accessed (306). For example, when inspecting a TCP ACK packet in the output queue 107, such as packet #13, the BB circuitry 103 accesses the flow ID and the ACK Gen Count values that are included in the packet.

Upon identifying the ACK Gen Count value for the TCP ACK packet that is being inspected, the client device checks for the validity of the ACK Gen Count for the packet (308). For example, BB circuitry 103 checks whether the ACK Gen Count value for the packet is set to a valid value, or an invalid value (such as hexadecimal FFFF or some other suitable predetermined value to indicate invalidity). In some implementations, having an empty ACK Gen Count field indicates that the ACK Gen Count is invalid.

If the client device determines that the ACK Gen Count value for the TCP ACK packet being inspected is invalid (308—No), then the client device marks the TCP ACK packet as ineligible for reduction and moves on to inspecting the next packet in the output queue, if available. For example, as described previously, in some cases, the TCP AP 105 sets the ACK Gen Count for a packet as invalid to indicate that the packet should not be a candidate for removal from the output queue, for example, when the packet contains important information, such as TCP ACKs with additional header information or TCP data packets. When the BB circuitry 103 determines that the ACK Gen Count for the currently inspected packet is invalid, the BB circuitry leaves the packet in the output queue 107 without further processing, and moves on to inspect the next packet in the queue, if other uninspected packets are present.

On the other hand, if the client device determines that the TCP ACK packet under inspection has a valid ACK Gen Count, then the client device checks whether the flow ID of the TCP ACK packet is valid (310). For example, BB circuitry 103 checks whether a flow ID value is assigned to the TCP ACK packet, and if so, whether the flow ID indicates a valid value, or an invalid value (for example, hexadecimal FFFF or some other suitable predetermined value to indicate invalidity). In some implementations, not having any value in flow ID field indicates that the flow ID is invalid.

If the client device determines that the flow ID for the packet being inspected indicates that the flow ID is invalid (310—No), then the client device marks the TCP ACK packet as ineligible for reduction and moves on to inspecting the next packet in the output queue, if available. For example, as described previously, in some cases, the TCP AP 105 sets the flow ID for a particular TCP ACK packet as invalid to indicate that the packet should not be a candidate for removal from the output queue, for example, when it determines that the TCP ACK packet contains important information, such as TCP ACKs with additional header information or TCP data packets. When the BB circuitry 103 determines that the flow ID for the currently inspected packet is invalid, the BB circuitry leaves the packet in the output queue 107 without further processing, and moves on to inspect the next packet in the queue, if other uninspected packets are present.

On the other hand, if the client device determines that the flow ID of the packet being inspected is valid (310—Yes), then the client device checks if the flow ID for the packet is stored in an entry in the database (312). For example, the BB circuitry 103 checks entries in the database 106 to determine if an entry includes the flow ID of the packet currently inspected, which indicates that another TCP ACK packet for the same flow is present in the output queue (and has been previously inspected).

If the client device determines that the flow ID is not stored in the database (312—No), then the client device stores the flow ID and the TCP ACK Gen Count for the packet in the database (314). For example, if the BB circuitry 103 determines that the database 106 does not include an entry with the flow ID of the TCP ACK packet currently being inspected, then the BB circuitry 103 creates a new entry in the database 106, for example, as shown with respect to FIG. 6. The BB circuitry 103 stores the flow ID and the ACK Gen Count values for the packet in the newly created entry.

On the other hand, if the client device determines that the flow ID of the packet being inspected is present in an entry in the database (312—yes), then the client device checks if the ACK Gen Count as of the packet under inspection matches the ACK Gen Count value stored in the database entry (316). For example, as described above and with respect to FIG. 2, packet #10 in the queue (204) has a flow ID "flow a" and an ACK Gen Count "ackgen 3". If packet #10 is the packet currently under inspection, the BB circuitry 103 determines, upon searching entries in the database 106, that there exists at least one entry in the database with the same flow ID, corresponding to another TCP ACK packet in the queue with the same flow ID. The BB circuitry 103 determines whether the ACK Gen Count for the entry is the same as the ACK Gen Count of packet #10.

If the client device determines that the ACK Gen Count value for the TCP ACK packet being inspected is different from the ACK Gen Count value stored in the database entry (316—No), then the client device updates the ACK Gen Count value in the database (318) by replacing the existing value with the ACK Gen Count value of the TCP ACK packet being inspected. For example, if the BB circuitry 103 determines that the entry in the database 106 with the same flow ID as the flow ID of the packet being inspected has a different value for the ACK Gen Count, then the BB circuitry 103 updates the ACK Gen Count field in the entry with the ACK Gen Count value of the inspected TCP ACK packet.

On the other hand, if the client device determines that the ACK Gen Count of the packet under inspection matches the ACK Gen Count value stored in the database entry (316—Yes), then the client device discards the TCP ACK packet (320). For example, when inspecting entries in the database 106 with respect to packet #10 (as shown in FIG. 2), the BB circuitry 103 determines that an entry exists that has the same flow ID ("flow a") and also the same ACK Gen Count value ("ackgen 3") as packet #10. This entry was created when packet #13 was inspected, as described previously. The BB circuitry 103 accordingly determines that packet #10 is a redundant duplicate TCP ACK packet compared to packet #13. The BB circuitry 103 then discards or drops TCP ACK packet #10 from the output queue 107.

In implementations where the BB circuitry 103 inspects the output queue starting with the oldest packet first, when a redundant TCP ACK packet is identified, such as packet #10, the BB circuitry 103 drops the newer packet (for example, packet #13) and retains the older one (for example, packet #10) in the output queue. In such implementations, the entry of the older packet is retained in the database, while the entry for the newer packet is deleted. It should be noted that, in such cases, when a packet is inspected, the BB circuitry 103 does not know immediately if the packet will be dropped or will remain in the output queue. This determination is made when the next packet with the same flow ID is inspected. Accordingly, the decision whether to retain a packet in the output queue, or drop the packet, is delayed during the iteration of inspecting the packet, compared to the case when packets in the output queue are inspected starting with the newest packet first.

The client device then checks if there are additional packets in the output queue (322). If there are one or more additional packets present in the output queue (322—Yes), then the client device accesses the TCP ACK packet in the output queue (324), and begins inspecting entries in the database for a match corresponding to the flow ID and the ACK Gen Count of the newly accessed TCP ACK packet, in a manner as described in the preceding section with respect to (304)-(320). On the other hand, if there is no additional packet in the output queue (322—No), then the process 300 ends, with the output queue having been compressed for the current iteration.

In some cases of the process 300 described above, when an older TCP ACK packet that is a redundant duplicate is removed from the output queue while retaining a newer TCP ACK packet in the queue, sending the TCP ACK packet to the remote server is delayed, since the newer TCP ACK packet is in a later position in the output queue. As described in the following sections, in some implementations, the position of the duplicate older TCP ACK packet (that is discarded) in the output queue is provided to the newer TCP ACK packet, such that the TCP ACK is sent to the remote server earlier (for example, when the older TCP ACK packet would have been sent based on its position in the output queue), which helps to reduce latency. In such implementations, the BB circuitry 103 tracks positions of the TCP ACK packet in the output queue. When an older redundant TCP ACK packet is identified, the BB circuitry 103 discards the older packet and moves the newer packet to the position of the older packet in the queue. To achieve this reordering of the output queue, the BB circuitry 103 maintains additional fields in the entries in the database 106. The additional fields include a replacement candidate index and a winner packet (for example, the newer packet that is retained) index. The replacement candidate index indicates the position in the queue of the older packet of a flow with the same TCP ACK Gen Count value as the newer TCP ACK packet. This field is updated each time an older packet with same TCP ACK Gen Count value is found in the output queue. The winner packet index indicates the queue position of the newest packet of the flow with the certain TCP ACK Gen Count value. This field is set when a packet with a new TCP ACK Gen Count value is identified.

Figure 4:
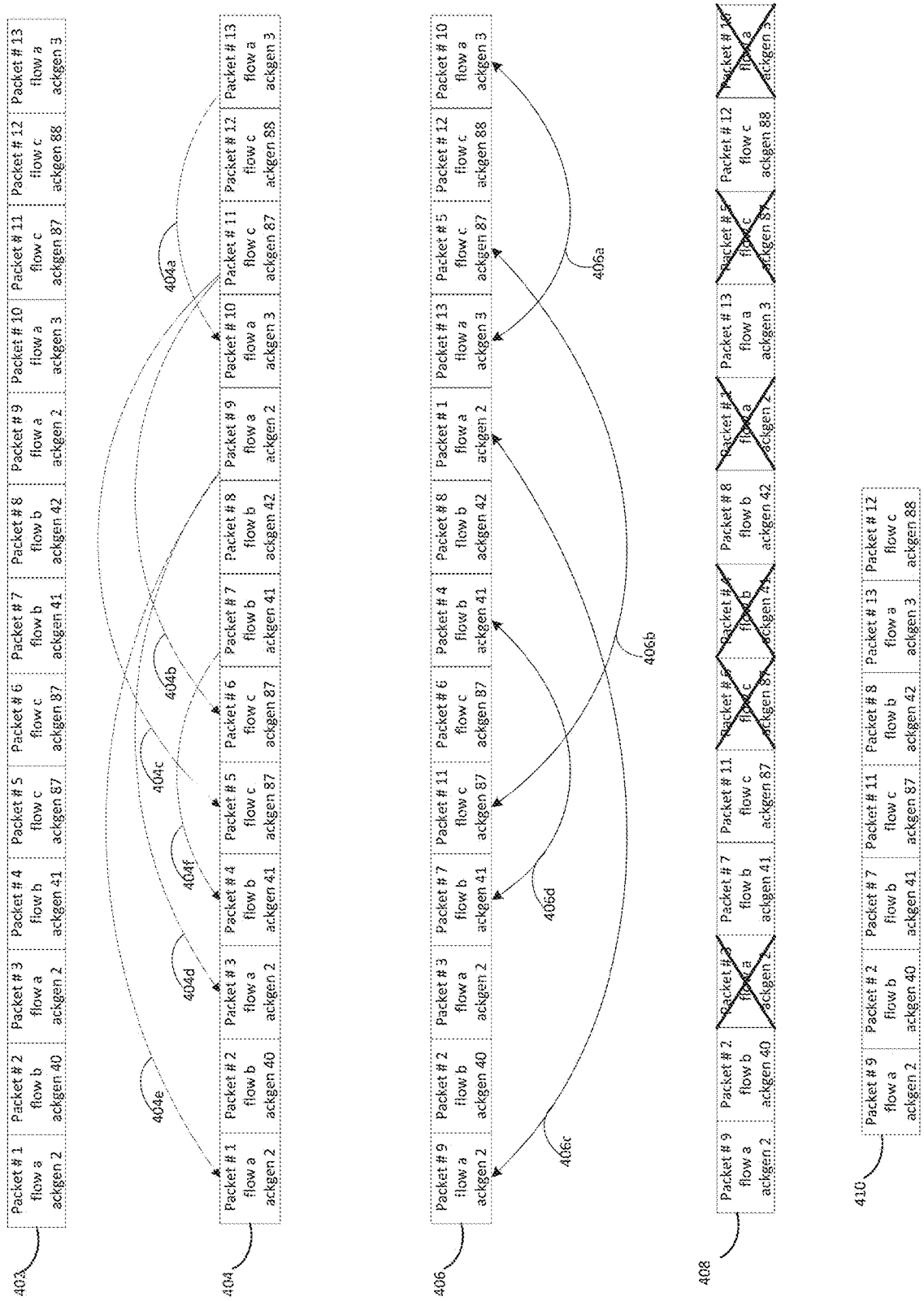
FIG. 4 illustrates optimization of TCP ACK packet flow according to some disclosed implementations.

FIG. 4 illustrates optimization of a TCP ACK packet flow according to some disclosed implementations in which packets are reordered in the output queue. The figure shows configuration 402 of the output queue prior to optimization; configurations 404, 406 and 408 of the output queue during optimization to identify and remove redundant TCP ACK packets, and configuration 410 of the output queue after the optimization is completed. In some implementations, the operations described with respect to FIG. 4 are performed by the BB circuitry 103, and the configurations 402-410 correspond to the output queue 107.

Each of the configurations 402-410 include TCP ACK packets that are identified by a packet number (for example, "packet #1"), a flow ID (for example, "flow a"), and an ACK Gen Count value (for example, "ackgen 2"). As shown, the queue includes multiple TCP ACK packets with different flow IDs and corresponding ACK Gen Count values, which are assigned by the TCP AP 105. In some implementations, the TCP ACK packets are arranged in order from the oldest to the newest packet, with packet #1 being the oldest and packet #13 being the newest. The oldest TCP ACK packet (packet #1) in the queue has a flow ID "flow a" and ACK Gen Count "ackgen 2" and the newest TCP ACK packet (packet #13) has the flow ID "flow a" and ACK Gen Count "ackgen 3."

The configuration 402 illustrates that the output queue includes multiple TCP ACK packets with the same flow ID and the same ACK Gen Count, before the BB circuitry 103 optimizes the queue. For example, packets #1, #3 and #9 have flow ID "flow a" and ACK Gen Count "ackgen 2." When optimizing the output queue 107, the BB circuitry 103 identifies or more of these TCP ACK packets, which have the same flow ID and ACK Gen Count values, as redundant duplicate ACK packets, which are then removed from the queue.

The configuration 402 illustrates that the output queue also includes multiple TCP ACK packets with the same flow ID, but with different ACK Gen Count values; and TCP ACK packets with different flow IDs. For example, packets #1 and #10 have the same flow ID "flow a," but different ACK Gen Count values, respectively, "ackgen 2" and "ackgen 3"; while packets #1 and #2 have different flow IDs, respectively, "flow a" and "flow b." These TCP ACK packets, which have the same flow ID but different ACK Gen Count values, or different flow IDs, are not identified as redundant with respect to one another.

In some implementations, packet descriptors (for example, flow ID and ACK Gen Count value) for TCP ACK packets in the queue are stored in the database 106, for example, in a data structure, such as a table, as described with respect to FIG. 7. In some implementations, the BB circuitry 103 manages the table. Upon inspecting a packet, if the associated flow ID and ACK Gen Count value are not present in the database 106, BB circuitry 103 records the packet descriptor information as an entry in the database, and also records the index or position of the packet in the output queue. As described in greater detail in the following sections, the BB circuitry 103 manages the TCP ACK packets in the output queue 107 by examining the entries in the database 106 to identify redundant TCP ACK packets.

In some implementations, BB circuitry 103 inspects the output queue 107 starting from the newest packet (for example, packet #13 as shown by the configuration 402). To inspect a TCP ACK packet in the output queue, the BB circuitry 103 accesses the packet descriptor of the packet, and compares the information in the packet descriptor with entries stored in database 106.

As described previously, in some implementations, when checking a TCP ACK packet stored in the output queue for redundancy, BB circuitry 103 first checks whether the corresponding packet descriptor has a valid ACK Gen Count or a valid flow ID for the packet, or both. If the BB circuitry 103 determines that the ACK Gen Count of the current packet being inspected is invalid, then the BB circuitry marks the TCP ACK packet as invalid for reduction (for example, not a candidate for removal as a redundant TCP ACK packet) and moves on to the next packet in the output queue. Additionally or alternatively, in some implementations, BB circuitry 103 checks the flow ID associated with the packet being inspected. If the flow ID indicates that the flow ID is invalid, then the BB circuitry 103 marks the TCP ACK packet as invalid for reduction and moves on to the next packet in the output queue. Once a TCP ACK packet is determined to be invalid, due to either an invalid ACK Gen Count, or an invalid flow ID, or both the BB circuitry 103 ignores the packet for reduction, leaving it in the output queue.

In some implementations, the BB circuitry 103 determines that the same flow ID and ACK Gen Count of a TCP ACK packet in the queue matches an entry in the database 106, indicating that the packet is a redundant duplicate ACK packet. For example, considering the configuration 404, the BB circuitry 103 inspects the packets in the output queue in the order of newest packet to oldest packet. With respect to the newest packet, packet #13, the BB circuitry 103 determines that there are no entries in the database 106 that has the same flow ID ("flow a") and the same ACK Gen Count ("ackgen 3"). Accordingly, BB circuitry 103 creates a new entry in the database 106, storing flow ID "flow a," ACK Gen Count "ackgen 3," and the position index of packet #13. Subsequently, when inspecting older TCP ACK packet #10, BB circuitry 103 determines that an entry exists in the database 106 with the same flow ID "flow a" and ACK Gen Count value "ackgen 3" as packet #10. As shown by the association 404a in the configuration 404, packet #13 and packet #10 both have flow ID "flow a" and ACK Gen Count "ackgen 3." BB circuitry 103 determines that packet #10 has the same flow ID and ACK Gen Count value as a newer packet (for example, packet #13), and is a redundant duplicate TCP ACK packet, which can be discarded. The BB circuitry 103 notes, in the database entry for the particular flow ID ("flow a") and ACK Gen Count ("ackgen 3"), the position index for the replacement candidate packet #10, which is the TCP ACK packet being discarded, as shown with respect to FIG. 7.

After completing inspection of a TCP ACK packet, the BB circuitry 103 moves on to inspect the next older TCP ACK packet in the output queue, and compares the flow ID and ACK Gen Count of the packet to entries in the queue, in a manner similar to that described above. For example, after addressing the TCP ACK packet #12, the BB circuitry 103 selects the next TCP ACK packet in the queue, TCP ACK packet #11. BB circuitry 103 determines that the database 106 includes an entry with the flow ID ("flow c") of TCP ACK packet #11, but the ACK Gen Count value of packet #11 ("ackgen 87") is different from the ACK Gen Count value in the database entry (for example, "ackgen 88" corresponding to packet #12 with the same flow ID). In this case, packet #11 is not a redundant duplicate of packet #12, and is not dropped or removed from the queue, as shown in configuration 404. The BB circuitry 103 updates the corresponding database entry (for example, entry for "flow c"), updating the ACK Gen Count field to store the ACK Gen Count value of packet #11, and the winner index field to store the position index of packet #11.

The BB circuitry 103 continues examining the output queue 107, moving backwards from newer to older TCP ACK packets in the queue, in a manner similar to that described above. For example, as shown with respect to configuration 404, upon inspecting packet #6 and then packet #5, BB circuitry 103 determines that these have the same flow ID ("flow c") and the same ACK Gen Count ("ackgen 87") as an entry in the database, which corresponds to packet #11, as described above. In this case, BB circuitry 103 determines that the two older packets (packet #6 and packet #5) are redundant duplicates with respect to packet #11, shown by the associations 404b and 404c, and marks these packets for drops.

In some implementations, when there are multiple redundant duplicate TCP ACK packets, as in the preceding example, the BB circuitry 3 selects the position of the oldest of the multiple duplicate TCP ACK packets as the replacement position for the newest packet that is to be retained, and stores the position of the oldest duplicate as the value of the replacement candidate index, and the position of the winner packet, in a database entry corresponding to the flow ID and the ACK Gen Count value. In some implementations, the replacement candidate field in the database entry is updated as additional duplicate TCP ACK packets are identified. In such implementations, the final value of the replacement candidate field corresponds to the position index of the oldest duplicate TCP ACK packet that is identified. Considering the above example again, the BB circuitry 103 first identifies that packet #6 has the same flow ID and the same ACK Gen Count value, as shown by the associated 404b. Since packet #6 is an older packet compared to packet #11, BB circuitry 103 determines that packet #6 can be discarded, and the position occupied by packet #6 in the queue can be given to packet #11. Following this identification, the BB circuitry 103 stores, in a database entry for the corresponding flow ID ("flow c") and ACK Gen Count value ("ackgen 87"), the position of packet #6 in the replacement candidate index field, while the position of packet #11 is present in the winner packet field. Subsequently, BB circuitry 103 identifies packet #5, which is an older packet in the output queue compared to packet #5, as another duplicate for the flow ID "flow c" and ACK Gen Count value "ackgen 87", as shown by the associated 404c. The BB circuitry 103 then updates the replacement candidate index field in the corresponding database entry for the flow ID ("flow c") and ACK Gen Count value ("ackgen 87") to store the position of packet #5 (removing the position of packet #6 that as previously stored in this field in the database entry).

Similarly, considering flow ID "flow a" and ACK Gen Count value "ackgen 2" that correspond to packet #9, BB circuitry 103 identifies two older packets in the output queue, packet #3 and packet #1, that are redundant duplicate TCP ACK packets, since they have the same flow ID and ACK Gen Count value, as shown by the associations 404d and 404e. Of these two redundant duplicate TCP ACK packets, packet #1 is older compared to packet #3. Accordingly, BB circuitry 103 stores, in the corresponding database entry for flow ID "flow a" and ACK Gen Count value "ackgen 2", the position of packet #1 as the final value in the replacement candidate index field. As another example, BB circuitry 103 determines that packet #4 is a single redundant duplicate for packet #7, as shown by the association 404f. In this case, BB circuitry 103 stores, in the database entry for the corresponding flow ID ("flow b") and ACK Gen Count value ("ackgen 41"), the position of packet #4 as the final value in the replacement candidate index field, while the position of packet #7 is stored in the winner candidate index field.

After examining the output queue to identify redundant TCP ACK packets and noting the positions of the winner packets and the replacement candidates, BB circuitry 103 rearranges the packets in the queue using the recorded position index information, such that the position of the winner packet for a particular flow ID and ACK Gen Count value is switched with the position of the oldest packet for the flow ID and ACK Gen Count value. For example, as discussed above with respect to association 404a, for flow ID "flow a" and ACK Gen Count "ackgen 3," packet #10 is a redundant duplicate for packet #13, and their respective queue positions are stored as the replacement candidate index and winner index, respectively, in the corresponding database entry. As shown by the configuration 406, when rearranging the packets in the output queue after identifying redundant duplicates, the BB circuitry 103 switches the positions of packet #13 and packet #10 in the output queue, by looking up their positions in the replacement candidate index and winner index fields of the database entry. As shown by 406a, packet #13, which is being retained, is moved up in the queue to the position that was previously occupied by packet #10t. This reordering ensures that the earliest available position of a TCP ACK packet in the queue for flow ID "flow a" and ACK Gen Count value "ackgen 3" is maintained (for example, the original position of packet #10), while removing redundant duplicate packets.

In a manner similar to the above, TCP ACK packets corresponding to other <flow ID, ACK Gen Count value> tuples are reordered when removing redundant duplicate TCP ACK packets. For example, as shown by the association 406b, the positions of packet #11 and packet #5, which are respectively the newest and oldest packets for the flow ID "flow c" and ACK Gen Count value "ackgen 87," are switched; as shown by the association 406c; the positions of packet #9 and packet #1, which are respectively the newest and oldest packets for the flow ID "flow a" and ACK Gen Count value "ackgen 2," are switched; and as shown by the association 406d, the positions of packet #7 and packet #4, which are respectively the newest and oldest packets for the flow ID "flow b" and ACK Gen Count value "ackgen 41," are switched. For each of these re-orderings, the BB circuitry 103 looks up the positions to be switched from the replacement candidate index field and winner index field in the corresponding database entry.

After BB circuitry 103 has switched the positions of the packets as described above and rearranged the queue, BB circuitry 103 drops the TCP ACK packets that are identified as redundant duplicates. For example, as shown by the configuration 408, packet #10, which is a redundant duplicate packet for flow ID "flow a" and ACK Gen Count value "ackgen 3," is dropped. Similarly, packet #5 and packet #6, which are redundant duplicate packets for flow ID "flow c" and ACK Gen Count value "ackgen 87," are dropped; packet #1 and packet #3, which are redundant duplicate packets for flow ID "flow a" and ACK Gen Count value "ackgen 2," are dropped; and packet #4, which is a redundant duplicate packet for flow ID "flow b" and ACK Gen Count value "ackgen 41," is dropped. After dropping the redundant packets, the configuration 410 of the output queue shows that the number of packets in the compressed queue is smaller than that in the original queue, as shown by configuration (402). In this manner, redundant TCP ACK packets are eliminated from the output queue to increase processing efficiency. While doing so, the remaining packets are reordered such that the order in sending acknowledgments is not altered, which results in reduction of latency of all subsequent UL TCP ACK packets (after the dropped packets), decrease of TCP RTT (round trip time) which ends up in TCP throughput increase and therefore in higher end-to-end throughput.

Figure 5:
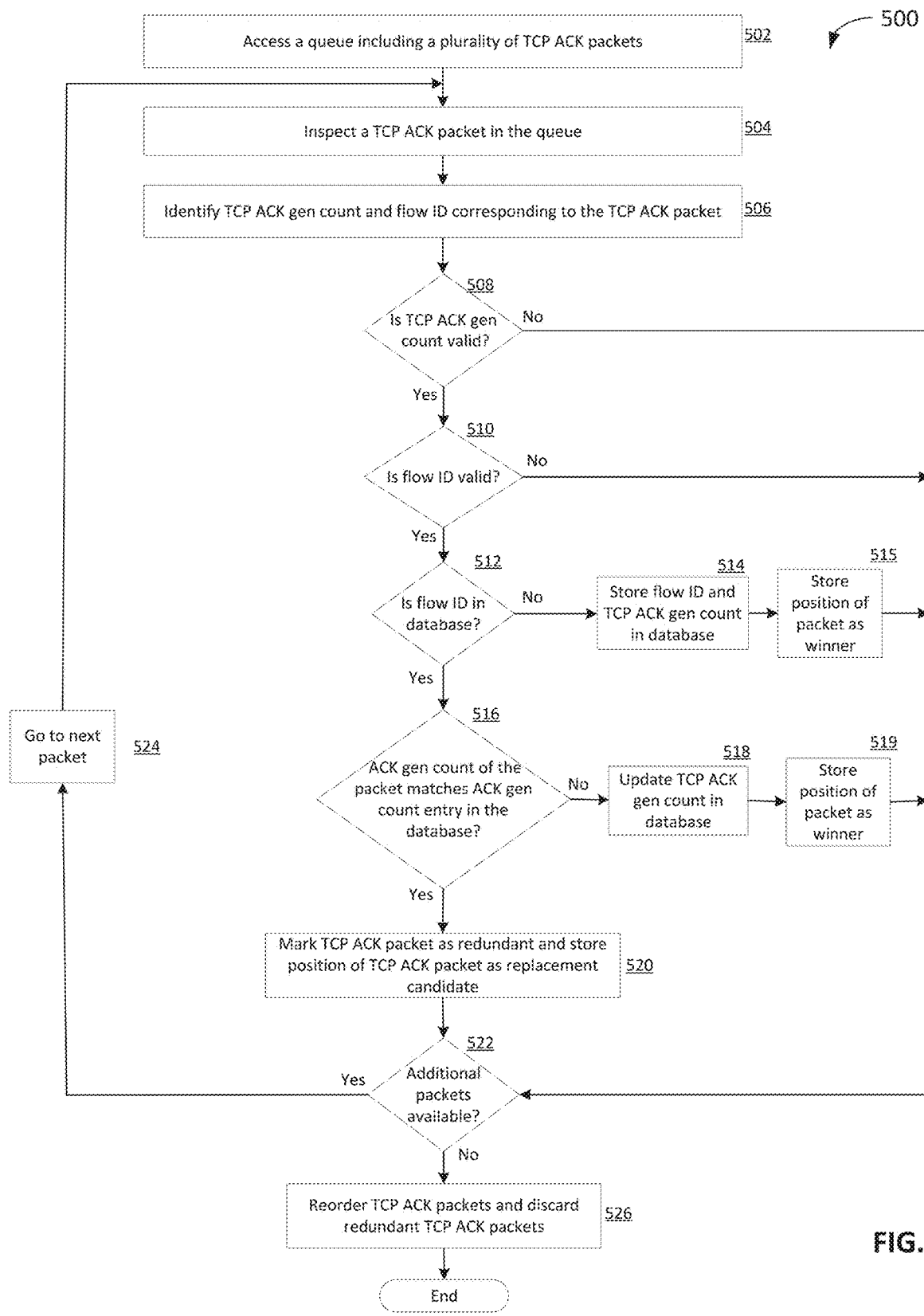
FIG. 5 illustrates a flow chart of a second exemplary process for managing TCP ACK packets according to some disclosed implementations.

FIG. 5 shows an exemplary process 500 for managing TCP ACK packets in an output queue along with reordering, according to some disclosed implementations. In some implementations, the process 500 is performed by client device 102, for example, by BB circuitry 103 of the client device 102. Accordingly, process 500 is described in the following sections with respect to client device 102 and system 100. However, process 500 can also be performed by other devices.

The process 500 starts when the client device accesses an output queue that includes a plurality of TCP ACK packets (502). For example, BB circuitry 103 accesses the output queue 107 to determine if there are redundant packets that can be dropped. In some implementations, the BB circuitry 103 accesses the output queue 107 to optimize the queue when the number of TCP ACK packets in the queue exceeds a predetermined threshold number. In some implementations, the BB circuitry 103 accesses the output queue 107 to optimize the queue when the time duration for which TCP ACK packets are queued in the output queue 107 exceeds a predetermined time threshold. In some implementations, the BB circuitry 103 accesses the output queue 107 at predetermined periodic time intervals to optimize the queue. In some implementations, the BB circuitry 103 resets the database 106 when accessing the output queue. For example, in such implementations, BB circuitry 103 clears entries in the database 106 when accessing the output queue 107.

Upon accessing the output queue, the client device inspects a TCP ACK packet in the queue (504). For example, in some implementations, the BB circuitry 103 inspects the packets starting from the newest packet within in the queue (for example, packet #13 as shown by the configuration 402). In some implementations, the BB circuitry 103 inspects the packets starting from the oldest packet in the queue (for example, packet #1 as shown by the configuration 402). In some implementations, when inspecting a packet in the output queue 107, the BB circuitry 103 reads a packet descriptor corresponding to the packet.

The client device identifies values of the ACK Gen Count and flow ID corresponding to the TCP ACK packet that is currently accessed (506). For example, when inspecting a TCP ACK packet in the output queue 107, such as packet #13, the BB circuitry 103 accesses the flow ID and the ACK Gen Count values that are included in the packet descriptor for the packet.

Upon identifying the ACK Gen Count value for a TCP ACK packet that is being inspected, the client device checks whether the ACK Gen Count value for the packet is valid (508). For example, BB circuitry 103 checks whether the ACK Gen Count value for the packet is set to a valid value, or an invalid value (for example, hexadecimal FFFF or some other suitable predetermined value to indicate invalidity). In some implementations, not having any value in ACK Gen Count field indicates that the ACK Gen Count is invalid.

If the client device determines that the ACK Gen Count value for the TCP ACK packet being inspected is invalid (508—No), then the client device marks the TCP ACK packet as ineligible for reduction and moves on to inspecting the next packet in the output queue, if available (522). For example, as described previously, in some cases, the TCP AP 105 sets the ACK Gen Count for a packet as invalid to indicate that the packet should not be a candidate for removal from the output queue, for example, when the packet contains important information, such as TCP ACKs with additional header information or TCP data packets. When the BB circuitry 103 determines that the ACK Gen Count for the currently inspected packet is invalid, the BB circuitry leaves the packet in the output queue 107 without further processing, and moves on to inspect the next packet in the queue, if other uninspected packets are present.

On the other hand, if the client device determines that the TCP ACK packet under inspection has a valid ACK Gen Count, then the client device checks whether the flow ID of the TCP ACK packet (510) is valid. For example, BB circuitry 103 checks whether a flow ID value is assigned to the TCP ACK packet, and if so, whether the flow ID indicates a valid value, or an invalid value (for example, hexadecimal FFFF or some other suitable predetermined value to indicate invalidity). In some implementations, not having any value in flow ID field indicates that the flow ID is invalid.

If the client device determines that the flow ID for the packet being inspected indicates that the flow ID is invalid (510—No), then the client device marks the TCP ACK packet as ineligible for reduction and moves on to inspecting the next packet in the output queue, if available (522). For example, as described previously, in some cases, the TCP AP 105 sets the flow ID for a particular TCP ACK packet as invalid to indicate that the packet should not be a candidate for removal from the output queue, for example, when it determines that the TCP ACK packet contains important information, such as TCP ACKs with additional header information or TCP data packets. When the BB circuitry 103 determines that the flow ID for the currently inspected packet is invalid, the BB circuitry leaves the packet in the output queue 107 without further processing, and moves on to inspect the next packet in the queue, if other uninspected packets are present.

On the other hand, if the client device determines that the flow ID of the packet being inspected is valid (510—Yes), then the client device checks if the flow ID for the packet is stored in an entry in the database (512). For example, the BB circuitry 103 checks entries in the database 106 to determine if an entry includes a flow ID that matches the flow ID of the packet currently inspected, which indicates that another TCP ACK packet for the same flow is present in the output queue (and has been previously inspected).

If the client device determines that the flow ID is not stored in the database (512—No), then the client device stores the flow ID and the TCP ACK Gen Count for the packet in the database (514). For example, if the BB circuitry 103 determines that the database 106 does not include an entry with the flow ID of the TCP ACK packet currently being inspected, then the BB circuitry 103 creates a new entry in the database 106, for example, as shown with respect to FIG. 7. The BB circuitry 103 stores the flow ID and the ACK Gen Count value for the packet in the newly created entry. The client device also stores the position of the packet in the database (515). For example, in addition to storing the flow ID and ACK Gen Count value for the TCP ACK packet in the newly created entry, the BB circuitry 103 stores, in the winner index field of the database entry, the position of the packet in the output queue, as described previously with respect to FIG. 4.

On the other hand, if the client device determines that the flow ID of the packet being inspected is present in an entry in the database (512—yes), then the client device checks if the ACK Gen Count as of the packet under inspection matches the ACK Gen Count value in the entry (516). For example, as described above and with respect to FIG. 4, packet #10 in the queue (404) has a flow ID "flow a" and an ACK Gen Count "ackgen 3". When packet #10 is under inspection, the BB circuitry 103 determines, upon searching entries in the database 106, that there exists an entry in the database (for example, created previously when packet #13 was inspected) with the same flow ID ("flow a"). The BB circuitry 103 determines whether the ACK Gen Count value for the entry matches the ACK Gen Count of packet #10. BB circuitry 103 checks if the ACK Gen Count in the entry is the same as the ACK Gen Count of packet #10.

If the client device determines that the ACK Gen Count for the TCP ACK packet does not match the ACK Gen Count of the database entry (516—No), then the client device updates the ACK Gen Count value for the entry in the database (518). If the BB circuitry 103 determines that an existing entry in the database 106 with the same flow ID as the flow ID of the packet being inspected has an ACK Gen Count value that is different from the ACK Gen Count value of the packet, then the BB circuitry 103 updates the database entry. The BB circuitry 103 updates the ACK Gen count field of the entry with the ACK Gen Count value of the packet being inspected. For example, as described previously, when inspecting TCP ACK packet #11, BB circuitry 103 determines that the database 106 includes an entry with the flow ID ("flow c") of TCP ACK packet #11, but the ACK Gen Count value of packet #11 ("ackgen 87") is different from the ACK Gen Count value in the database entry ("ackgen 88" corresponding to packet #12 with the same flow ID). In this case, BB circuitry 103 updates the corresponding database entry for "flow c" by updating the ACK Gen Count field to store the ACK Gen Count value of packet #11, and the winner index field to store the position index of packet #11.

The client device also stores the position of the packet in the database entry as the winner packet (519). For example, in addition to updating the ACK Gen Count field in the database entry as described above, BB circuitry 103 stores, in the winner index field of the entry, the output queue position of the packet, as described previously with respect to FIG. 4. Considering the above example of packet #11, BB circuitry 103 updates the winner index field of the database entry (that previously stored the queue position of packet #12) to store the queue position index of packet #11.

On the other hand, if the client device determines that the ACK Gen Count of the packet under inspection matches the ACK Gen Count value of the database entry (516—Yes), then the client device marks the TCP ACK packet as redundant and stores the position of the TCP ACK packet as the replacement candidate index in the database entry (520). For example, when considering packet #10 (as shown in FIG. 4) under inspection, the BB circuitry 103 determines that an entry exists (created when packet #13 was inspected) with the same flow ID ("flow a") and the same ACK Gen Count value ("ackgen 3") as packet #10. The BB circuitry 103 accordingly determines that packet #10 is a redundant duplicate TCP ACK packet compared to packet #13. The BB circuitry 103 marks TCP ACK packet #10 to be dropped from the output queue 107, and stores the position of packet #10 in the replacement candidate index field of the corresponding database entry for flow ID "flow a," where the queue position of packet #13 is stored in the winner index field.

The client device then checks if there are additional packets in the output queue (522). If there are one or more additional packets present in the output queue (522—Yes), then the client device accesses the next TCP ACK packet in the output queue (524), and begins inspecting entries in the database for a match corresponding to the flow ID and the ACK Gen Count of the newly accessed TCP ACK packet, in a manner as described in the preceding section with respect to (504)-(520).

On the other hand, if there is no additional packet in the output queue (522—No), then the client device proceeds to reorder the TCP ACK packets in the output queue and discard the redundant TCP ACK packets (526). For example, the BB circuitry 103 switches the positions of packet #13 and packet #10, as described with respect to 406*a* in FIG. 4, and drops the redundant duplicate TCP ACK packet #10, as shown with respect to configuration 408. The process 500 then ends, with the output queue having been compressed and reordered for the current iteration. For example, configuration 410 in FIG. 4 shows the output queue at the end of the process 500, in some implementations.

FIG. 6 illustrates entries in a database 106 that is used for managing TCP ACK packets, according to some disclosed implementations. As described with respect to FIG. 1, database 106 is included in client device 102.

As shown in FIG. 6, the database 106 includes one or more entries, for example, 602, 604, and 606, which are represented as rows and are also referred to as data records. Each entry includes two fields, a flow ID field 620 and an ACK Gen count field 622, which respectively store the flow ID and ACK Gen count values that are determined by the BB circuitry 103 while inspecting TCP ACK packets in the output queue 107. Each entry in the database 106 includes a unique combination of flow ID and ACK Gen count value. For example, entry 602 has value "flow a" in its flow ID field 620, and value "ackgen 3" in its ACK Gen Count value field 622. When the BB circuitry 103 starts inspecting the output queue 107 in each iteration, it resets the database 106 by clearing all the entries.

When inspecting a TCP ACK packet in the output queue, if the BB circuitry 103 does not find an entry in the database 106 matching the flow ID of the packet, the BB circuitry 103 *a* creates a new entry in the database 106 and enters the flow ID and ACK Gen count value in the corresponding fields of the entry, as described with respect to the output queue configurations 202-204 and process 300. This is the case, for example, when the newest packet for a particular flow ID is inspected. For example, as described with respect to FIGS. 2 and 3, when inspecting packet #13 in the output queue 107, the BB circuitry 103 determines that the flow ID ("flow a") of packet #13 is not present in the database 106. The BB circuitry 103 accordingly creates a new entry, for example, entry 602, in the database 106 and enters the flow ID and the ACK Gen count values of packet #13 in the respective fields of the newly created entry. Similarly, BB circuitry 103 creates entries 604 and 606 when respectively packet #12 and packet #7 are inspected.

FIG. 7 illustrates entries in a database 106 that is used for managing TCP ACK packets, according to some disclosed implementations. As described with respect to FIG. 1, database 106 is included in client device 102. As shown in FIG. 7, the database 106 includes one or more entries, for example, 702, 704, and 706, which are represented as rows and are also referred to as data records. Each entry includes four fields: a flow ID field 720, an ACK Gen count field 722, a replacement candidate index field 724, and a winner index field 726.

The flow ID field 720 and ACK Gen count field 722 respectively stores the flow ID and ACK Gen count values that are determined by the BB circuitry 103 while inspecting TCP ACK packets in the output queue 107. Each entry in the database 106 includes a unique combination of flow ID and ACK Gen count value. For example, entry 702 has value "flow a" in its flow ID field 720, and value "ackgen 3" in its ACK Gen Count value field 722. When the BB circuitry 103 identifies redundant duplicate TCP ACK packets, the replacement candidate index field 724 and the winner index field 726 for an entry respectively store position of the redundant duplicate packet that is to be dropped, and the position of the TCP ACK packet that is to be retained. For example, entry 702 has the queue position of packet #10 (referred to as packet #10 index) in its replacement candidate index field 724, and the queue position of packet #13 (referred to as packet #13 index) in its winner index field 726. Accordingly, when the output queue 107 is compressed, as described with respect to FIGS. 4 and 5, the BB circuitry 103 switches the positions of packet #10 and packet #13, and drops packet #10.

In each iteration, when the BB circuitry 103 starts inspecting the output queue 107, it resets the database 106 by clearing all the entries. As described previously, when inspecting a TCP ACK packet in the output queue, if the BB circuitry 103 does not find an entry in the database 106 matching the flow ID of the packet, the BB circuitry 103 *a* creates a new entry in the database 106 and enters the flow ID, ACK Gen count value, and the queue position of the packet, in the corresponding fields of the entry, as described with respect to the output queue configurations 402-408 and process 500. This is the case, for example, when the newest packet for a particular flow ID and an ACK Gen count interval is inspected. For example, as described with respect to FIGS. 4 and 5, when inspecting packet #13 in the output queue 107, the BB circuitry 103 determines that the combination of the flow ID ("flow a") and ACK Gen count value ("ackgen 3") of packet #13 is not present in the database 106. The BB circuitry 103 accordingly creates a new entry, for example, entry 702, in the database 106 and enters the flow ID, ACK Gen count value, and the queue position of packet #13 ("packet #13 index") in the respective fields 720, 722 and 726, of the newly created entry. BB circuitry 103 creates entry 704 when packet #12 is inspected, and updates the entry when packet #11, which has the same flow ID but different ACK Gen Count value compared to packet #12, is inspected. Similarly, BB circuitry 103 creates entry 706 when packet #8 is inspected, and updates the entry when packet #7 is inspected.

On the other hand, when inspecting a TCP ACK packet in the output queue, if the BB circuitry 103 finds in the database 106 an entry matching the flow ID and ACK Gen count value combination of the packet, the BB circuitry 103 determines that the packet currently inspected is a redundant duplicate. The BB circuitry 103 marks the packet to be dropped, and records the queue position of the packet in the replacement candidate index field 724 for the corresponding entry, as described with respect to the output queue configurations 402-408 and process 500. This is the case, for example, when a more recent packet for the particular flow ID and an ACK Gen count interval has already been inspected. For example, as described with respect to FIGS. 4 and 5, when inspecting packet #10 in the output queue 107, the BB circuitry 103 determines that the combination of the flow ID ("flow a") and ACK Gen count value ("ackgen 3") of packet #10 is already present in the database 106 in entry 702, which was created when packet #13 was inspected. The BB circuitry 103 accordingly marks packet #10 to be dropped, and records the queue position of packet #10 ("packet #10 index") in the replacement candidate index field 724 for entry 702. Similarly, when inspecting packet #6 in the output queue 107, BB circuitry 103 determines that the combination of the flow ID ("flow c") and ACK Gen count value ("ackgen 87") of the packet is already present in the database 106 in entry 706, which was updated when packet #11 was inspected. The BB circuitry 103 accordingly marks packet #6 to be dropped, and records the queue position of packet #6 in the replacement candidate index field 724 for entry 706. Inspecting packet #5 next in the output queue 107 (when inspecting the queue starting right to left with newest packet first, such that packet #6 is newer than packet #5 in the output queue), BB circuitry 103 determines that the combination of the flow ID ("flow c") and ACK Gen count value ("ackgen 87") of the packet is already present in the database 106 in entry 706. The BB circuitry 103 accordingly marks packet #5 to be dropped, and records the queue position of packet #5 in the replacement candidate index field 724 for entry 706, replacing the previous value that was recorded in the field 724—the queue position of packet #6.

Once the BB circuitry 103 has completed inspecting the output queue 107 in the present iteration, the entries in the database 106 are as shown in FIG. 7. BB circuitry 103 switches the positions of the winner packet and the redundant duplicate packet, as described with respect to configuration 406 in FIG. 4 and the process 500. For example, for flow ID "flow a" and ACK Gen count value "ackgen 3" (entry 702), BB circuitry 103 moves winner packet #13 to the position of redundant packet #10, which is earlier in the output queue 107, and known from the replacement candidate index field 724 in entry 702.

In some implementations, BB circuitry 103 moves the redundant packet #10 to the position of winner packet #13, which is known from the winner index field 726 in entry 702. Similar switches are done for entries 704 and 706. After completion of the switches, BB circuitry 103 discards the redundant duplicate packets, as described with respect to configuration 408 in FIG. 4 and the process 500. For example, for flow ID "flow a" and ACK Gen count value "ackgen 3" (entry 702), BB circuitry 103 drops packet #10, which is now occupying the position indicated by the winner index field 726.

In this manner, while implementing the process 500, BB circuitry 103 utilizes the database 106 to optimize the output queue 107, removing redundant duplicate packets.

In some implementations, the flow ID can be very large (for example, 116 bits or 128 bits). A large amount of memory would be needed to store flow IDs with such large sizes. The time taken to parse the flow IDs and find matches in the database 106 can also be long due to the large size of the flow ID, leading to additional delay overhead in compressing the output queue. In some implementations, the memory storage requirement or the speed of parsing the database, or both, are reduced by compacting the size of the flow ID by using the last X bits of the flow ID as a hash value to perform an initial search in the database 106. In such implementations, X is a predetermined positive integer that is smaller than a number corresponding to the full bit length of the flow ID. For example, X can be 8, 16 or 32 bits, while the full bit length of a flow ID can be 116 bits or 128 bits. In such implementations, the BB circuitry 103 uses the hash value as an index into a hash table that stores entries with <flow ID, ack_gen_count> pairs with the same hash value. The table is searched to identify entries having the same hash value as that of the flow ID of a TCP ACK packet currently processed. Since the hash value is a smaller number of bits compared to the original flow ID bit length, using the hash value reduces the time required to search the database 106.

In some implementations, when using a hash-value in the above manner, full flow IDs are also stored concurrently in the hash table. This is useful, for example, to address flow ID collisions, for example, two or more different flow IDs that map to the same hash value. In such cases, initially a search is done using the hash value to determine existence of an entry in the database. This is followed up by a second search to locate the entry using the full flow ID. When there is a hash match and a hash table entry is found, all full flow IDs that map to the hash value in the hash table entry are checked until a flow ID is found that matches the flow ID of the packet under inspection. If no match is found then the flow ID of the packet is stored in same hash table entry. Accordingly, a hash table entry includes a linear list of flow IDs that are hashed to the hash value corresponding to the entry. Using hashing in the above manner involves a trade-off between memory consumption (for example, big hash tables, but less collisions) and speed (for example, small hash tables, but greater search effort due to flow ID collisions). The size of the hash value is selected according to the tradeoff.

In some implementations, the complexity of TCP ACK optimization is O(n), where n is the number of packets in the output queue. That is, the complexity of TCP ACK optimization increases linearly as n grows. To reduce computation resource consumption and save power, it is desirable to have the flexibility of switching TCP ACK optimization on or off. Accordingly, the client device (e.g., client device 102) can be configured with features that subject TCP ACK optimization to various conditions. Implementing these features can be useful in devices or applications such as modems operating under low power mode or consumer electronic devices with affordable hardware configurations (e.g., low end smart watches and mobile phones). Example TCP ACK optimization conditions are described below with reference to the examples illustrated in FIGS. 8A-8G. The examples illustrated in FIGS. 8A-8G can be implemented on client device 102 and/or along with one or more features of TCP ACK management described with reference to FIGS. 2-7.

The examples of FIGS. 8A-8G focus on operations between an Application Processor (AP) 810 and Baseband (BB) circuitry 820. In some implementations, AP 810 is similar to TCP AP 105 and the BB circuitry 820 is similar to BBU 103. As shown, AP 810 includes application block 811 and IP stack 812, and BB circuitry 820 includes TCP-Ack optimization block 821 and Layer 2 (L2) block 822. Application block 811, IP stack block 812, TCP-Ack optimization block 821, and L2 block 822 can be functional blocks implemented by software code and/or hardware circuitry. AP 810 outputs uplink packet flow 830 to BB circuitry 820. After processing uplink packet flow 830 with L2 block 822, BB circuitry 820 outputs uplink packet flow 830 to, e.g., physical (PHY) layer for wireless transmission.

Figure 8A:
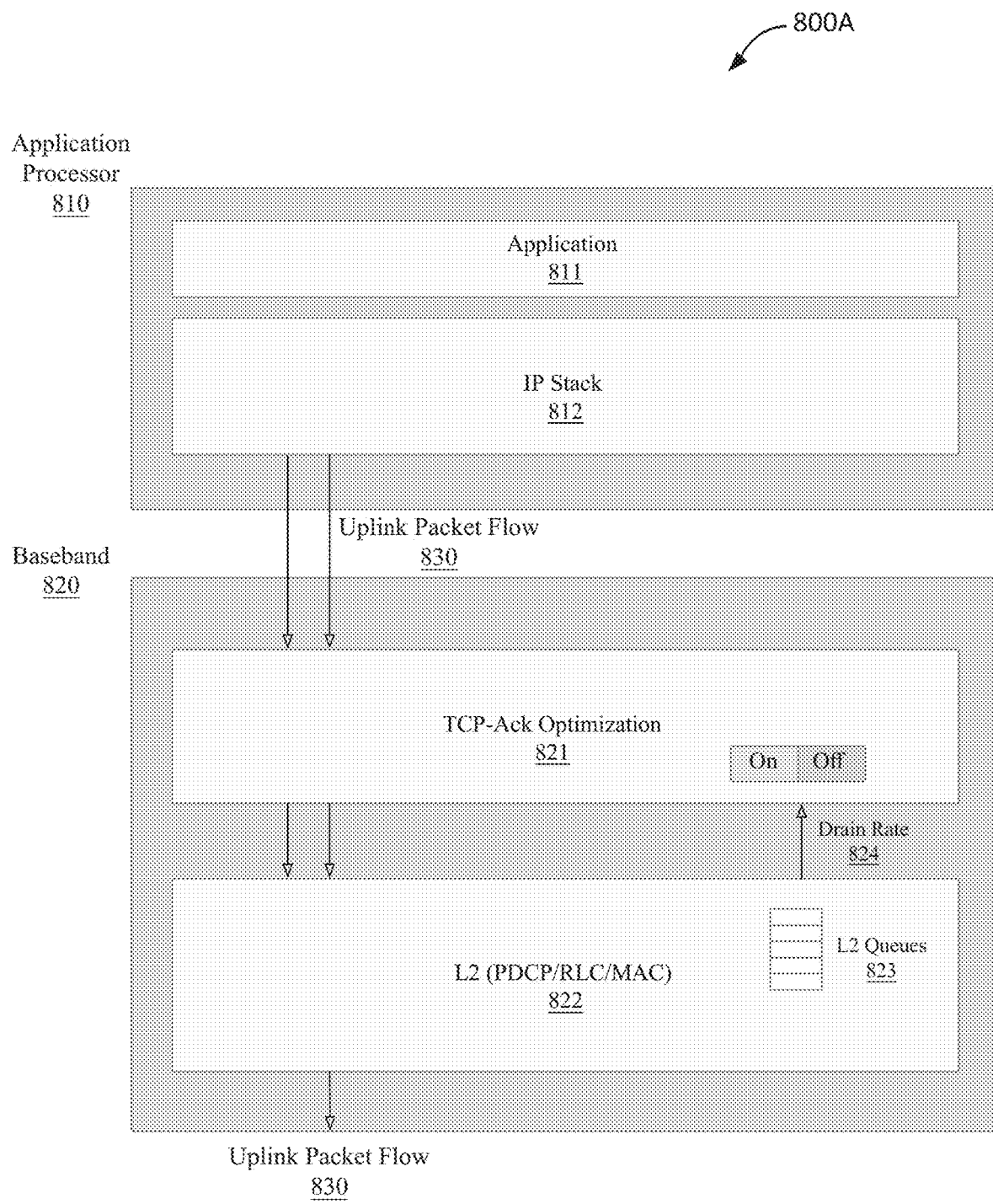
FIGS. 8A-8G each illustrate an example condition for switching TCP ACK optimization on or off according to some disclosed implementations.

FIG. 8A illustrates an example condition 800A for switching TCP ACK optimization on or off, according to some disclosed implementations. Condition 800A is based on determining whether drain rate 824 is below a threshold value. Drain rate 824 can be a parameter describing how fast packets stored in L2 queues 823 are processed (e.g., moved out from the queues and transmitted to PHY). To determine condition 800A, TCP-Ack optimization block 821 receives drain rate 824 from L2 block 822 and determines whether to switch on TCP ACK optimization to reduce backlog. If drain rate 824 exceeds the threshold value, then TCP ACK optimization block 821 can infer that the backlog in L2 queues 823 is low. If drain rate 824 is below the threshold value, then TCP ACK optimization block 821 can infer that the backlog in L2 queues 823 is high and needs optimization.

Figure 8B:
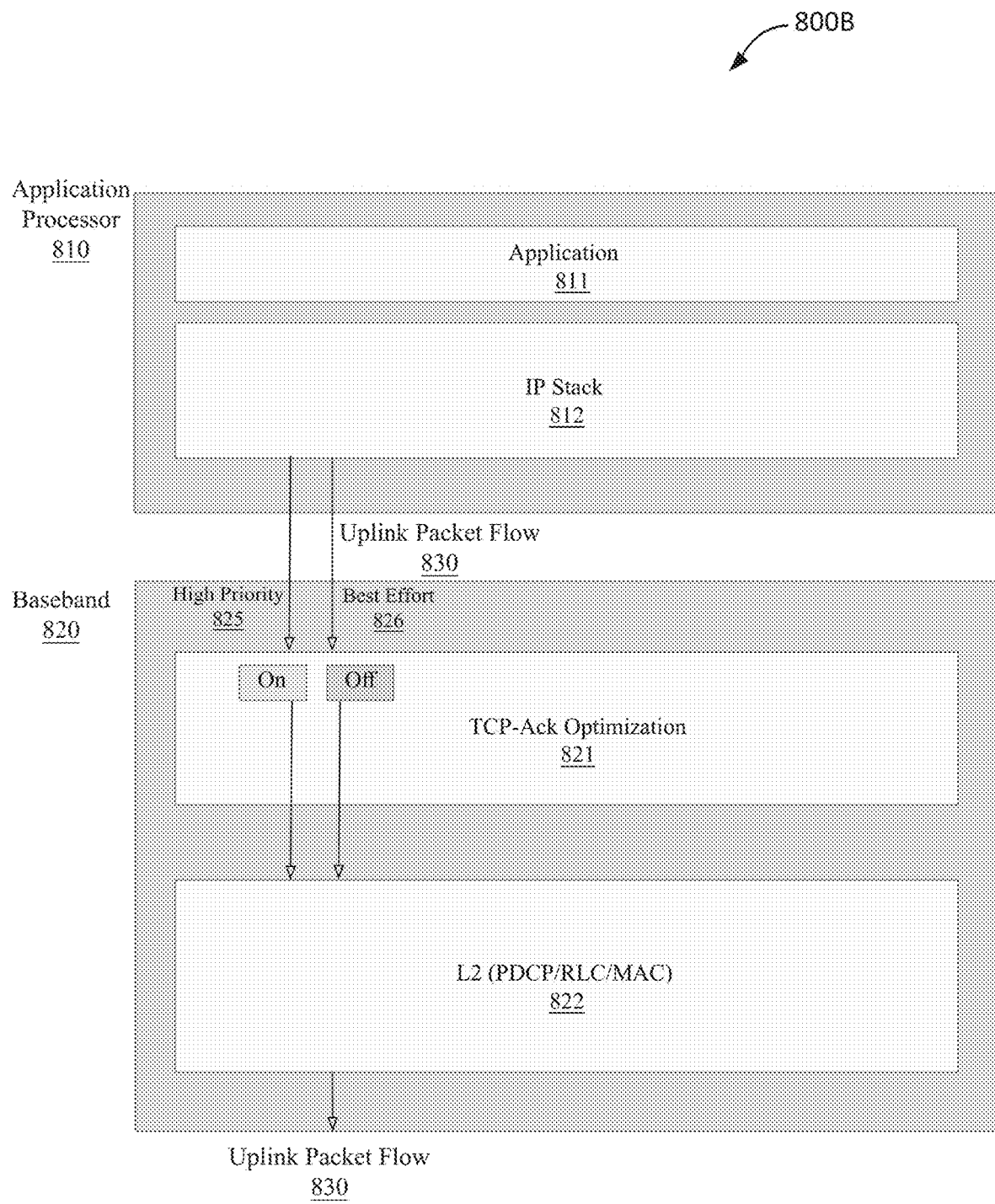

FIG. 8B illustrates an example condition 800B for switching TCP ACK optimization on or off, according to some disclosed implementations. Condition 800B is applicable when uplink packets from AP 810 to BB circuitry 820 are divided in multiple queues, including high priority queue 825 for high priority data and best effort queue 826 for best-effort data with no strict requirements concerning priority (e.g., TCP data packets in a file transfer protocol (FTP) upload). Condition 800B is based on determining whether the uplink packets to be transmitted belong to a specific one of multiple queues. In an example, AP 810 is configured to transmit all TCK ACKs in high priority queue 825. In this case, because high priority queue 825 is the only queue that has TCP ACKs, TCP ACK optimization is switched on for high priority queue 825 only and switched off for other queues. In another example, AP 810 is configured to transmit TCP ACKs in best effort queue 826 as well, though at a lower speed than data in high priority queue 825. In this case, TCP ACK optimization is switched on for best effort queue 826 only to improve processing efficiency, and switched off for other queues.

Figure 8C:
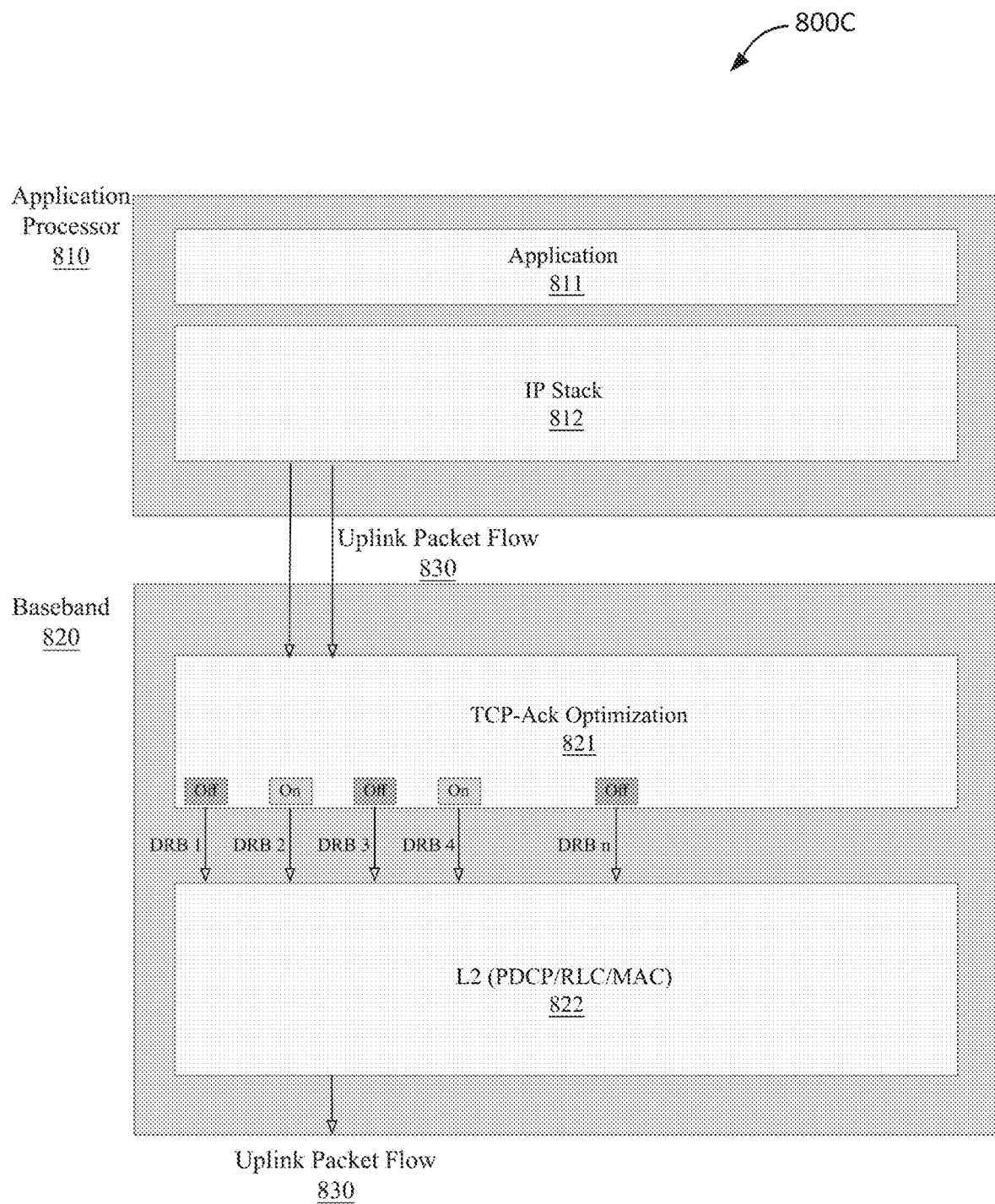

FIG. 8C illustrates an example condition 800C for switching TCP ACK optimization on or off according to some disclosed implementations. Condition 800C is applicable when multiple DRBs (e.g., radio bearers for transmitting data) are available for the L2 block to process uplink packets. In this case, condition 800C can specify certain DRBs for TCP ACK optimization. In an example, TCP ACK optimization in switched on only for the default DRB(s) for processing internet PDN. In an example, TCP ACK optimization in switched on only for DRBs whose throughputs are within a given range (e.g., DRBs with the highest throughputs, DRBs with the lowest throughputs, DRBs whose throughputs are below a threshold, or DRBs whose throughputs are above a threshold). In an example, TCP ACK optimization in switched on only for bidirectional DRBs (e.g., DRBs having both uplink data and incoming downlink data).

Figure 8D:
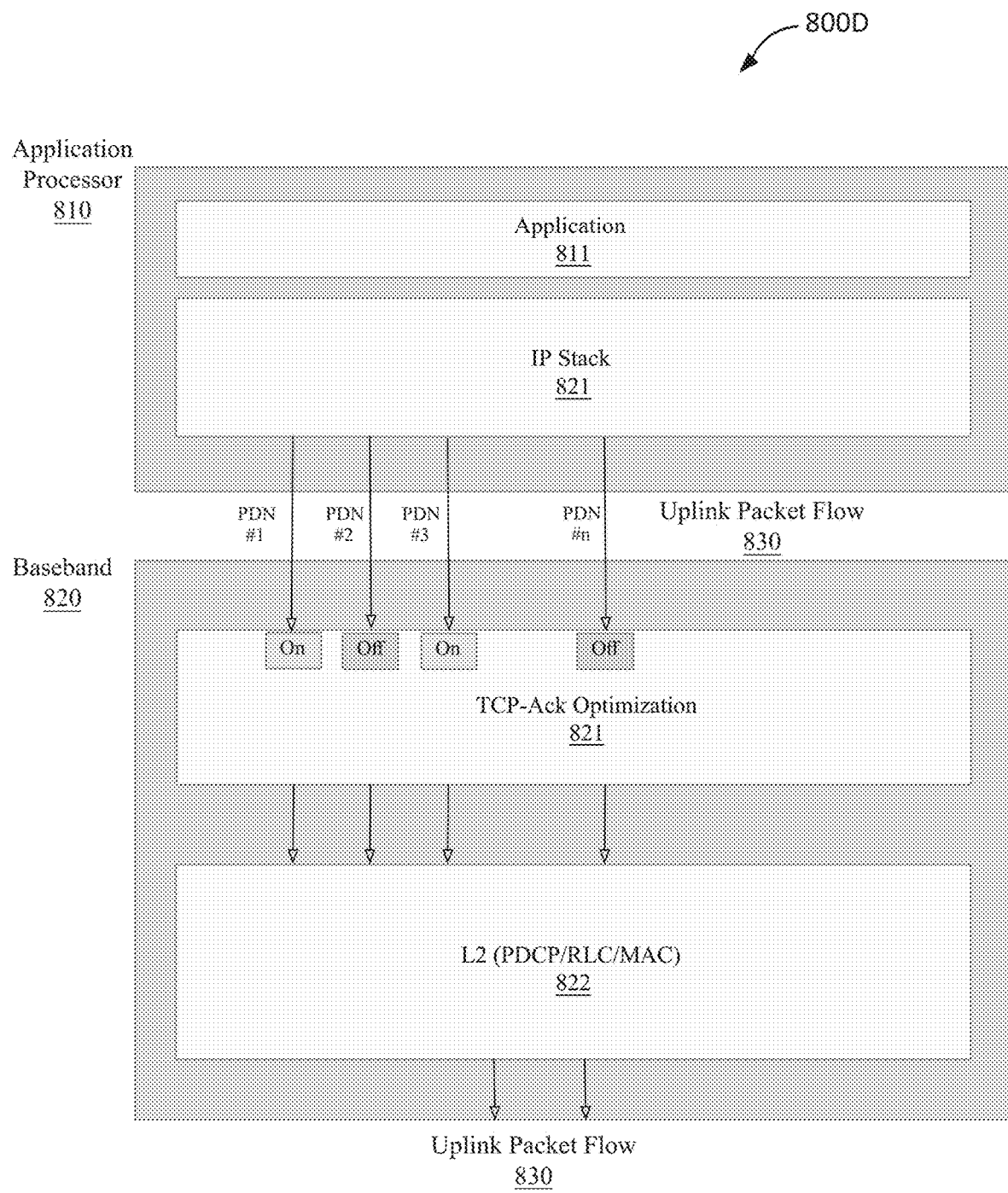

FIG. 8D illustrates an example condition 800D for switching TCP ACK optimization on or off according to some disclosed implementations. Condition 800D is applicable when multiple PDNs are available from AP 810 to BB circuitry 820. Because not all PDNs have high throughput, condition 800D can select one or more PDNs for TCP ACK optimization based on, e.g., the throughput needs of the PDNs.

Figure 8E:
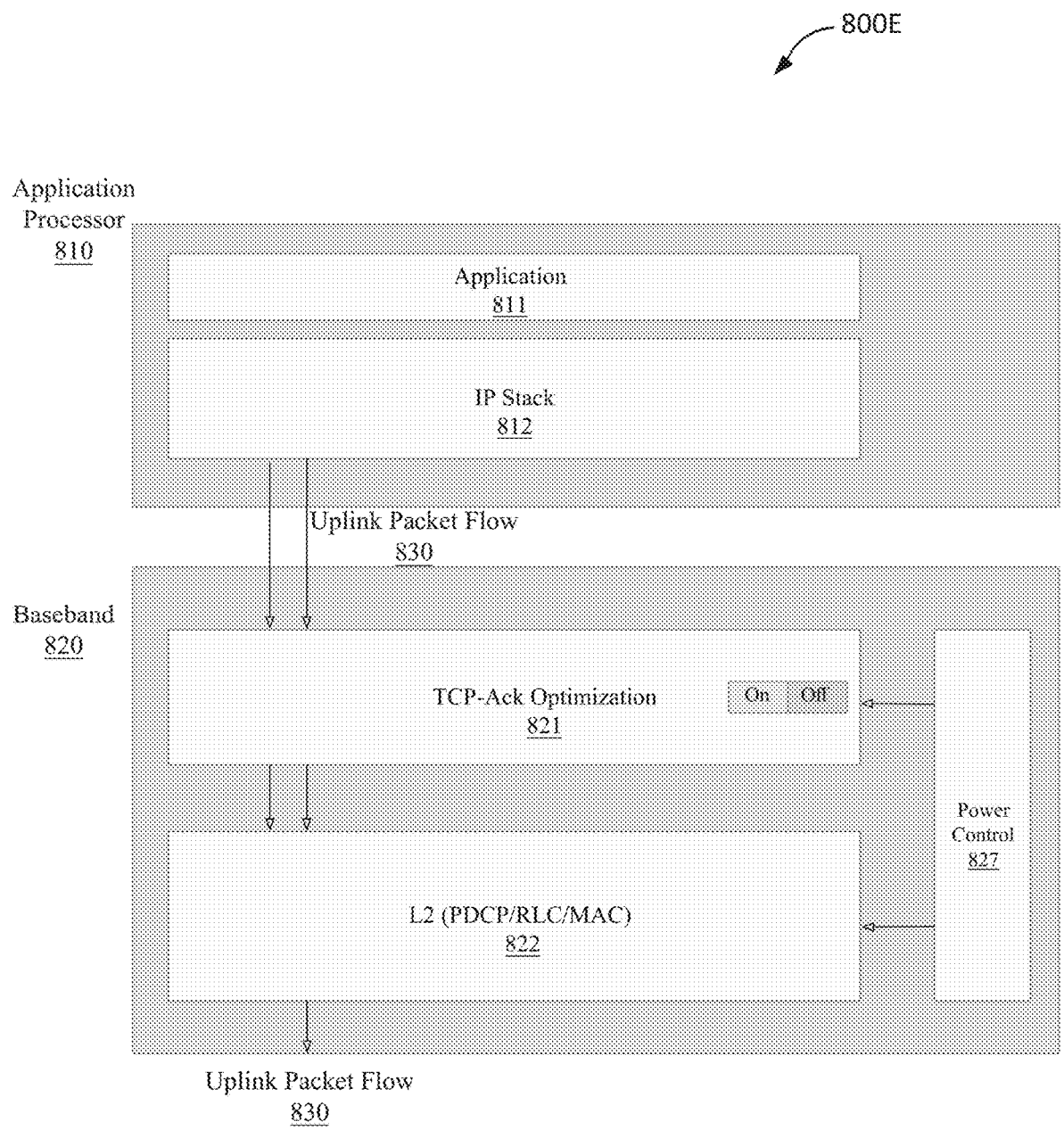

FIG. 8E illustrates an example condition 800E for switching TCP ACK optimization on or off according to some disclosed implementations. Condition 800E is based on the power mode of the client device. When the client device operates in a low power mode as controlled by power control block 827, TCP ACK optimization can be switched off to save power. Otherwise, TCP ACK optimization can be switched on to improve data transmission efficiency.

Figure 8F:
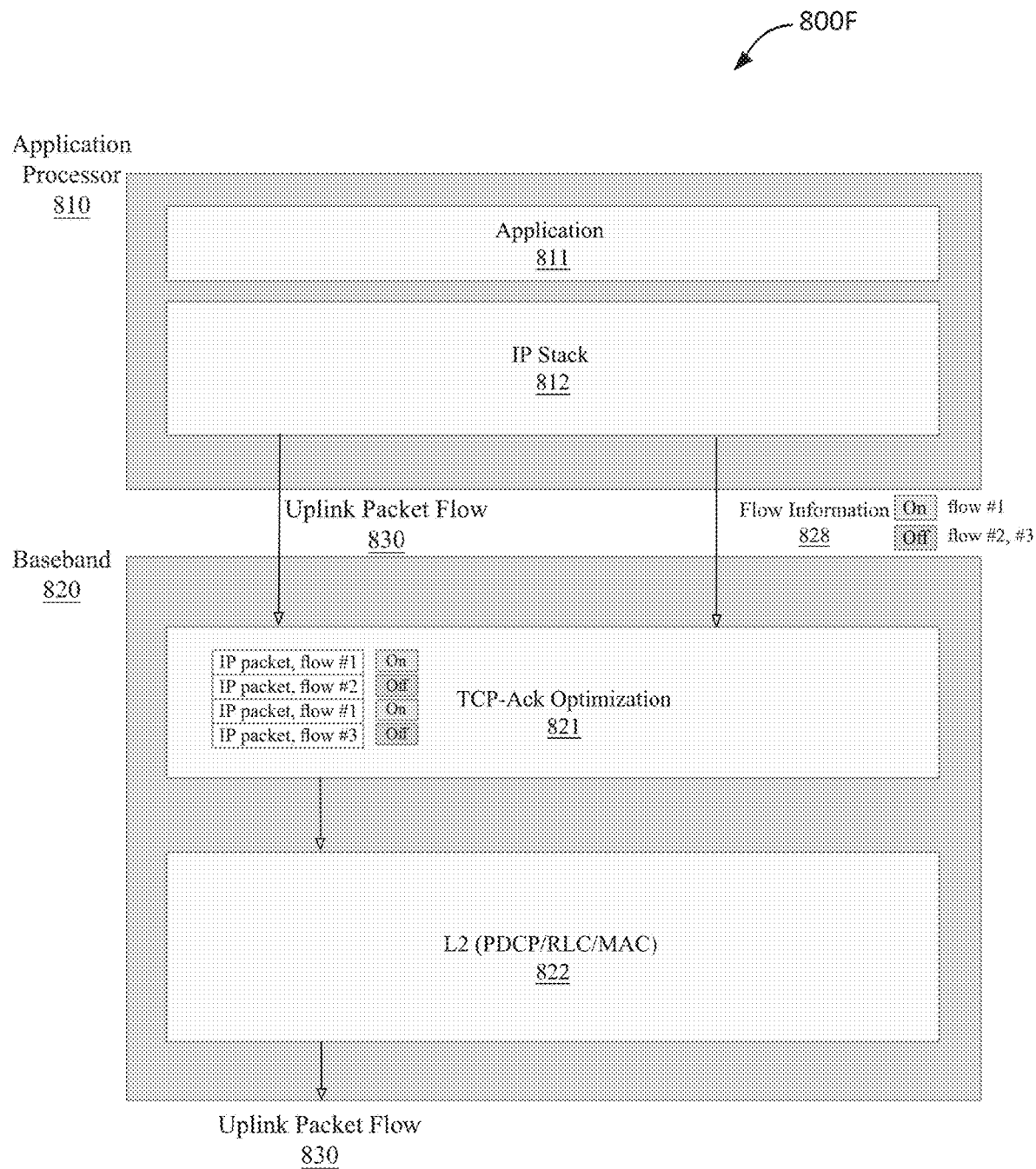

FIG. 8F illustrates an example condition 800F for switching TCP ACK optimization on or off according to some disclosed implementations. Condition 800F is applicable when IP stack 812 divides the uplink data into multiple flows of IP packets. In this case, condition 800F can select certain IP packet flows for TCP ACK optimization. Example selection criteria include historical information of the IP packet flows and information of TCP receiving window adaptation. For instance, when a UE recognizes that a large number of TCP ACKs were present in previous packets of a specific flow, the UE can switch on TCP ACK optimization for all subsequent packets of the same flow. Conversely, when the UE recognizes that no TCP ACKs were present in previous packets of a specific flow, the UE can switch off TCP ACK optimization for the same flow. In addition, the UE can be configured to switch on TCP ACK optimization if the TCP sliding window is small (e.g., smaller than a given threshold), in order to reduce the number of packets sent. These criteria can be based on flow information 828 provided by, e.g., IP stack 812.

Figure 8G:
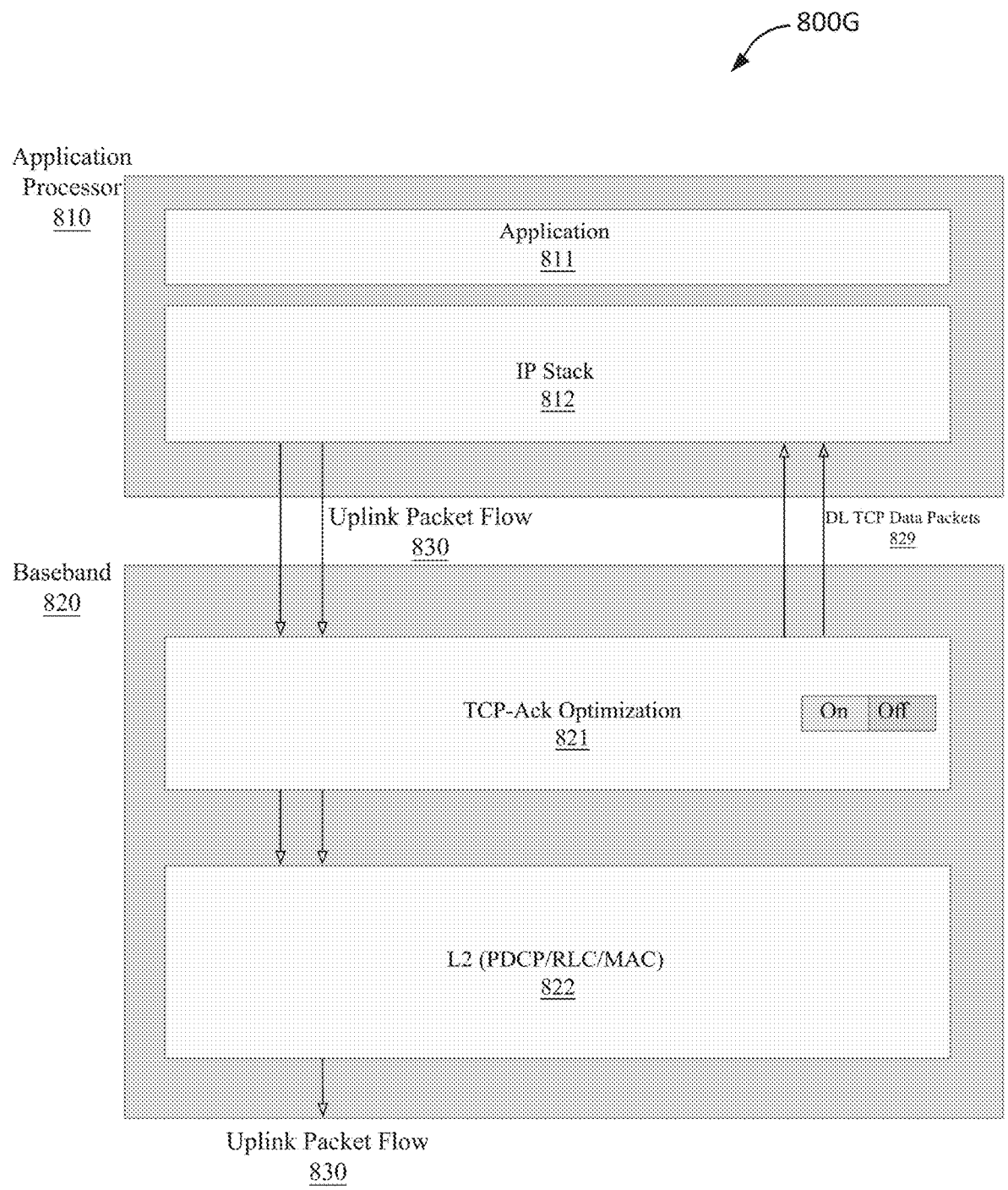

FIG. 8G illustrates an example condition 800G for switching TCP ACK optimization on or off according to some disclosed implementations. Condition 800G is based on determining whether BB circuitry 820 detects downlink TCP data packets 829. For example, TCP ACK optimization can be switched on only when BB circuitry 820 detects downlink TCP data packets 829. This is because when there are no downlink TCP data, no TCP ACK will be sent in the uplink direction and thus TCP ACK optimization is not needed.

The conditions described above with respect to the examples of FIGS. 8A-8G, along with other possible conditions for switching TCP ACK optimization on and off, provide great flexibility for the client device to balance between performance measures such as power consumption, computing resources, hardware complexity, and transmission latency. A client device can implement one or more of these conditions depending on its specific performance needs.

Figure 9:
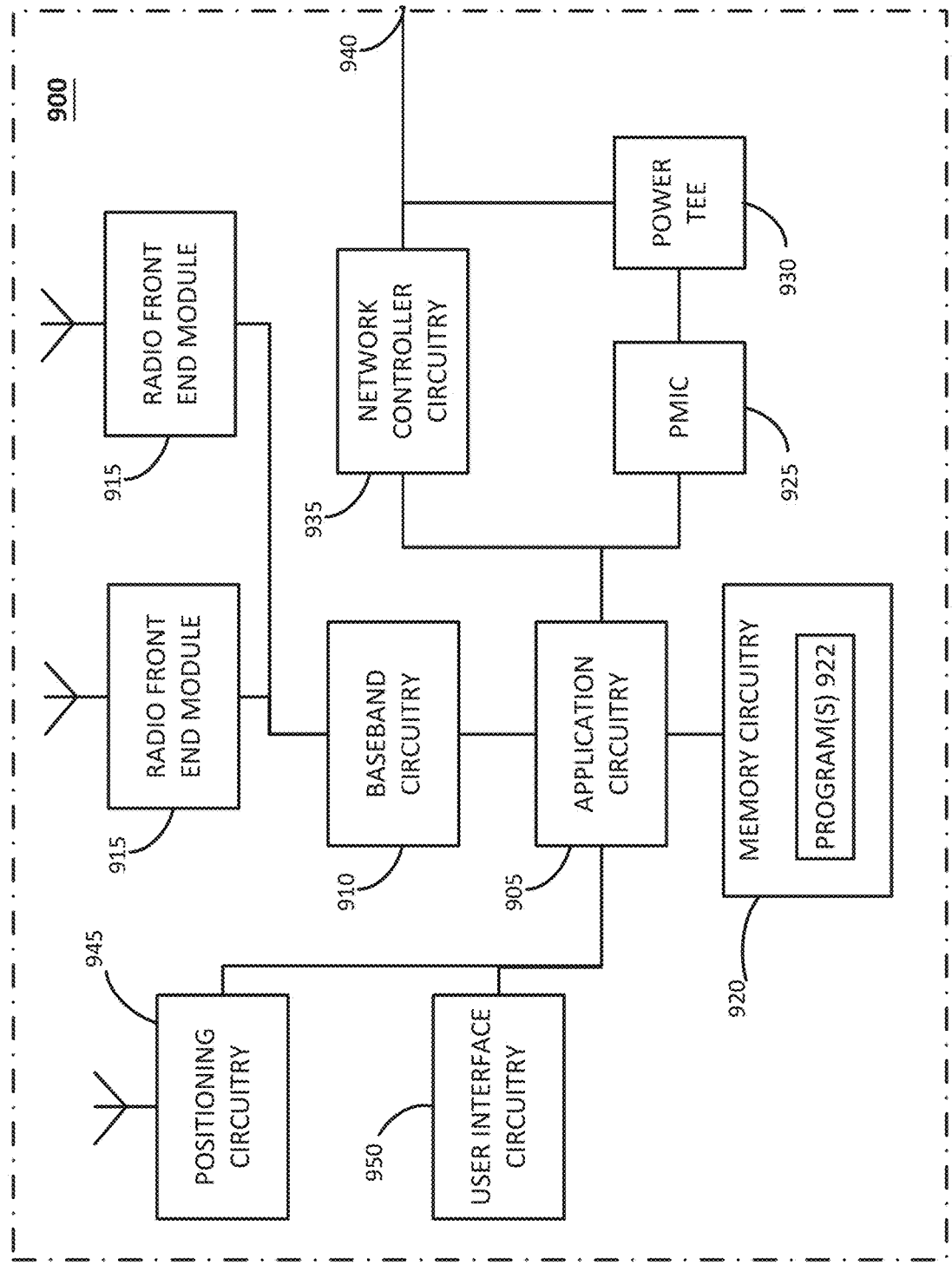
FIG. 9 illustrates a block diagram of a communication device according to some disclosed implementations.

FIG. 9 illustrates an example of infrastructure equipment 900 in accordance with various implementations. The infrastructure equipment 900 (or "system 900") can be implemented as a base station, radio head, RAN node such as the RAN nodes 112a and 112b and/or AP 104 shown and described previously, application server 110, and/or any other element/device discussed herein. In other examples, the system 900 can be implemented in or by a client device 102. The system 900 includes application circuitry 905, baseband circuitry 910, one or more radio front end modules (RFEMs) 915, memory circuitry 920, program(s) 922 stored in the memory 920, power management integrated circuitry (PMIC) 925, power tee circuitry 930, network controller circuitry 935, network interface connector 940, satellite positioning circuitry 945, and user interface 950.

In some implementations, the device 900 can include additional elements such as, for example, memory/storage, display, camera, sensor, or input/output (I/O) interface. In other implementations, the components described below can be included in more than one device. For example, said circuitries can be separately included in more than one device for CRAN, vBBU, or other like implementations.

Application circuitry 905 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) Multimedia Card (MMC) or similar, Universal Serial Bus (USB) interfaces, Mobile Industry Processor Interface (MIPI) interfaces and Joint Test Access Group (JTAG) test access ports. The processors (or cores) of the application circuitry 905 can be coupled with or can include memory/storage elements and can be configured to execute instructions stored in the memory/storage to enable various applications or operating systems to run on the system 900. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof.

In some implementations, the application circuitry 905 can comprise, or can be, a special-purpose processor/controller to operate according to the various implementations herein. As examples, the processor(s) of application circuitry 905 can include one or more can include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium(TM), Inc.; a MIPS-based design from MIPS Technologies, Inc. Such as MIPS Warrior P-class processors; and/or the like. In some implementations, the system 900 may not utilize application circuitry 905, and instead can include a special-purpose processor/controller to process IP data received from an EPC or 5GC, for example.

In some implementations, the application circuitry 905 can include one or more hardware accelerators, which can be microprocessors, programmable processing devices, or the like. The one or more hardware accelerators can include, for example, computer vision (CV) and/or deep learning (DL) accelerators. As examples, the programmable processing devices can be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 905 can comprise logic blocks or logic fabric, and other interconnected resources that can be programmed to perform various functions, such as the procedures, methods, functions, etc.

In some implementations, the circuitry of application circuitry 905 can include memory cells (for example, erasable programmable read-only memory (EPROM), electrically erasable programmable read-only memory (EEPROM), flash memory, static memory (for example, static random access memory (SRAM), anti-fuses, etc.)) used to store logic blocks, logic fabric, data, etc.

The baseband circuitry 910 can be implemented, for example, as a solder-down substrate including one or more integrated circuits, a single packaged integrated circuit soldered to a main circuit board or a multi-chip module containing two or more integrated circuits.

User interface circuitry 950 can include one or more user interfaces designed to enable user interaction with the system 900 or peripheral component interfaces designed to enable peripheral component interaction with the system 900. User interfaces can include, but are not limited to, one or more physical or virtual buttons (for example, a reset button), one or more indicators (for example, light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces can include, but are not limited to, a nonvolatile memory port, a universal serial bus (USB) port, an audio jack, a power supply interface, etc.

The radio front end modules (RFEMs) 915 can comprise a millimeter wave (mmWave) RFEM and one or more sub-mmWave radio frequency integrated circuits (RFICs). In some implementations, the one or more sub-mmWave RFICs can be physically separated from the mmWave RFEM. The RFICs can include connections to one or more antennas or antenna arrays, and the RFEM can be connected to multiple antennas. In alternative implementations, both mmWave and sub-mmWave radio functions can be implemented in the same physical RFEM 915, which incorporates both mmWave antennas and sub-mmWave.

The memory circuitry 920 can include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 920 can be implemented as one or more of solder down packaged integrated circuits, socketed memory modules and plug-in memory cards.

The PMIC 925 can include voltage regulators, surge protectors, power alarm detection circuitry, and one or more backup power sources such as a battery or capacitor. The power alarm detection circuitry can detect one or more of brown out (under-voltage) and surge (over-voltage) conditions.

The power tee circuitry 930 can provide for electrical power drawn from a network cable to provide both power supply and data connectivity to the infrastructure equipment 900 using a single cable.

The network controller circuitry 935 can provide connectivity to a network using a standard network interface protocol such as Ethernet, Ethernet over GRE Tunnels, Ethernet over Multiprotocol Label Switching (MPLS), or some other suitable protocol. Network connectivity can be provided to/from the infrastructure equipment 900 via network interface connector 940 using a physical connection, which can be electrical (commonly referred to as a "copper interconnect"), optical, or wireless. The network controller circuitry 935 can include one or more dedicated processors and/or FPGAs to communicate using one or more of the aforementioned protocols. In some implementations, the network controller circuitry 935 can include multiple controllers to provide connectivity to other networks using the same or different protocols.

The positioning circuitry 945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (for example, Navigation with Indian Constellation (NAVIC), Japan's Quasi-Zenith Satellite System (QZSS), France's Doppler Orbitography and Radiopositioning Integrated by Satellite (DORIS), etc.), or the like.

The positioning circuitry 945 comprises various hardware elements (for example, including hardware devices such as switches, filters, amplifiers, antenna elements, and the like to facilitate OTA communications) to communicate with components of a positioning network, such as navigation satellite constellation nodes. In some implementations, the positioning circuitry 945 can include a Micro-Technology for Positioning, Navigation, and Timing (Micro-PNT) IC that uses a master timing clock to perform position tracking/estimation without GNSS assistance. The positioning circuitry 945 can also be part of, or interact with, the baseband circuitry 910 and/or RFEMs 915 to communicate with the nodes and components of the positioning network. The positioning circuitry 945 can also provide position data and/or time data to the application circuitry 905, which can use the data to synchronize operations with various infrastructure (for example, RAN nodes 112a, 112b, etc.), or the like.

The components shown by FIG. 9 can communicate with one another using interface circuitry, which can include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX can be a proprietary bus, for example, used in a SoC based system. Other bus/IX systems can be included, such as an I2C interface, an SPI interface, point to point interfaces, and a power bus, among others.

Figure 10:
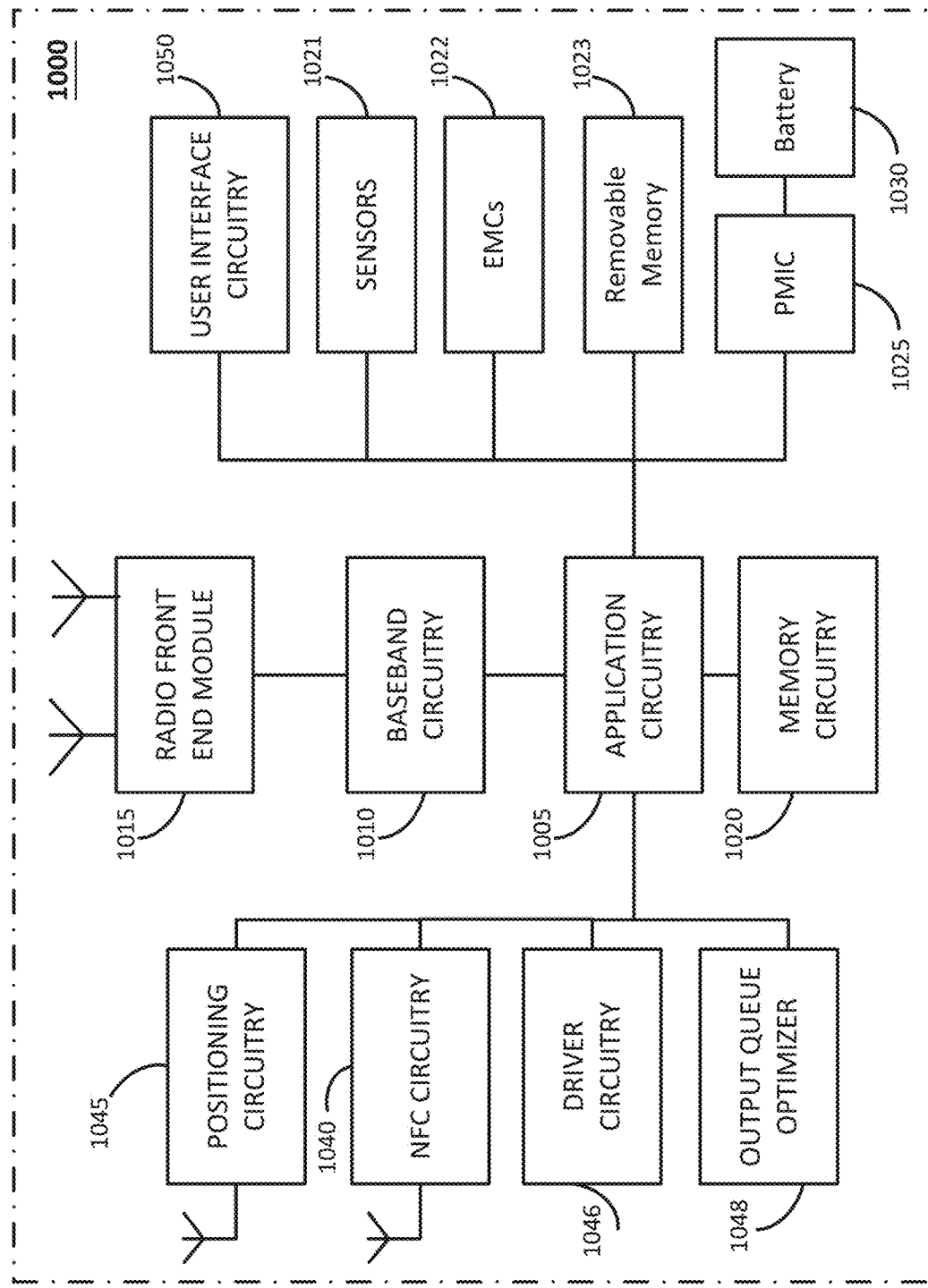
FIG. 10 illustrates a block diagram of a communication device according to some disclosed implementations.

FIG. 10 illustrates an example of a computer platform 1000 (or "device 1000") in accordance with various implementations. In some implementations, the computer platform 1000 may be suitable for use as client device 102, application server 110 and/or any other element/device discussed herein. The platform 1000 can include any combinations of the components shown in the example. The components of platform 1000 can be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown can be omitted, additional components can be present, and different arrangement of the components shown can occur in other implementations.

Application circuitry 1005 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1005 can be coupled with or can include memory/storage elements and can be configured to execute instructions stored in the memory/storage to enable various applications or operating systems to run on the system 1000. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 can include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof.

In some implementations, the application circuitry 1005 can comprise, or can be, a special-purpose processor/controller to operate according to the various implementations herein. As examples, the processor(s) of application circuitry 1005 can include an Apple A-series processor. The processors of the application circuitry 1005 can also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like.

In some implementations, the application circuitry 1005 can be a part of a system on a chip (SoC) in which the application circuitry 1005 and other components are formed into a single integrated circuit. Additionally or alternatively, application circuitry 1005 can include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1005 can comprise logic blocks or logic fabric, and other interconnected resources that can be programmed to perform various functions, such as the procedures, methods, functions, etc.

In some implementations, the circuitry of application circuitry 1005 can include memory cells (for example, erasable programmable read-only memory (EPROM), electrically erasable programmable read-only memory (EEPROM), flash memory, static memory (for example, static random access memory (SRAM), anti-fuses, etc.)) used to store logic blocks, logic fabric, data, etc. In some implementations, client device 102 can include one or more processors configured to execute software instructions stored in application circuitry 1005. Application circuitry 1005 can include output queue optimizer 1048.

The baseband circuitry 1010 can be implemented, for example, as a solder-down substrate including one or more integrated circuits, a single packaged integrated circuit soldered to a main circuit board or a multi-chip module containing two or more integrated circuits. In some implementations, baseband circuitry 1010 is similar to the baseband circuitry 103. In some implementations, operations performed by interactions between the output queue optimizer 1048 and the baseband circuitry 1010 are similar to operations performed by the BB circuitry 103 to manage the output queue 107. This can be the case, for example, when one or more processors associated with the BB circuitry 103 executes instructions to perform operations that are similar to those performed by the output queue optimizer 1048 and the baseband circuitry 1010.

The RFEMs 1015 can comprise a millimeter wave (mmWave) RFEM and one or more sub-mmWave radio frequency integrated circuits (RFICs). In some implementations, the one or more sub-mmWave RFICs can be physically separated from the mmWave RFEM. The RFICs can include connections to one or more antennas or antenna arrays, and the RFEM can be connected to multiple antennas. In alternative implementations, both mmWave and sub-mmWave radio functions can be implemented in the same physical RFEM 1015, which incorporates both mmWave antennas and sub-mmWave.

The memory circuitry 1020 can include any number and type of memory devices used to provide for a given amount of system memory. As examples, the memory circuitry 1020 can include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc.

The memory circuitry 1020 can be developed in accordance with a Joint Electron Devices Engineering Council (JEDEC) low power double data rate (LPDDR)-based design, such as LPDDR2, LPDDR3, LPDDR4, or the like. Memory circuitry 1020 can be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1020 may be on-die memory or registers associated with the application circuitry 1005. To provide for persistent storage of information such as data, applications, operating systems and so forth, memory circuitry 1020 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1000 may incorporate the three-dimensional (3D) cross-point (XPOINT) memories from Intel® and Micron®.

Removable memory circuitry 1023 may include devices, circuitry, enclosures/housings, ports or receptacles, etc. Used to couple portable data storage devices with the platform 1000. These portable data storage devices may be used for mass storage purposes, and may include, for example, flash memory cards (for example, Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensor circuitry 1021 and electro-mechanical components (EMCs) 1022, as well as removable memory devices coupled to removable memory circuitry 1023.

The sensor circuitry 1021 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (for example, thermistors); pressure sensors; barometric pressure sensors; gravimeters; altimeters; image capture devices (for example, cameras or lensless apertures); light detection and ranging (LiDAR) sensors; proximity sensors (for example, infrared radiation detector and the like), depth sensors, ambient light sensors, ultrasonic transceivers; microphones or other like audio capture devices; etc.

EMCs 1022 include devices, modules, or subsystems whose purpose is to enable platform 1000 to change its state, position, and/or orientation, or move or control a mechanism or (sub)system. Additionally, EMCs 1022 can be configured to generate and send messages/signaling to other components of the platform 1000 to indicate a current state of the EMCs 1022. Examples of the EMCs 1022 include one or more power switches, relays including electromechanical relays (EMRs) and/or solid state relays (SSRs), actuators (for example, valve actuators, etc.), an audible sound generator, a visual warning device, motors (for example, DC motors, stepper motors, etc.), wheels, thrusters, propellers, claws, clamps, hooks, and/or other like electro-mechanical components. In implementations, platform 1000 is configured to operate one or more EMCs 1022 based on one or more captured events and/or instructions or control signals received from a service provider and/or various clients.

In some implementations, the interface circuitry can connect the platform 1000 with positioning circuitry 1045. The positioning circuitry 1045 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (for example, NAVIC), Japan's QZSS, France's DORIS, etc.), or the like. The positioning circuitry 1045 comprises various hardware elements (for example, including hardware devices such as switches, filters, amplifiers, antenna elements, and the like to facilitate OTA communications) to communicate with components of a positioning network, such as navigation satellite constellation nodes. In some implementations, the positioning circuitry 1045 can include a Micro-PNT IC that uses a master timing clock to perform position tracking/estimation without GNSS assistance. The positioning circuitry 1045 can also be part of, or interact with, the baseband circuitry 1010 and/or RFEMs 1015 to communicate with the nodes and components of the positioning network. The positioning circuitry 1045 can also provide position data and/or time data to the application circuitry 1005, which can use the data to synchronize operations with various infrastructure (for example, radio base stations), for turn-by-turn navigation applications, or the like In some implementations, the interface circuitry can connect the platform 1000 with Near-Field Communication (NFC) circuitry 1040. NFC circuitry 1040 is configured to provide contactless, short-range communications based on radio frequency identification (RFID) standards, wherein magnetic field induction is used to enable communication between NFC circuitry 1040 and NFC-enabled devices external to the platform 1000 (for example, an "NFC touchpoint"). NFC circuitry 1040 comprises an NFC controller coupled with an antenna element and a processor coupled with the NFC controller. The NFC controller can be a chip/IC providing NFC functionalities to the NFC circuitry 1040 by executing NFC controller firmware and an NFC stack. The NFC stack can be executed by the processor to control the NFC controller, and the NFC controller firmware can be executed by the NFC controller to control the antenna element to emit short-range RF signals. The RF signals can power a passive NFC tag (for example, a microchip embedded in a sticker or wristband) to transmit stored data to the NFC circuitry 1040, or initiate data transfer between the NFC circuitry 1040 and another active NFC device (for example, a smartphone or an NFC-enabled POS terminal) that is proximate to the platform 1000.

The driver circuitry 1046 can include software and hardware elements that operate to control particular devices that are embedded in the platform 1000, attached to the platform 1000, or otherwise communicatively coupled with the platform 1000. The driver circuitry 1046 can include individual drivers allowing other components of the platform 1000 to interact with or control various input/output (I/O) devices that can be present within, or connected to, the platform 1000. For example, driver circuitry 1046 can include a display driver to control and allow access to a display device, a touchscreen driver to control and allow access to a touchscreen interface of the platform 1000, sensor drivers to obtain sensor readings of sensor circuitry 1021 and control and allow access to sensor circuitry 1021, EMC drivers to obtain actuator positions of the EMCs 1022 and/or control and allow access to the EMCs 1022, a camera driver to control and allow access to an embedded image capture device, audio drivers to control and allow access to one or more audio devices.

The power management integrated circuitry (PMIC) 1025 (also referred to as "power management circuitry 1025") can manage power provided to various components of the platform 1000. In particular, with respect to the baseband circuitry 1010, the PMIC 1025 can control power-source selection, voltage scaling, battery charging, or DC-to-DC conversion. The PMIC 1025 can often be included when the platform 1000 is capable of being powered by a battery 1030, for example, when the device is included in a client device 102.

In some implementations, the PMIC 1025 can control, or otherwise be part of, various power saving mechanisms of the platform 1000. For example, if the platform 1000 is in an RRC_Connected state, where it is still connected to the RAN node as it expects to receive traffic shortly, then it can enter a state known as Discontinuous Reception Mode (DRX) after a period of inactivity. During this state, the platform 1000 can power down for brief intervals of time and thus save power. If there is no data traffic activity for an extended period of time, then the platform 1000 can transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 cannot receive data in this state; in order to receive data, it must transition back to RRC_Connected state. An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

A battery 1030 can power the platform 1000, although in some examples the platform 1000 can be mounted deployed in a fixed location, and can have a power supply coupled to an electrical grid. The battery 1030 can be a lithium ion battery, a metal-air battery, such as a zinc-air battery, an aluminum-air battery, a lithium-air battery, and the like. In some implementations, such as in V2X applications, the battery 1030 can be a typical lead-acid automotive battery.

In some implementations, the battery 1030 can be a "smart battery," which includes or is coupled with a Battery Management System (BMS) or battery monitoring integrated circuitry. The BMS can be included in the platform 1000 to track the state of charge (SoCh) of the battery 1030. The BMS can be used to monitor other parameters of the battery 1030 to provide failure predictions, such as the state of health (SoH) and the state of function (SoF) of the battery 1030. The BMS can communicate the information of the battery 1030 to the application circuitry 1005 or other components of the platform 1000. The BMS can also include an analog-to-digital (ADC) convertor that allows the application circuitry 1005 to directly monitor the voltage of the battery 1030 or the current flow from the battery 1030. The battery parameters can be used to determine actions that the platform 1000 can perform, such as transmission frequency, network operation, sensing frequency, and the like.

A power block, or other power supply coupled to an electrical grid can be coupled with the BMS to charge the battery 1030. In some examples, the power block 1030 can be replaced with a wireless power receiver to obtain the power wirelessly, for example, through a loop antenna in the computer platform 1000. In these examples, a wireless battery charging circuit can be included in the BMS. The specific charging circuits chosen can depend on the size of the battery 1030, and thus, the current required. The charging can be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1050 includes various input/output (I/O) devices present within, or connected to, the platform 1000, and includes one or more user interfaces designed to enable user interaction with the platform 1000 and/or peripheral component interfaces designed to enable peripheral component interaction with the platform 1000.

The user interface circuitry 1050 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry can include any number and/or combinations of audio or visual display, including, inter alia, one or more simple visual outputs/indicators (for example, binary status indicators (for example, light emitting diodes (LEDs)) and multi-character visual outputs, or more complex outputs such as display devices or touchscreens (for example, Liquid Chrystal Displays (LCD), LED displays, quantum dot displays, projectors, etc.), with the output of characters, graphics, multimedia objects, and the like being generated or produced from the operation of the platform 1000. The output device circuitry can also include speakers or other audio emitting devices, printer(s), and/or the like.

In some implementations, the sensor circuitry 1021 can be used as the input device circuitry (for example, an image capture device, motion capture device, or the like) and one or more EMCs may be used as the output device circuitry (for example, an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which can include any number of technologies, including ISA, EISA, PCI, PCIx, PCIe, a Time-Trigger Protocol (TTP) system, a FlexRay system, or any number of other technologies. The bus/IX can be a proprietary bus/IX, for example, used in a SoC based system. Other bus/IX systems can be included, such as an I2C interface, an SPI interface, point-to-point interfaces, and a power bus, among others.

Figure 11:
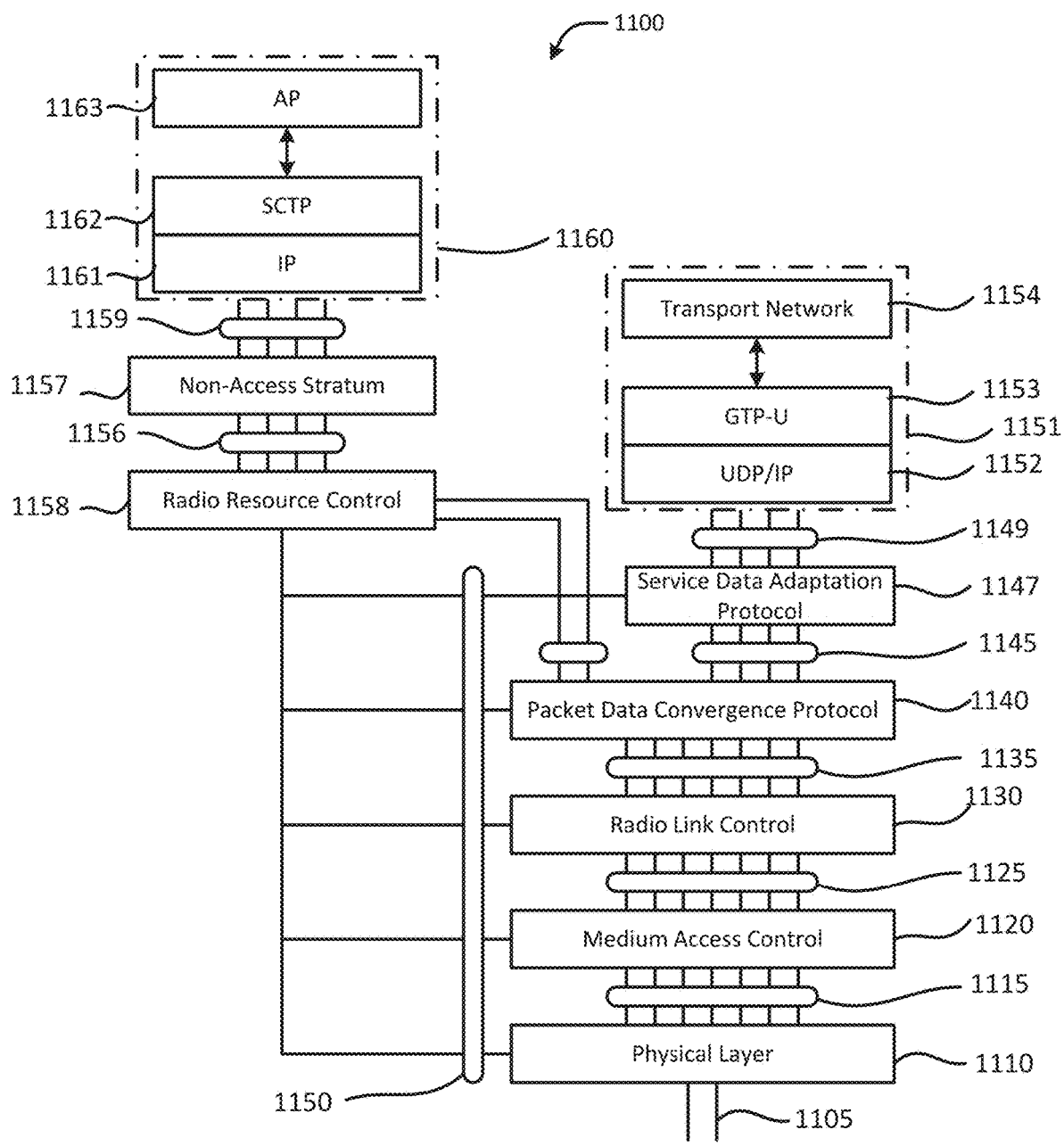
FIG. 11 illustrates a 3GPP protocol stack according to some disclosed implementations.

FIG. 11 illustrates various protocol functions that can be implemented in a wireless communication device according to various implementations. In particular, FIG. 11 includes an arrangement 1100 showing interconnections between various protocol layers/entities. The following description of FIG. 11 is provided for various protocol layers/entities that operate in conjunction with the 5G/NR system standards and LTE system standards, but some or all of the aspects of FIG. 11 can be applicable to other wireless communication network systems as well.

The protocol layers of arrangement 1100 can include one or more of PHY 1110, MAC 1120, RLC 1130, PDCP 1140, SDAP 1147, RRC 1155, and NAS layer 1157, in addition to other higher layer functions not illustrated. The protocol layers can include one or more service access points (for example, items 1159, 1156, 1150, 1149, 1145, 1135, 1125, and 1115 in FIG. 11) that can provide communication between two or more protocol layers.

The PHY 1110 can transmit and receive physical layer signals 1105 that can be received from or transmitted to one or more other communication devices. The physical layer signals 1105 can comprise one or more physical channels, such as those discussed herein. The PHY 1110 can further perform link adaptation or adaptive modulation and coding (AMC), power control, cell search (for example, for initial synchronization and handover purposes), and other measurements used by higher layers, such as the RRC 1155. The PHY 1110 can still further perform error detection on the transport channels, forward error correction (FEC) coding/decoding of the transport channels, modulation/demodulation of physical channels, interleaving, rate matching, mapping onto physical channels, and MIMO antenna processing. In implementations, an instance of PHY 1110 can process requests from and provide indications to an instance of MAC 1120 via one or more PHY-SAP 1115. According to some implementations, requests and indications communicated via PHY-SAP 1115 may comprise one or more transport channels.

Instance(s) of MAC 1120 can process requests from, and provide indications to, an instance of RLC 1130 via one or more MAC-SAPs 1125. These requests and indications communicated via the MAC-SAP 1125 may comprise one or more logical channels. The MAC 1120 can perform mapping between the logical channels and transport channels, multiplexing of MAC SDUs from one or more logical channels onto TBs to be delivered to PHY 1110 via the transport channels, de-multiplexing MAC SDUs to one or more logical channels from TBs delivered from the PHY 1110 via transport channels, multiplexing MAC SDUs onto TBs, scheduling information reporting, error correction through HARQ, and logical channel prioritization.

Instance(s) of RLC 1130 can process requests from and provide indications to an instance of PDCP 1140 via one or more radio link control service access points (RLC-SAP) 1135. These requests and indications communicated via RLC-SAP 1135 may comprise one or more RLC channels. The RLC 1130 can operate in a plurality of modes of operation, including: Transparent Mode (TM), Unacknowledged Mode (UM), and Acknowledged Mode (AM). The RLC 1130 can execute transfer of upper layer protocol data units (PDUs), error correction through automatic repeat request (ARQ) for AM data transfers, and concatenation, segmentation and reassembly of RLC SDUs for UM and AM data transfers. The RLC 1130 can also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1140 can process requests from and provide indications to instance(s) of RRC 1155 and/or instance(s) of SDAP 1147 via one or more packet data convergence protocol service access points (PDCP-SAP) 1145. These requests and indications communicated via PDCP-SAP 1145 may comprise one or more radio bearers. The PDCP 1140 can execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (for example, ciphering, deciphering, integrity protection, integrity verification, etc.).

Instance(s) of SDAP 1147 can process requests from and provide indications to one or more higher layer protocol entities via one or more SDAP-SAP 1149. These requests and indications communicated via SDAP-SAP 1149 may comprise one or more QoS flows. The SDAP 1147 can map QoS flows to DRBs, and vice versa, and can also mark QFIs in DL and UL packets. A single SDAP entity 1147 can be configured for an individual PDU session. In the UL direction, the NG-RAN 112 can control the mapping of QoS Flows to DRB(s) in two different ways, reflective mapping or explicit mapping. For reflective mapping, the SDAP 1147 of a CLIENT DEVICE 102 can monitor the QFIs of the DL packets for each DRB, and can apply the same mapping for packets flowing in the UL direction. For a DRB, the SDAP 1147 of the CLIENT DEVICE 102 can map the UL packets belonging to the QoS flows(s) corresponding to the QoS flow ID(s) and PDU session observed in the DL packets for that DRB. To enable reflective mapping, the NG-RAN can mark DL packets over the Uu interface with a QoS flow ID. The explicit mapping can involve the RRC 1155 configuring the SDAP 1147 with an explicit QoS flow to DRB mapping rule, which can be stored and followed by the SDAP 1147.

In implementations, the SDAP 1147 can only be used in NR implementations and may not be used in LTE implementations.

The RRC 1155 may configure, via one or more management service access points (M-SAP), aspects of one or more protocol layers, which can include one or more instances of PHY 1110, MAC 1120, RLC 1130, PDCP 1140 and SDAP 1147. In implementations, an instance of RRC 1155 can process requests from and provide indications to one or more NAS entities 1157 via one or more RRC-SAPs 1156. The main services and functions of the RRC 1155 can include broadcast of system information (for example, included in MIBs or SIBs related to the NAS), broadcast of system information related to the access stratum (AS), paging, establishment, maintenance and release of an RRC connection between the client device 102 and RAN (for example, RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1157 can form the highest stratum of the control plane between the client device 102 and the AMF. The NAS 1157 can support the mobility of the client device 102 and the session management procedures to establish and maintain IP connectivity between the CLIENT DEVICE 102 and a P-GW in LTE systems.

According to various implementations, one or more protocol entities of arrangement 1100 can be implemented in client device 102, RAN nodes 112a, AMF in NR implementations or MME in LTE implementations, UPF in NR implementations or S-GW and P-GW in LTE implementations, or the like to be used for control plane or user plane communications protocol stack between the aforementioned devices. In such implementations, one or more protocol entities that can be implemented in one or more of client device 102, gNB 112a, AMF, etc., can communicate with a respective peer protocol entity that can be implemented in or on another device using the services of respective lower layer protocol entities to perform such communication. In some implementations, a gNB-CU of the gNB 112A can host the RRC 1155, SDAP 1147, and PDCP 1140 of the gNB that controls the operation of one or more gNB-DUs, and the gNB-DUs of the gNB 112A can each host the RLC 1130, MAC 1120, and PHY 1110 of the gNB 112A.

In a first example, a control plane protocol stack can comprise, in order from highest layer to lowest layer, NAS 1157, RRC 1155, PDCP 1140, RLC 1130, MAC 1120, and PHY 1110. In this example, upper layers 1160 can be built on top of the NAS 1157, which includes an IP layer 1161, an SCTP 1162, and an application layer signaling protocol (AP) 1163.

In NR implementations, the AP 1163 can be an NG application protocol layer (NGAP or NG-AP) 1163 for the NG interface 113 defined between the NG-RAN node 112A and the AMF, or the AP 1163 can be an Xn application protocol layer (XnAP or Xn-AP) 1163 for the Xn interface 112B that is defined between two or more RAN nodes 112A.

The NG-AP 1163 can support the functions of the NG interface 113 and can comprise Elementary Procedures (EPs). An NG-AP EP can be a unit of interaction between the NG-RAN node 112A and the AMF. The NG-AP 1163 services can comprise two groups: UE-associated services (for example, services related to a client device 102) and non-UE-associated services (for example, services related to the whole NG interface instance between the NG-RAN node 112a and AMF). These services can include functions including, but not limited to: a paging function for the sending of paging requests to NG-RAN nodes 112A involved in a particular paging area; a UE context management function for allowing the AMF to establish, modify, and/or release a UE context in the AMF and the NG-RAN node 112a; a mobility function for client device 102 in ECM-CONNECTED mode for intra-system HOs to support mobility within NG-RAN and inter-system HOs to support mobility from/to EPS systems; a NAS Signaling Transport function for transporting or rerouting NAS messages between client device 102 and AMF; a NAS node selection function for determining an association between the AMF and the client device 102; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (for example, SON information, performance measurement (PM) data, etc.) between two RAN nodes 112A via CN 108; and/or other like functions.

The XnAP 1163 can support the functions of the Xn interface 112B and can comprise XnAP basic mobility procedures and XnAP global procedures. The XnAP basic mobility procedures can comprise procedures used to handle UE mobility within the NG RAN 112A (or E-UTRAN), such as handover preparation and cancellation procedures, SN Status Transfer procedures, UE context retrieval and UE context release procedures, RAN paging procedures, dual connectivity related procedures, and the like. The XnAP global procedures can comprise procedures that are not related to a specific CLIENT DEVICE 102, such as Xn interface setup and reset procedures, NG-RAN update procedures, cell activation procedures, and the like.

In LTE implementations, the AP 1163 can be an S1 Application Protocol layer (S1-AP) 1163 for the S1 interface 113 defined between an E-UTRAN node 112A and an MME, or the AP 1163 can be an X2 application protocol layer (X2AP or X2-AP) 1163 for the X2 interface 112B that is defined between two or more E-UTRAN nodes 112A.

The S1 Application Protocol layer (S1-AP) 1163 can support the functions of the S1 interface, and similar to the NG-AP discussed previously, the S1-AP can comprise S1-AP EPs. An S1-AP EP can be a unit of interaction between the E-UTRAN node 112A and an MME within an LTE core network. The S1-AP 1163 services can comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1163 can support the functions of the X2 interface 112B and can comprise X2AP basic mobility procedures and X2AP global procedures. The X2AP basic mobility procedures can comprise procedures used to handle UE mobility within the E-UTRAN 108, such as handover preparation and cancellation procedures, SN Status Transfer procedures, UE context retrieval and UE context release procedures, RAN paging procedures, dual connectivity related procedures, and the like. The X2AP global procedures can comprise procedures that are not related to a specific client device 102, such as X2 interface setup and reset procedures, load indication procedures, error indication procedures, cell activation procedures, and the like.

The SCTP layer (alternatively referred to as the SCTP/IP layer) 1162 can provide guaranteed delivery of application layer messages (for example, NGAP or XnAP messages in NR implementations, or S1-AP or X2AP messages in LTE implementations). The SCTP 1162 can ensure reliable delivery of signaling messages between the RAN node 112a or 112b and the AMF/MME based, in part, on the IP protocol, supported by the IP 1161. The Internet Protocol layer (IP) 1161 can be used to perform packet addressing and routing functionality. In some implementations the IP layer 1161 can use point-to-point transmission to deliver and convey PDUs. In this regard, the RAN node 112a or 112b can comprise L2 and L1 layer communication links (for example, wired or wireless) with the MME/AMF to exchange information.

In a second example, a user plane protocol stack can comprise, in order from highest layer to lowest layer, SDAP 1147, PDCP 1140, RLC 1130, MAC 1120, and PHY 1110. The user plane protocol stack can be used for communication between the client device 102, RAN nodes 112a, 112b or serving or packet gateways in LTE implementations. In this example, upper layers 1151 can be built on top of the SDAP 1147, and can include a user datagram protocol (UDP) and IP security layer (UDP/IP) 1152, a General Packet Radio Service (GPRS) Tunneling Protocol for the user plane layer (GTP-U) 1153, and a User Plane PDU layer (UP PDU) 1163.

The transport network layer 1154 (also referred to as a "transport layer") can be built on IP transport, and the GTP-U 1153 can be used on top of the UDP/IP layer 1152 (comprising a UDP layer and IP layer) to carry user plane PDUs (UP-PDUs). The IP layer (also referred to as the "Internet layer") can be used to perform packet addressing and routing functionality. The IP layer can assign IP addresses to user data packets in any of IPv4, IPv6, or PPP formats, for example.

The GTP-U 1153 can be used for carrying user data within the GPRS core network and between the radio access network and the core network. The user data transported can be packets in any of IPv4, IPv6, or PPP formats, for example. The UDP/IP 1152 can provide checksums for data integrity, port numbers for addressing different functions at the source and destination, and encryption and authentication on the selected data flows. The RAN nodes 112a and 112b and serving and packet gateways (not shown) can utilize an S1-U interface to exchange user plane data via a protocol stack comprising an L1 layer (for example, PHY 1110), an L2 layer (for example, MAC 1120, RLC 1130, PDCP 1140, and/or SDAP 1147), the UDP/IP layer 1152, and the GTP-U 1153. The serving and packet gateways can utilize an S5/S8a interface to exchange user plane data via a protocol stack comprising an L1 layer, an L2 layer, the UDP/IP layer 1152, and the GTP-U 1153. As discussed previously, NAS protocols can support the mobility of the client device 102 and the session management procedures to establish and maintain IP connectivity by client device 102.

Moreover, although not shown by FIG. 11, an application layer can be present above the AP 1163 and/or the transport network layer 1154. The application layer can be a layer in which a user of the client device 102, RAN nodes 112a, 112b, or other network element interacts with software applications being executed, for example, by application circuitry 905 or application circuitry 1005, respectively. The application layer can also provide one or more interfaces for software applications to interact with communications systems of the client device 102, RAN nodes 112a, 112b, such as the baseband circuitry 910 or 1010. In some implementations the IP layer and/or the application layer can provide the same or similar functionality as layers 5-7, or portions thereof, of the Open Systems Interconnection (OSI) model (for example, OSI Layer 7—the application layer, OSI Layer 6—the presentation layer, and OSI Layer 5—the session layer).

Figure 12:
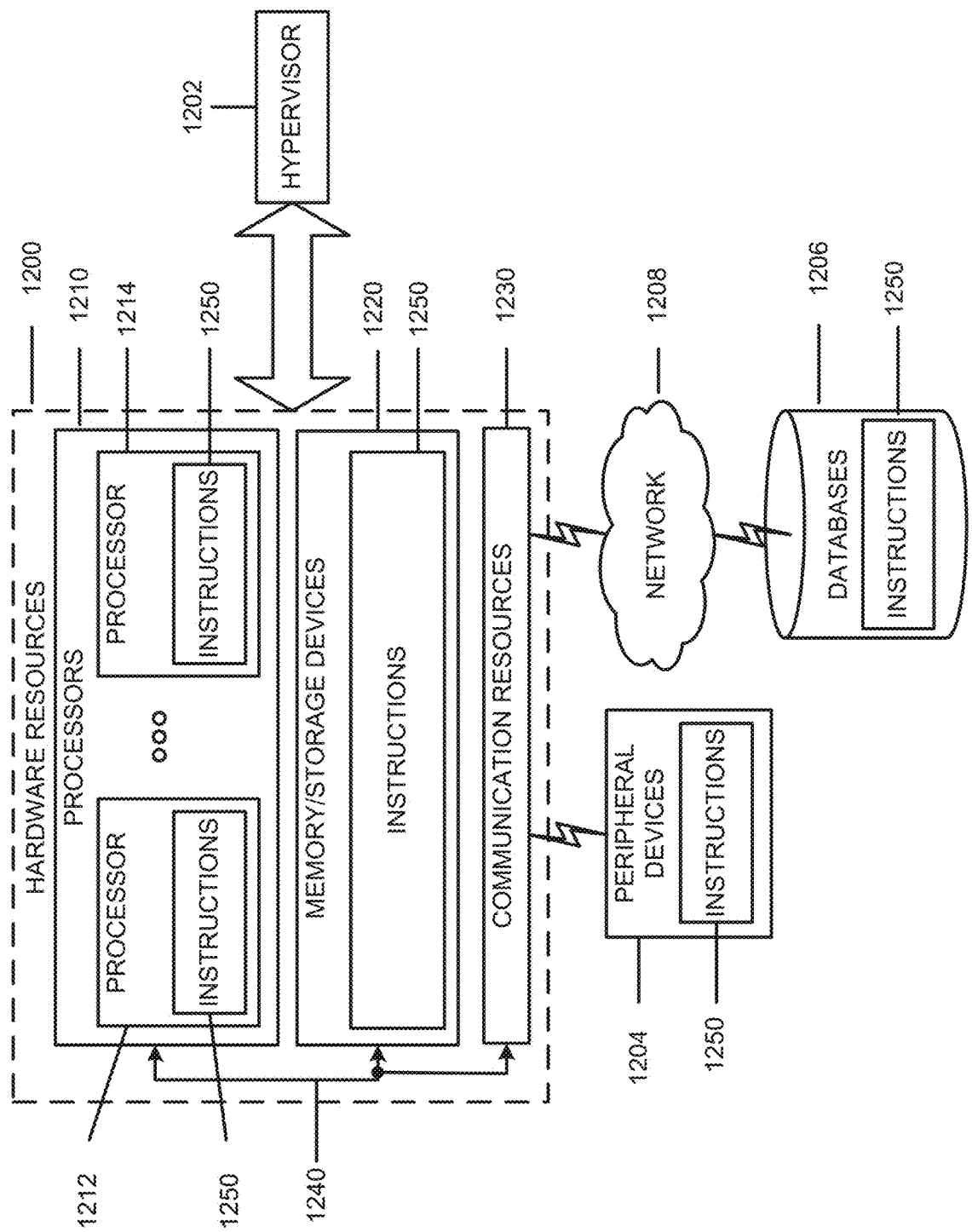
FIG. 12 illustrates a block diagram of a communications system according to some disclosed implementations.

FIG. 12 is a block diagram illustrating components, according to some example implementations, able to read instructions from a machine-readable or computer-readable medium (for example, a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which can be communicatively coupled via a bus 1240. For implementations where node virtualization (for example, NFV) is utilized, a hypervisor 1202 can be executed to provide an execution environment for one or more network slices/sub-slices to utilize the hardware resources 1200.

The processors 1210 can include, for example, a processor 1212 and a processor 1214. The processor(s) 1210 can be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1220 can include main memory, disk storage, or any suitable combination thereof. The memory/storage devices 1220 can include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1230 can include interconnection or network interface components or other suitable devices to communicate with one or more peripheral devices 1204 or one or more databases 1206 via a network 1208. For example, the communication resources 1230 can include wired communication components (for example, for coupling via USB), cellular communication components, NFC components, Bluetooth® (or Bluetooth® Low Energy) components, Wi-Fi® components, and other communication components.

Instructions 1250 can comprise software, a program, an application, an applet, an app, or other executable code for causing at least any of the processors 1210 to perform any one or more of the methodologies discussed herein. The instructions 1250 can reside, completely or partially, within at least one of the processors 1210 (for example, within the processor's cache memory), the memory/storage devices 1220, or any suitable combination thereof. Furthermore, any portion of the instructions 1250 can be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media. In some implementations, hardware resources 1200 can be included in client device 102. Client device 102 can include one or more processors similar to processor 1210 configured to execute software instructions that, when executed, perform various functions, such as the procedures, methods, functions, discussed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures can be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A method comprising:
accessing, in a queue in memory coupled to a user equipment (UE) in a wireless network, a first Transmission Control Protocol Acknowledgement (TCP ACK) packet corresponding to a TCP session;
identifying, using information included in a packet descriptor of the first TCP ACK packet, a TCP flow identifier and a TCP ACK Generation Count corresponding to the first TCP ACK packet, wherein the TCP ACK Generation Count represents a counter value indicating duplicate TCP ACK packets for a TCP flow;
determining that the queue includes a second TCP ACK packet with the same TCP flow identifier and the same TCP ACK Generation Count as the first TCP ACK packet; and in response to the determination, dropping the first TCP ACK packet.

2. The method of claim 1, wherein determining that the queue includes the second TCP ACK packet is based on determining at least one of:
a drain rate of a lower layer queue is below a threshold value,
the UE is operating in a known power mode, or
the UE is detecting downlink TCP data at baseband.

3. The method of claim 1, further comprising determining that the TCP flow comprises uplink data in a plurality of queues, wherein determining that the queue includes the second TCP ACK packet is based on determining that the first TCP ACK packet corresponds to uplink data in a particular queue of the plurality of queues, the particular queue having a specified priority.

4. The method of claim 1, further comprising determining that the TCP flow comprises uplink data transmitted in a plurality of data radio bearers (DRBs), wherein determining that the queue includes the second TCP ACK packet is based on determining that the first TCP ACK packet corresponds to uplink data transmitted in one or more DRBs.

5. The method of claim 4, wherein the one or more DRBs comprise at least one of:
default DRBs on internet packet data network (PDN),
throughput within a given range, or
bidirectional DRBs.

6. The method of claim 1, further comprising determining that the TCP flow comprises uplink data corresponding to a plurality of packet data networks (PDNs), wherein determining that the queue includes the second TCP ACK packet is based on determining that the first TCP ACK packet corresponds to uplink data transmitted in one or more given PDNs.

7. The method of claim 1, further comprising determining that the TCP flow comprises a plurality of internet protocol (IP) packet flows, wherein determining that the queue includes the second TCP ACK packet is based on determining that the first TCP ACK packet corresponds to uplink data transmitted in one or more given IP packet flows.

8. The method of claim 1, wherein packet descriptors of TCP ACK packets are assigned by a TCP application processor included in the UE and the packet descriptors are inspected by a baseband processor circuitry included in the UE,
wherein the TCP application processor assigns a first ACK Generation Count value corresponding to the TCP flow identifier to a plurality of TCP ACK packets that are generated in a first time interval, and assigns a second ACK Generation Count value corresponding to a second TCP flow identifier to a plurality of TCP ACK packets that are generated in a second time interval that is different from the first time interval, the first ACK Generation Count value being different from the second ACK Generation Count value.

9. The method of claim 8, wherein the TCP application processor controls a rate at which TCP ACK packets are dropped from the queue by controlling duration of at least one of the first time interval or the second time interval.

10. The method of claim 1, wherein the first TCP ACK packet is generated prior to the second TCP ACK packet and position of the first TCP ACK packet in the queue is ahead of the position of the second TCP ACK packet in the queue, and wherein the queue is inspected starting with the newest packet first.

11. A method performed by an application processor of a user equipment (UE) in a wireless network, the method comprising:
  generating Transmission Control Protocol Acknowledgement (TCP ACK) packets for a TCP session;
  in a first time interval, assigning a first ACK Generation Count value to a first number of TCP ACK packets for the TCP session generated in the first time interval, wherein the first ACK Generation Count represents a counter value indicating duplicate TCP ACK packets for the TCP session;
  adding the first ACK Generation Count value to packet descriptors of one or more packets of the first number of TCP ACK packets;
  forwarding the first number of TCP ACK packets to a baseband processor of the UE;
  in a second time interval, assigning a second ACK Generation Count value to a second number of TCP ACK packets for the TCP session generated in the second time interval, wherein the second time interval is different from the first time interval and the second ACK Generation Count value is different from the first ACK Generation Count value;
  adding the second ACK Generation Count value to packet descriptors of one or more packets of the second number of TCP ACK packets; and
  forwarding the second number of TCP ACK packets to the baseband processor of the UE.

12. A processor comprising circuitry to execute instructions to perform operations comprising:
  accessing, in a queue in memory coupled to a user equipment (UE) in a wireless network, a first Transmission Control Protocol Acknowledgement (TCP ACK) packet corresponding to a TCP session;
  identifying, using information included in a packet descriptor of the first TCP ACK packet, a TCP flow identifier and a TCP ACK Generation Count corresponding to the first TCP ACK packet, wherein the TCP ACK Generation Count represents a counter value indicating duplicate TCP ACK packets for a TCP flow;
  determining that the queue includes a second TCP ACK packet with the same TCP flow identifier and the same TCP ACK Generation Count as the first TCP ACK packet; and
  in response to the determination, dropping the first TCP ACK packet.

13. The processor of claim 12, wherein determining that the queue includes the second TCP ACK packet is based on determining at least one of:
  a drain rate of a lower layer queue is below a threshold value,
  the UE is operating in a known power mode, or
  the UE is detecting downlink TCP data at baseband.

14. The processor of claim 12, further comprising determining that the TCP flow comprises uplink data in a plurality of queues, wherein determining that the queue includes the second TCP ACK packet is based on determining that the first TCP ACK packet corresponds to uplink data in a particular queue of the plurality of queues, the particular queue having a specified priority.

15. The processor of claim 12, further comprising determining that the TCP flow comprises uplink data transmitted in a plurality of data radio bearers (DRBs), wherein determining that the queue includes the second TCP ACK packet is based on determining that the first TCP ACK packet corresponds to uplink data transmitted in one or more DRBs.

16. The processor of claim 15, wherein the one or more DRBs comprise at least one of:
  default DRBs on internet packet data network (PDN),
  throughput within a given range, or
  bidirectional DRBs.

17. The processor of claim 12, further comprising determining that the TCP flow comprises uplink data corresponding to a plurality of packet data networks (PDNs), wherein determining that the queue includes the second TCP ACK packet is based on determining that the first TCP ACK packet corresponds to uplink data transmitted in one or more given PDNs.

18. The processor of claim 12, further comprising determining that the TCP flow comprises a plurality of internet protocol (IP) packet flows, wherein determining that the queue includes the second TCP ACK packet is based on determining that the first TCP ACK packet corresponds to uplink data transmitted in one or more given IP packet flows.

19. The processor of claim 12, wherein packet descriptors of TCP ACK packets are assigned by a TCP application processor included in the UE and the packet descriptors are inspected by a baseband processor circuitry included in the UE,
  wherein the TCP application processor assigns a first ACK Generation Count value corresponding to the TCP flow identifier to a plurality of TCP ACK packets that are generated in a first time interval, and assigns a second ACK Generation Count value corresponding to a second TCP flow identifier to a plurality of TCP ACK packets that are generated in a second time interval that is different from the first time interval, the first ACK Generation Count value being different from the second ACK Generation Count value.

20. The processor of claim 19, wherein the TCP application processor controls a rate at which TCP ACK packets are dropped from the queue by controlling duration of at least one of the first time interval or the second time interval.

21. The processor of claim 12, wherein the first TCP ACK packet is generated prior to the second TCP ACK packet and position of the first TCP ACK packet in the queue is ahead of the position of the second TCP ACK packet in the queue, and wherein the queue is inspected starting with the newest packet first.

* * * * *